United States Patent [19]
Yamazaki et al.

[11] Patent Number: 5,696,916
[45] Date of Patent: Dec. 9, 1997

[54] INFORMATION STORAGE AND RETRIEVAL SYSTEM AND DISPLAY METHOD THEREFOR

[75] Inventors: Naoko Yamazaki, Koganei; Itsuko Kiuchi, Tokyo; Hiromichi Fujisawa, Tokorozawa; Tetsuya Hashimoto, Tokyo, all of Japan

[73] Assignee: Hitachi, Ltd., Tokyo, Japan

[21] Appl. No.: 947,536

[22] Filed: Sep. 21, 1992

Related U.S. Application Data

[63] Continuation-in-part of Ser. No. 430,241, Oct. 30, 1989, Pat. No. 5,553,226, which is a continuation-in-part of Ser. No. 276,384, Nov. 25, 1988, abandoned, which is a continuation-in-part of Ser. No. 844,123, Mar. 26, 1986, Pat. No. 4,868,733, and Ser. No. 831,093, Feb. 10, 1992, Pat. No. 5,404,506, which is a continuation of Ser. No. 276,384, Nov. 25, 1988, abandoned.

[30] Foreign Application Priority Data

| | | | |
|---|---|---|---|
| Mar. 27, 1985 | [JP] | Japan | 60-060678 |
| Nov. 27, 1987 | [JP] | Japan | 62-297568 |
| Jan. 11, 1988 | [JP] | Japan | 63-002609 |
| Oct. 31, 1988 | [JP] | Japan | 63-272974 |
| Jun. 14, 1989 | [JP] | Japan | 1-149629 |
| Jun. 14, 1989 | [JP] | Japan | 1-149629 |
| Sep. 20, 1991 | [JP] | Japan | 3-241101 |
| Oct. 21, 1991 | [JP] | Japan | 3-272321 |

[51] Int. Cl.⁶ .................................................. G06T 1/00
[52] U.S. Cl. ......................................................... 395/356
[58] Field of Search ........................... 395/12, 51, 54, 395/63, 155, 157, 160, 161, 326, 340, 356, 961, 615, 761; 364/419.19

[56] References Cited

U.S. PATENT DOCUMENTS

| | | | |
|---|---|---|---|
| 4,611,298 | 9/1986 | Shuldt. | |
| 4,754,326 | 6/1988 | Kram et al. | 395/601 |
| 4,868,733 | 9/1989 | Fujisawa et al. | |
| 5,091,852 | 2/1992 | Tsuchida et al. | 395/602 |
| 5,109,509 | 4/1992 | Katayama et al. | 395/759 |
| 5,123,103 | 6/1992 | Ohtaki et al. | 395/605 |

(List continued on next page.)

FOREIGN PATENT DOCUMENTS

| | | |
|---|---|---|
| 0130050 | 1/1985 | European Pat. Off. . |
| 0491517 | 6/1992 | European Pat. Off. . |
| 60-254326 | 12/1985 | Japan . |
| 615844 | 1/1986 | Japan . |
| 62297568 | 6/1989 | Japan . |
| 9111582 | 8/1991 | WIPO . |
| 9112581 | 8/1991 | WIPO . |

OTHER PUBLICATIONS

Ullman, Principles of Database Systems, 1982, pp. 106–107.
Ullman, "Principles of Database Systems," Computer Science Press (1982), pp. 11–35.

(List continued on next page.)

*Primary Examiner*—Anton W. Fetting
*Attorney, Agent, or Firm*—Antonelli, Terry, Stout & Kraus, LLP.

[57] ABSTRACT

An information storage and retrieval system which permits storage of fact information represented in terms of conceptual concepts expressing things and relational concepts expressing relations therebetween on a knowledge base, easy inputting and correction of the fact information, easy browsing and retrieval of the fact information and display of the fact information with effective use of a limited view area, and also to provide a display method used in the information storage and retrieval system. The system includes a device for inputting fact information with respect to a specific relational concept according to a template pattern by using a multi-window function on the basis of information obtained from a concept dictionary for defining hierarchical relations between concepts and a grammar rule for defining semantic structures of cases and concepts allowed to be used in the cases; a device for storage and retrieval of fact information; and a device for displaying fact information in a fact window and displaying a hierarchy of conceptual concepts and relational concepts in a node tree window.

41 Claims, 72 Drawing Sheets

U.S. PATENT DOCUMENTS

| | | | |
|---|---|---|---|
| 5,175,814 | 12/1992 | Anick et al. | 395/348 |
| 5,257,185 | 10/1993 | Farley et al. | 395/611 |
| 5,265,065 | 11/1993 | Turtle | 395/604 |
| 5,278,946 | 1/1994 | Shimada et al. | 395/62 |
| 5,295,261 | 3/1994 | Simonetti | 395/602 |
| 5,321,833 | 6/1994 | Chang et al. | 395/605 |
| 5,404,506 | 4/1995 | Fujisawa et al. | 395/604 |

OTHER PUBLICATIONS

Czejdo et al., "Design and Implementation of an Interactive Graphical Query Interface for a Relational Database Management System," 1988 IEEE Workshop on Visual Languags (1988), pp. 14–20.

Meyer, "Tools for the New Culture:Lessons from the Design of the EIFFEL Libraries", Communications of the ACM, vol. 33, No. 9 (Sep. 1990), pp. 69–88.

Subieta, "Semanties of Query Languages for Network Databases," ACM Transactions on Database Systems, vol. 10, No. 3 (Sep. 1985), pp. 347–394.

Hein, "Information System Model and Architecture Generator", IBM Systems Journal, vol. 24 Nos. 3/4 (1985), pp. 213–235.

Senko, "A Query–Maintenance Language for the Data Independent Accessing Model II", Inform Systems, vol. 5 (1980), pp. 257–272.

Sudieta, "Linguistic Approach to Database Theory: DDLs for Hierarchical Model," Inform. Systems, vol. 3 (1978), pp. 203–208.

Astraham et al., "Implementation of a Structural English Query Language", Communications of the ACM, vol. 18, No. 10 (1975), pp. 580–588.

T. Finin, et al. "Interactive Classification as a Knowledge Acquisition Tool".

*Proceedings of National Conference AAAI*, "RABBIT: An Intelligent Database Assistant", F.N. Tou, et al., 1982.

*IEEE Transactions on Software Engineerig*, "Knowledge Representation for Model Management Systesm", D.R. Dolk, et al., vol. SE–10, No. 6, Nov. 1984.

FIG. 30

| <TAKE> | VIEW | REGISTER | CLOSE |

| 1 | TARO HITACHI TOOK DOCTORATE AT UNIV. B IN 1975. | 3001 |
| 2 | TARO HITACHI TOOK BACHELOR OF ENGINEERING IN 1970. | 3002 |
| 3 | YOSHIO TANAKA TOOK LICENSE OF ARCHITECT. | 3003 |
| 4 | REIKO SAGAWA TOOK LICENSE OF FLOWER DESIGNER. |
| 5 | YOJI MORIYAMA TOOK LICENSE OF PHARMACEUTIST. |

FIG. 32

| <NATIONALITY> | VIEW | REGISTER | CLOSE |
|---|---|---|---|
| 1 | TARO HITACHI | JAPAN | |
| 2 | REIKO SAGAWA | JAPAN | |
| 3 | YOSHIO TANAKA | JAPAN | |
| 4 | YOJI MORIYAMA | JAPAN | |
| 5 | BABE RUTH | UNITED STATES | |

| <TAKE> | VIEW | RESISTER | CLOSE |

☐ TARO HITACHI : TOOK DOCTORATE AT UNIV. A IN 1975
☐ TARO HITACHI : TOOK BACHELOR OF ENGINEER AT UNIV. A IN 1970

| | PERSON > | VIEW | RESISTER | CLOSE | |
|---|---|---|---|---|---|
| 1 | IS-A | INTELLECTUAL ENTITY | | △ | |
| 2 | >NATIONARITY> | --- | | ▭ YOSHIO TANAKA :GRADUATED KYUSHU UNIV. | |
| 3 | >BIRTH PLACE> | --- | | ▭ TARO HITACHI: TOOK BACHELER OF ENGINEER AT UNIV. A | |
| 4 | >AGE> | --- | | ▭ KOZO YOSHIKAWA :DESIGNED KOPO - ARAKAWA | |
| 65 | <EMPLOYEE< | --- | | ▭ SUZUKI TRADE CO. : ASKED TARO HITACHI TO BUILD 14TH OCHANOMIZU BUILDING | |
| | | | | ▽ | |

3703 — RESISTER 3701, 3702 — entries

FIG. 40

| VIEW | FONT | | |
|------|------|--|--|
| VIEW | | | |
| UNIVERSAL | | | |
| CONCEPT | | | |
| INTELLECTUAL ENTITY | | | |
| ORGANIZATION | | | |
| COMPANY | | | |

4001:
| | | TARO HITACHI | |
|---|---|---|---|
| 1 | IS-A | | |
| 2 | >NATIONALITY> | | |
| 3 | >BIRTHPLACE> | KANAGAWA PREFECTURE | |
| 4 | <DESIGNER-OF< | Mr. KATAGIRI'S RESIDENCE | |
| 5 | ...... | | |

[COMPANY] : ?
IT HAS [OFFICE] IN [SHINSHU].
IT WAS REBUILT BY [PERSON].
IT PUBLISHED [ESSAY] [MAGAZINE].

VIEW  RESISTER  CLOSE

| | PERSON | |
|---|---|---|
| 1 | | TARO HITACHI GRADUATED UNIV. A IN 1970 |
| 4 | | TARO HITACHI TOOK DOCTORATE AT UNIV. B IN 1975 |
| 6 | | (SET TARO HITACHI, YOSHIO TANAKA) SETUP OFFICE IN KOBUCHIZAWA |
| 25 | | SUZUKI TRADE CO. ASKED TARO HITACHI TO BUILD 14TH OCHANOMIZU BUILDING |

4002

| <JAPAN> | | NATION | |
|---|---|---|---|
| 1 | IS-A | | |
| 2 | PART-OF | ASIA | |
| 3 | >NATIONALITY> | TARO HITACHI | |
| 7 | MEMBER NATION | UNITED NATIONS | |
| 8 | ...... | | |

VIEW  RESISTER  CLOSE

| | | |
|---|---|---|
| 1 | | ELIZABETH : VISITED JAPAN. |
| 54 | | AZUMAZEKI-OYAKATA WAS NATURALIZED IN JAPAN. |
| 60 | | DR.HAWKING MADE A SPEECH IN JAPAN 1991. |

4003

SEARCH CONCEPT    UNDER CONCEPT

FIG. 48

CLOSE

CONDIDATE SENTENCE [PERSON]

4801
◆ IT TOOK [DOCTORATE] AT [A UNIVERSITY].

FOCUSED CONCEPT | DOCTORATE
4807

CASE SELECTION

AGENT : PERSON

PLACE : TOHOKU UNIVERSITY
4803

OBJECT : DOCTORATE
4805

☐ TIME : TIME

INITIALIZE     ADD

INFORMATION STORAGE AND RETRIEVAL SYSTEM AND DISPLAY METHOD THEREFOR

CROSS REFERENCE TO RELATED APPLICATIONS

The present application is a CIP of U.S. patent application Ser. No. 07/430,241 filed on Oct. 30, 1989 now U.S. Pat. No. 5,553,226, which is a CIP of U.S. patent application Ser. No. 07/276,384 filed on Nov. 25, 1988 now abandoned which is a CIP of U.S. patent application Ser. No. 06/844,123 filed on Mar. 26, 1986 now U.S. Pat. No. 4,868,733; and U.S. patent application Ser. No. 07/831,093 filed on Feb. 10, 1992 now U.S. Pat. No. 5,404,506 which is a CA of the above U.S. patent application Ser. No. 07/276,384 filed on Nov. 25, 1988 which is now abandoned, the disclosures of which are incorporated herein by reference.

BACKGROUND OF THE INVENTION

The present invention relates to an information storage and retrieval system using a knowledge base and, more particularly, relates to a display method in an information storage and retrieval system which permits inputting of semantic information such as a natural language in the form of knowledge to be processed by a computer, and freely displaying of the contents of a knowledge base stored in a computer system by using a multi-window function.

Heretofore, management of a data base which permits storage and retrieval of an enormous amount of information has been relied on by those skilled in the art. However, in accompaniment to the development of document filing systems using optical disks in recent years, such expert management is imposed on end users. For example, a command type inputting method which can be used easily by those skilled in the art is a large burden to the end users.

In conventional computer techniques, it is general that documents are managed in tabular form listing bibliographic data such as author's names and original sources attached to the documents when the documents are stored in this type document filing system. Because the bibliographic data are objective items, registration thereof can be made easily. It is, however, relatively rare to use the bibliographic data as means for retrieval. In most cases, keywords and classification codes provided as clues to the contents of documents are used as means for retrieval. However, the following two problems arise in use of keywords. The first problem is encountered in registration of a document, in which it is difficult to determine the keyword which makes it possible to retrieve properly the associated document later on. The second problem is encountered in retrieval of a document, in which it is difficult to recall keywords to generate the retrieval formula composed of the keywords.

As an attempt to cope with the above problems, a research for data inputting by using a natural language has been proposed but has not been used widely. Because the interface for data inputting by using a natural language is not yet completed so that the percentage of correct analysis of input sentences is insufficient, there frequently arises the situation in which the system cannot analyze the input sentences resulting in the input sentences being rejected or retry requested. Knowledge of a large number of restrictions and rules is required for inputting sentences which can be analyzed correctly by the system. The labor required for remembering the restrictions and rules is equal to the labor required for remembering commands.

Accordingly, the present situation is that the document as an object of desire cannot be retrieved speedily.

As an attempt to cope with the above problems, there is known a system in which a knowledge base is applied to the filing system, as disclosed in U.S. Pat. No. 4,868,733. Furthermore, some methods about display techniques in a knowledge base have been proposed. Furthermore, a method of exhibiting candidate sentences allowed to be inputted at the time of inputting of a sentence by using a knowledge base to thereby make it possible to select a sentence from the candidate sentences on the basis of user's judgment to reconcile both easy usability and easy analysis has been proposed as a sentence inputting method as disclosed in JP-A-1-140,332 (corresponding to U.S. application Ser. No. 07/276,384 filed, Nov. 25, 1988, abandoned).

The expression of knowledge in a knowledge base as described in U.S. Pat. No. 4,868,733 and JP-A-1-140,332 will be described below with reference to FIG. 5.

FIG. 5 diagramatically shows "concepts" stored in a knowledge base. In the drawing, the ellipses represent "concepts", and the arrows represent "relations". In the knowledge base, concepts are hierarchically connected by is-a relations and part-whole relations. First, all concepts in the knowledge base are connected to one another by is-a relations under "UNIVERSAL" 501 which is an uppermost concept defined to subsume all the other concepts. The is-a relation means the relation "concept X is a concept Y". By reference to a concept, upper concepts relative to the concept are called super concepts and lower concepts relative to the concept are called subconcepts. For example, super concepts of "person" 515 are "intellectual entity" 505, "thing" 503 and "UNIVERSAL" 501. Furthermore, some concepts are connected by part-whole relations. The part-whole relation means the relation "concept X is a part of concept Y". For example, "Shinshu" 529 is a part of "Japan" 527. Furthermore, each concept can have a plurality of is-a relations and part-whole relations. For example, super concepts of "company" 534 are two concepts "organization" 507 and "place" 525.

In the knowledge base, a fact is expressed by two concepts and one relation, that is, by a binomial relation. First, two general concepts are linked by a general relation. Because the relation between two concepts is expressed in terms, the relation has two different relational names so that either of the concepts connected to both ends of the relation can be used as a subject. For example, concepts "person" 515 and "degree" 521 are connected by a general relation "take" 536. The relation "take" has two names "taken by" and "take" as expression with "degree" as a subject "degree taken by person", and as expression with "person" as a subject "person took degree".

A relation for linking two specific concepts is called specific relation. To generate this relation, the concepts must be connected by a general relation in which super concepts thereof have the same relational name. For example, concepts "Taro Hitachi" 517 and "bachelor of engineering" 523 are connected by a special relation "take" 537. By this relation, a special fact "Taro Hitachi took bachelor of engineering" can be expressed. The "relations" for connecting concepts make it possible to associably "browse" through the concepts stored in the knowledge base. A concept being viewed or noticed by the user browsing through concepts is called current concept.

By storing knowledge in the above form, inputting of an explanatory sentence and retrieval of a special fact from an explanatory query sentence as a means of retrieval can be performed as described in U.S. Pat. No. 4,868,733 and JP-A-1-140,332. For example, inputting of fact information "news item #0468 on the subject of Creative WS 2050 developed by Hitachi placed in Tokyo" and retrieval of the fact information from a query formula "News item on the subject of a computer developed by a company placed in Japan ?" can be performed. A natural language interface is used when a query request is issued in the information retrieval system.

In the aforementioned, conventional techniques, however, expression of knowledge to be registered is insufficient as follows.

The first problem is caused by that fact knowledge is expressed by binomial relations. When, for example, a fact is expressed by using three or more concepts as "Taro Hitachi took bachelor of engineering at University A", a plurality of general relations and specific relations must be used. For example, as shown in FIG. 5, "Taro Hitachi" 517 and "bachelor of engineering" 523 must be connected by a relation "take" 537 and, at the same time, "University A" 513 and "bachelor of engineering" 523 must be connected by another relation "take at" 539. In this case, there is no proper relation between "Taro Hitachi" 517 and "University A" 513, so that the two concepts must be connected through "bachelor of engineering".

When a plurality of things are expressed as knowledge, similar things are often confused.

For example, for expression of the two things

"A bought book X at B shop" and

"A bought magazine Y at C shop", the things must be separated into four relations for registration "A bought book X", "A bought at B shop", "A bought magazine Y" and "A bought at C shop".

When things are separated into a plurality of binomial relations as described above, however, there arises a problem in that the judgment as to whether the shop at which "A" bought "book X" is "B shop" or "C shop" cannot be made.

The second problem is in that indefinite knowledge cannot be registered in the situation such as "maybe A company" or "A company or B company". Furthermore, a set of concepts such as "A set of A company and B company developed RISC machine" or knowledge such as "A company being a computer maker and a semiconductor maker developed RISC machine" cannot be registered.

The third problem is in that facts registered in the knowledge base cannot be displayed properly with respect to a special relation. When, for example, a general relation "degree taken at university"

is pointed for display with respect to a relation "take", a fact "bachelor of engineering taken at University A" can be displayed to the user. However, a general relation "person took degree"

is not pointed, so that the user cannot know the fact "Taro Hitachi took bachelor of engineering" though the same verb "take" is used.

The fourth problem arises in the display function when the aforementioned problems are solved. When the display function is extended so that the polynomial relation "Taro Hitachi took bachelor of engineering at University A" as well as the binomial relation can be expressed, the following problem arises in the conventional techniques. That is, browsing through facts is associative browsing which interacts with frame display of concepts. When, for example, frame display with respect to "bachelor of engineering" is performed, it can be known from the frame that "bachelor of engineering" is "degree" and "taken by Taro Hitachi" and "taken at University A". When what is "Taro Hitachi" is then to be known, the frame with respect to "Taro Hitachi" can be examined by pointing "Taro Hitachi" through a mouse. However, when the browsing method is applied to the knowledge base of polynomial relations, not only each fact becomes long but a large number of facts are displayed. As a result, the merit of a list is lowered. Furthermore, similar things may be often confused when a plurality of things are displayed. There is not yet known any method of providing easy browsing to the user by properly displaying a large amount of information having a complex structure as described above.

As described above, the conventional techniques have various problems. As described above, the conventional method of displaying knowledge on the basis of binomial relations has a problem in that fact knowledge based polynomial relations cannot be expressed properly. Furthermore, semantic defects and problems on display arise when display is made forcedly.

SUMMARY OF THE INVENTION

A first object of the present invention is to provide an extension type concept network model in which polynomial relations can be expressed so that semantic information based on polynomial relations can be expressed on a computer according to the model to thereby solve the aforementioned problems.

A second object of the invention is to provide a display method in which a limited view area is utilized so effectively that the user can see the contents of the knowledge base easily to thereby solve the display problems derived from improvement of the knowledge expression capacity.

A third object of the invention is to easily generate sentences expressed by polynomial relations by using a pointing device.

The foregoing objects are attained by the provision of an extension type concept network model to make it possible to express polynomial relations by using "concepts" and "relations" and, at the same time, by the provision of a function for inputting and display of semantic information allowed to be expressed by the model in the form of rearranged data.

That is, the present invention provides an information storage and retrieval system using a concept relation model for representing knowledge in terms of concepts and relations defined between the concepts, which comprises: means for selecting a fact concept or a relational concept used in an input sentence from a conceptual tree (node tree) for concepts which include conceptual concepts expressing things and relational concepts expressing relations defined between the concepts, for extracting candidate sentences allowed to use the selected concept by using templates, each of which defines semantic information peculiar to the relational concepts, information concerning the conceptual concepts and information concerning prepositions/postpositions, and for focusing the input sentences from the extracted candidate sentences; means for inputting fact information according to the structure of the templates; means for storing the fact information inputted by the input means and for retrieving a desired concept on the basis of the stored fact information; means for displaying a fact window for the fact information, an input window for the semantic information for the candidate sentences and the templates, a node tree window for a hierarchy of the conceptual concepts and the relational concepts to perform at least one of the focusing of the candidate sentences, the inputting of the fact information and the retrieval of the requested conceptual concept.

The principle and operation of the knowledge expression and display method in the present invention will be described blow.

A concept network as the knowledge expression method and in the system according to the invention will be described with reference to FIG. 6.

In an extension concept network, "concept" representing a thing such as a person's name or a place name is expressed and called conceptual concept. In this specification, the conceptual concept is also called concept. Besides the concept, "relation" which has been heretofore called link is also expressed as a kind of "concept" and called relational concept. Relational concepts are classified into verbal concepts representing verbs and attribute concepts representing attributes. These relational concepts as well as the conventional concepts have is-a relations. Specifically, as shown in FIG. 6, "concept" 603 and "relation" 633 rank below the uppermost concept "UNIVERSAL" 601. Further, "DO relation" 635 which is a general name for verbal concepts and "BE relation" 643 which is a general name for attribute concepts rank below "relation" 633. Further, "get" 637, "take" 639 and the like are subsumed under "DO relation" and "nationality" 645 and the like are subsumed under "BE relation".

The relational concepts can have semantic information peculiar thereto. Each of the attribute concepts can be defined by two concepts as semantic constituent elements thereof. Each of the verbal concepts can be defined by two or more concepts as semantic constituent elements thereof. A grammar rule H-403 constituted by a combination of relational concepts and concepts as semantic constituent elements is called template. The semantic roles of the concepts embedded in the template are called cases. The relational concepts and the concepts are connected by links called case links. For example, a template for a verbal concept "get" is expressed in the form of "[intellectual entity] [get] [thing] at [organization] in [time]" 648 (FIG. 6). This template defines "intellectual entity" 623 as agent case representing a subject of action, "thing" 617 as object case, "organization" 611 as collection-in case and "time" 605 as time case, respectively. The concepts defined as cases, such as "intellectual entity" and "thing", are called case constraint concepts. As a case constraint concept, a plurality of concepts can be defined. One template to each relational concept can be defined. The concept allowed to be defined in a case in a lower-rank template is a subconcept subsumed under the concept defined in a corresponding case in a higher-rank template. For example, a template 649 for "take" which is a subconcept of "get" defines "person" 625 as agent case and "license" 619 as object case, respectively, and further defines "organization" 613 as collection-in case and "time" 607 as time case, respectively, in the same manner as the template 648 for "get". The concept "person" 625 as agent case is a subconcept of "intellectual entity" 623. A concept dictionary 401 defines high-low relations, that is, is-a relations, and part-whole relations between concepts. As high-low relations between relational concepts, is-a relations are defined. The concept dictionary is constructed by these relations and has a tree structure.

On the other hand, a template for an attribute concept "nationality" is expressed in the form of "nationality of [person] is [nation]" 651. Here, "person" 625 as an attribute object case representing the center of the attribute described and "nation" 629 as an attribute value case representing the value of the attribute are defined as case constraint concepts, respectively. A hierarchy can be given to the template for an attribute concept by is-a relations in the same manner as the template for a verbal concept. As described above, frames of fact knowledge to be expressed can be accumulated as general knowledge by a set of templates and concept dictionaries. When, for example, a collection-in case is pointed in the template 649 for "take", "organization" 611 can be represented as a candidate. On the contrary, a template in which "license" 619 is defined as case constraint concept or case in which the concept is defined in the template can be retrieved.

Specific knowledge (fact knowledge) to be initially stored in the system can be expressed by embedding special concepts in templates therefor and can be stored in the knowledge base. For example, in expression of a fact "Taro Hitachi took bachelor of engineering at University A in 1970" 650 (FIG. 6), "Taro Hitachi" 627 as agent case, "bachelor of engineering" 621 as object case, "University A" 615 as collection-in case and "1970" 609 as time case are successively embedded in a template for "take". In expression of a fact "nationality of Taro Hitachi is Japan" 652, "Taro Hitachi" 627 as attribute object case and "Japan" 631 as attribute value case are successively embedded in a template for "nationality".

As described above, fact knowledge to be accumulated can be expressed by the structures of templates given to a verbal concept and an attribute concept, so that the sense thereof can be expressed as data in the inside of the computer. Fact information expressing the fact knowledge is generated as a semantic sentence. The concepts embedded in the templates representing semantic information are concepts managed in a hierarchical conceptual system, to make semantic retrieval using inference possible as will be described later.

The principle of the knowledge display, query editing and fact information inputting method as well as the total structure and operation of the information storage and retrieval system using the knowledge expression method will be described below.

FIG. 3 shows an example of functional arrangement of an information storage and retrieval system using a Concept Network. The user interacts with the system through a display unit 202, a keyboard 203 and a mouse 204. On the basis of user's request, the system performs retrieval and display of necessary information or performs storage and accumulation of fragmentary information inputted by the user in a knowledge base 309 constituted by a Concept Network.

Concept Network data expressed according to a predetermined expression model, such as for example information concerning templates, information concerning a concept dictionary and information concerning input facts and queries, are stored in the knowledge base 309. The data can be expressed in the form of text, so that the data can be exchanged to data in another system. The data are read in a memory in a Concept Network Manager 307 at the time of starting of the system and converted into an internal data structure to make high-speed retrieval possible. The Concept Network data expressed by the internal data structure are accessed from a Concept Network Editor (CE) 304, a View Generator (VG) 305 and a Concept Searcher (CS) 306 and processed for editing, display and retrieval of knowledge (Concept Network).

The interaction with the user is controlled by an I/O controller 315. The I/O controller is composed of a Window Manager (WM) 308 and an Event Analyzer (EV) 311. Input information from the keyboard 203 and the mouse 204 is analyzed by the Event Analyzer and processed by an interactive view controller 320. The interactive view controller is composed of a Concept Network Editing Manager (CED) 301, a Browser (BR) 302 and a Query Editor (QE) 303. In alteration of information in the knowledge base, input information is delivered to the Concept Network Manager through the Concept Network Editing Manager 301 and the Concept Network Editor. Information necessary for display is fed from the manager to the View Generator, so that the updated contents of the information are displayed on a multi-window of a display unit through the Browser and the Window Manager. In editing of query sentences, information is converted into the form of a sentence using templates by the Query Editor, so that information in the manager is retrieved through the Concept Searcher.

The present invention is relates to the Browser, the Concept Network Editor and the Query Editor.

In the following, the operation of the system will be described with reference to an example of interactive display shown in FIG. 1. First, the structure of the interactive display will be described. The interactive display is composed of a plurality of windows. Basic windows which are continuously displayed are a super-concept window 101, a query editing window 102 and a node tree window 103. The window 105 shown in FIG. 1 is a fact window displayed by user's selection. The detail of the fact window is shown in FIG. 7.

The query process is carried out as follows. The query editing function which will be described later is performed by the Query Editor 303. When the user clicks the mouse 204 to shift the pointer (arrow) in the interactive display (FIG. 1) to the query editing window 102, the window is activated so that the user can select an arbitrary element in the query to be edited. In FIG. 1, [company] 107 in the first line in the window represents a concept to be retrieved. Sentences 108, 109, 110 and 111 in the second line and below the second line are conditional sentences to be satisfied by "company" 107. The modification relations between the conditional sentences are expressed by indentation in the respective lines as shown in the drawing.

Here, the user can select an arbitrary concept (noun) enclosed in brankets ([]) and an arbitrary conditional sentence through the mouse. When a concept enclosed in brankets is pointed, data displayed in the node tree window 103 are rewritten to a category containing the selected concept. When, for example, "company" 107 in the query editing window is pointed, the node tree in the node tree window is rewritten to a node tree containing the concept "company as shown in FIG. 1. That is, the system identifies the selected concept from the whole concept network, selects a super concept (in this case, selects "intellectual entity") including the selected concept and displays a category containing the concept. For example, at this time, "company" is highlighted by a rectangle 106. The highlighted concept is called current concept.

The super-concept window 101 permits display of a row of concepts (in FIG. 1, from "company" 116 to "UNIVERSAL" 112) connected upward with respect to the current concept.

When an arbitrary concept displayed in the node tree window is pointed by clicking the left button of the mouse, the current concept is replaced by the pointed concept. At the same time, the super-concept window and the query editing window are altered correspondingly. When, for example, the current concept is altered from "company" to "financial business", the super-concept window 101 is altered so that "financial business" and super concepts are displayed. In the query editing window 102, "company" 107 is rewritten to "financial business". As described above, these basic windows operate so as to be linked to one another, so that the user can edit the query by reference to the contents of the knowledge base. For example, a concept which cannot be remembered may be remembered by a stimulus that the node tree displayed is seen. Furthermore, the category as an object of retrieval can be minimized by expressing the query in terms of concepts as low as possible. The time required for retrieval can be shortened as the results of retrieval are focused.

Besides the concept rewriting function, the following functions are used in query editing. When a concept enclosed in brankets in a query is pointed by clicking the right button of the mouse, a list of functions is displayed as a pop-up menu. The list of functions contains:

1) addition of conditional sentence;
2) deletion of case; and
3) execution of retrieval.

When the head of a conditional sentence is pointed by clicking the right button of the mouse, a list of functions is displayed as a pop-up menu. The list of functions contains:

4) deletion of conditional sentence; and
5) addition of case.

The conditional sentence addition function is applied to a pointed concept such as "company" 107. When this function is selected from the menu, a group of relations modifying (restricting) "company" are displayed in another window. For example, a large number of concepts, "establish" as a verb using "company" as an object case, "have" as a verb using "company" as an agent case, "meet" as a verb using "company" as a collection-in case, and the like, are listed up. In the case of FIG. 1, the user selects "have" from the list. Because the list generally contains a large number of relations (conditional clauses expressed in terms of verbal concepts and attribute concepts), the function of focusing concepts to be requested by the user is important. For this end, the function of focusing candidates for conditional clauses can be provided by performing string matching.

When the user selected one relation such as a verb "have", the system displays cases limiting the sense of the verb by reference to the template (see FIG. 6) attached to the verbal concept "have" and inquires of the user what case is used as a condition. For example, the agent case has been determined as "company". Accordingly, other cases such as "collection-in case" and "object case" are listed up and displayed. When the user selects the collection-in case and the object case, the following sentence is displayed.

"The company has [thing] at [place]"

Here, the user can alter "place" to "Shinshu" and "thing" to "office" by the aforementioned method, so that the conditional sentence 108 can be generated.

The case deletion function is provided to loosen the condition. When, for example, the function is called while pointing the concept "Shinshu" in the conditional sentence, the conditional sentence 108 can be loosened as "The company has [office]".

The query executing function is provided to retrieve a pointed concept. When, for example, the function is called while pointing "company" 107, "company" modified (restricted) by conditional sentences 180, 109, 110 and 111 is retrieved by using classification inference. Besides concepts in the first line, the retrieval can be applied to concepts in conditional sentences in the second line and below the second line. When, for example, the query executing function is started while pointing the concept "person" 120 in the conditional sentence 109 by the mouse, "person published essay in magazine" can be retrieved. By using this function, a judgment can be made as to whether each condition is satisfied.

By pointing the head of a conditional sentence through the mouse, the conditional sentence can be deleted. Accordingly, the query condition can be loosened.

Furthermore, a new case can be added to the conditional sentence. When, for example, the case addition function is started while pointing the head of the conditional sentence "The company has [office]", relational concepts in the conditional sentence are displayed in another window, that is, in this case, case structures of the verbal concept "have" are displayed in another window. Specifically, "at [place]", "in [time]", "for [object]", "by [means]" and the like are displayed. Because initially existing case elements "[intellectual entity]" and "[thing]" have been used in the query, the case elements are indicated so that they cannot be selected. For example, the user can select "at [place]" so that the conditional sentence can be changed as follows.

"The company has [office] at [place]"

As described above, the condition of the query can be made more rigorous by this function.

Not only a list of concepts corresponding to the query can be displayed as a result of retrieval, but a sentence generated by substituting specific concepts into the concepts in the query can be displayed as a result of retrieval. For example, with respect to the query:

"[company]:?
It has [office] in [Shinshu].
It was rebuilt by [person]." (801), three cases of results "Shinshu Realtor Co." 803, "Azuma Co." 804 and "Kawase Realtor Co." 805 are displayed in the result list window 802 as shown in FIG. 8. When, for example, "Shinshu Realtor Co." is selected from the concepts displayed in the window, "Shinshu Realtor Co.
It has Shinshu Nagano office in Shinshu.
It was rebuilt by Taro Hitachi." (811) is displayed in the result browser window 810. Here, "Nagano City" 812, "Shinshu Nagano office" 813 and "Taro Hitachi" 814 are specific concepts in the knowledge base, which satisfy the conditions in the query. In this case, it is necessary that the following facts are registered as fact knowledge in the knowledge base.

"Shinshu Realtor Co. is company"
"Shinshu Nagano office is office"
"Taro Hitachi is person"
"Nagano City is a part of Shinshu"
"Shinshu Realtor Co. has Shinshu Nagano office in Nagano City"
"Shinshu Nagano office was rebuilt by Taro Hitachi".

The above retrieval can be realized by an inference retrieval process in which classification inference is called. With respect to the specific method of realizing the inference process, for example, a method as disclosed in Masato Shibazaki et al. "Case Structure Data Base using Natural Language Semantic Information as an Object", Information Processing Society, Fundamental Infology Study Meeting Material (SIGFI) No. 21-5 (May 28, 1991) can be used.

A characteristic function in this invention is a function of displaying more detailed information in a fact window by pointing an arbitrary concept in the result display shown in FIG. 8. For example, relational facts can be displayed in the fact window 700 shown in FIG. 7 by pointing "Taro Hitachi" 814. The window has a concept name as a label 701 expressing a concept provided therein. Data displayed in the window are attribute facts and verbal facts for the concept. The facts are displayed in tabular form in an attribute fact area 702 and a verbal fact area 703, respectively.

Attribute facts are expressed by attribute names 712, 714, 716 and 718 and corresponding attribute values 713, 715, 717. Because attribute facts have binomial relations, the facts must be displayed bidirectionally. For example, "Taro Hitachi" may be registered as an attribute value of another concept as well as the attribute of "Taro Hitachi" as follows.

"Nationality of Taro Hitachi is Japan", and
"Designer of Katagiri's residence is Taro Hitachi"

Accordingly, as a knowledge display function, bidirectional display is required. Each of the symbols ">>" and "<<" provided to attribute names indicates a direction in the binomial relation.

Verbal facts are displayed in tabular form as shown ion FIG. 7. For example, verbal facts are displayed as follows: "Taro Hitachi graduated from University A in 1970"; "Taro Hitachi took doctorate at University B in 1975"; and "(SET:Taro Hitachi;Yoshio Tanaka) established office in Kobuchizawa". Herein, (SET:X;Y) 720 represents a sum set of concept X and concept Y. In this case, the latter sentence expresses "Taro Hitachi and Yoshio Tanaka together established office".

Serial number for fact is displayed in the head of each fact. As shown in FIG. 7, number 7111 is "4" and, on the other hand, number 710 is "6". That is, number "5" is not displayed. This shows that a fact "Taro Hitachi took . . . " identified by number "5" exists. As described above, when a large number of facts are provided, the outline thereof can be exhibited to-the user so that it is easy to understand, by hiding (not displaying) similar facts. This method is a display method for effectively utilizing a display having a limited area.

In the following, the principle of inputting of facts and queries will be described.

A flow chart of a process for inputting one sentence is shown in FIG. 4 on the basis of relations between concept dictionaries and grammar rules of temples. p When, for example, a fact "Taro Hitachi took bachelor of engineering at University A"

is to be inputted in a knowledge base, one of concepts "Taro Hitachi", "University A", "bachelor of engineering" and "take" is selected from a concept dictionary at concept selection 405. Assuming now that "take" is selected, then cases to be used are selected from a template for "take" at case selection 415 because it is unnecessary to perform candidate extraction 407, focusing 409 and candidate display 411. In this case, agent case, collection-in case and object case are pointed. Because case constraint concepts registered in the template have been respectively placed in these cases, subconcepts subsumed under the case constraint concepts are respectively selected, as concepts to be put in the cases, from the concept dictionary. In this case, "Taro Hitachi", "University A" and "bachelor of engineering" are selected as agent case, collection-in case and object case, respectively. Then, the selected concepts are displayed (417) after work order, inclusive of prepositions/postpositions, is rearranged on the basis of a grammar rule.

When, for example, a query

"person which took bachelor of engineering at University A ?"

is to be inputted, "take" may be selected in the same manner as described above to thereby perform the inputting of the query or conditions given to "person" may be listed so that selection from the conditions can be made. In the latter case, "person" as an object of retrieval is first selected at concept selection (405). Then, conditions given to "person" are extracted and displayed as a list at candidate extraction 407. Relations in which super concepts of "person" in the concept dictionary are set as case constraint concepts of templates are extracted from relations registered as grammar rules and are displayed to thereby make it possible to perform candidate extraction.

When a large number of candidate sentences are provided, focusing 409 can be performed. For example, relations having cases allowed to be filled with "bachelor of engineering" are selected from the list of relations displayed, so that candidate display 411 can be performed by rearranging the prescribed form by using the selected relations.

In sentence selection 413, relations used in a sentence to be inputted among candidate sentences are selected. Cases to be used are selected from cases in the selected relations and concepts to be inputted in the cases are selected at case selection 415 and sentence display 417 in the same manner as the inputting of sentences in the knowledge base.

In selection of concepts to be inputted into cases at case selection 415, concepts subsumed under case constraint concepts, selected in the concept dictionary, are displayed in one window to aid concept selection.

A sentence modifying a concept in an input sentence can be provided by repeating the above procedure through selecting the concept from the input sentence at concept selection 405.

As described above, fact information for concepts and relations registered in the knowledge base can be displayed or inputted.

BRIEF DESCRIPTION OF THE DRAWINGS

FIG. 30 is a view showing an example of display of facts expressed by a pointed verbal concept "take";

FIG. 32 is a view showing an example of display of facts expressed by a pointed attribute concept "nationality";

FIG. 35 is a view showing an example of display of facts after an addition button is selected in the display of facts as shown in FIG. 34;

FIG. 37 is a view showing an example of display of facts expressed by a pointed concept "person" and subconcepts thereof;

FIG. 40 is a view showing display at browsing through fact information for concepts "Taro Hitachi" and "Japan";

FIG. 48 is a view showing an example in which focusing is performed twice;

DESCRIPTION OF THE PREFERRED EMBODIMENTS

The structure and operation of the system will be outlined below with reference to the drawings.

Figure 1:
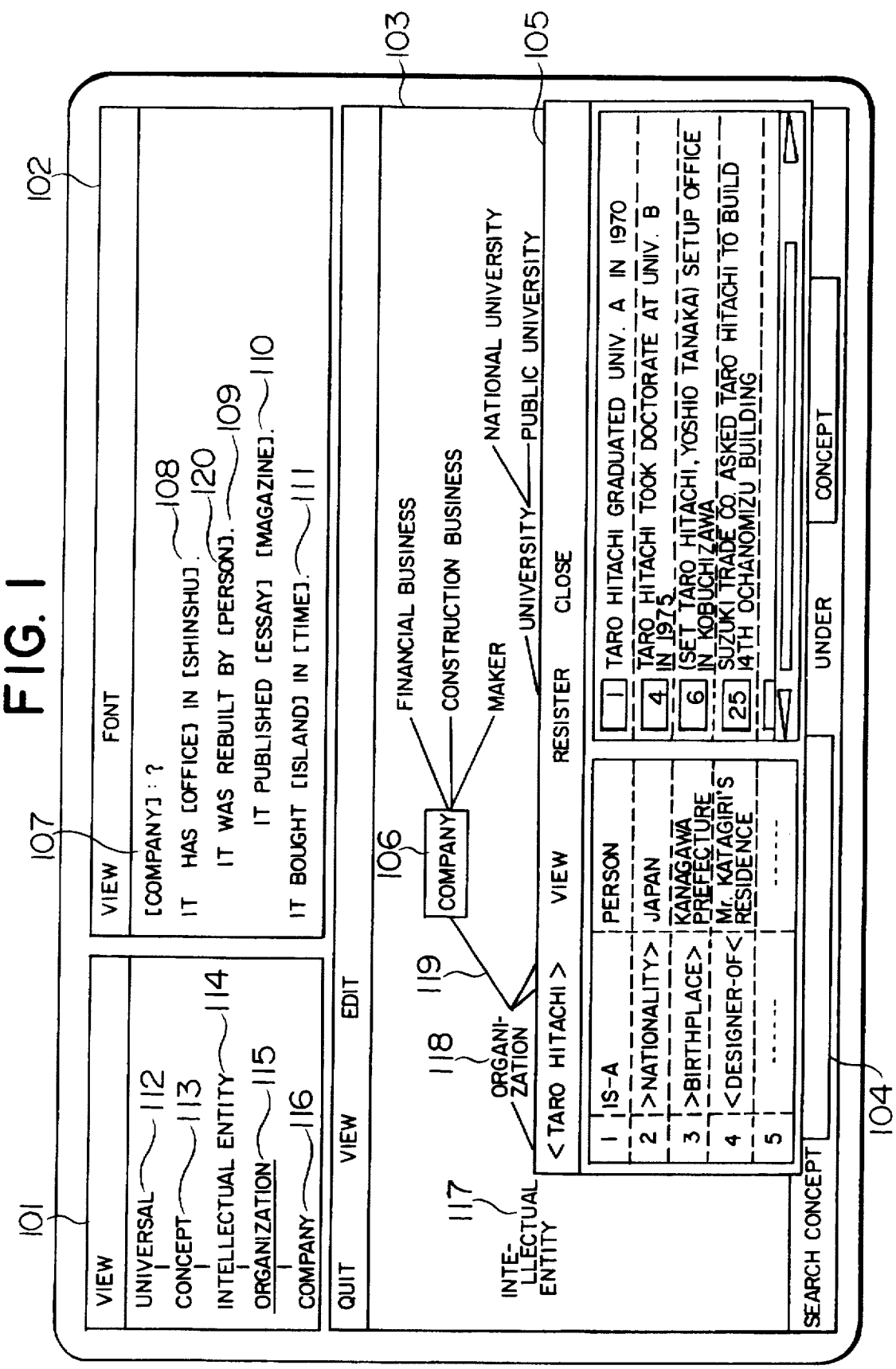
FIG. 1 is a view showing an example of display for visual expression of knowledge in an information storage and retrieval system according to the present invention.
Figure 2:
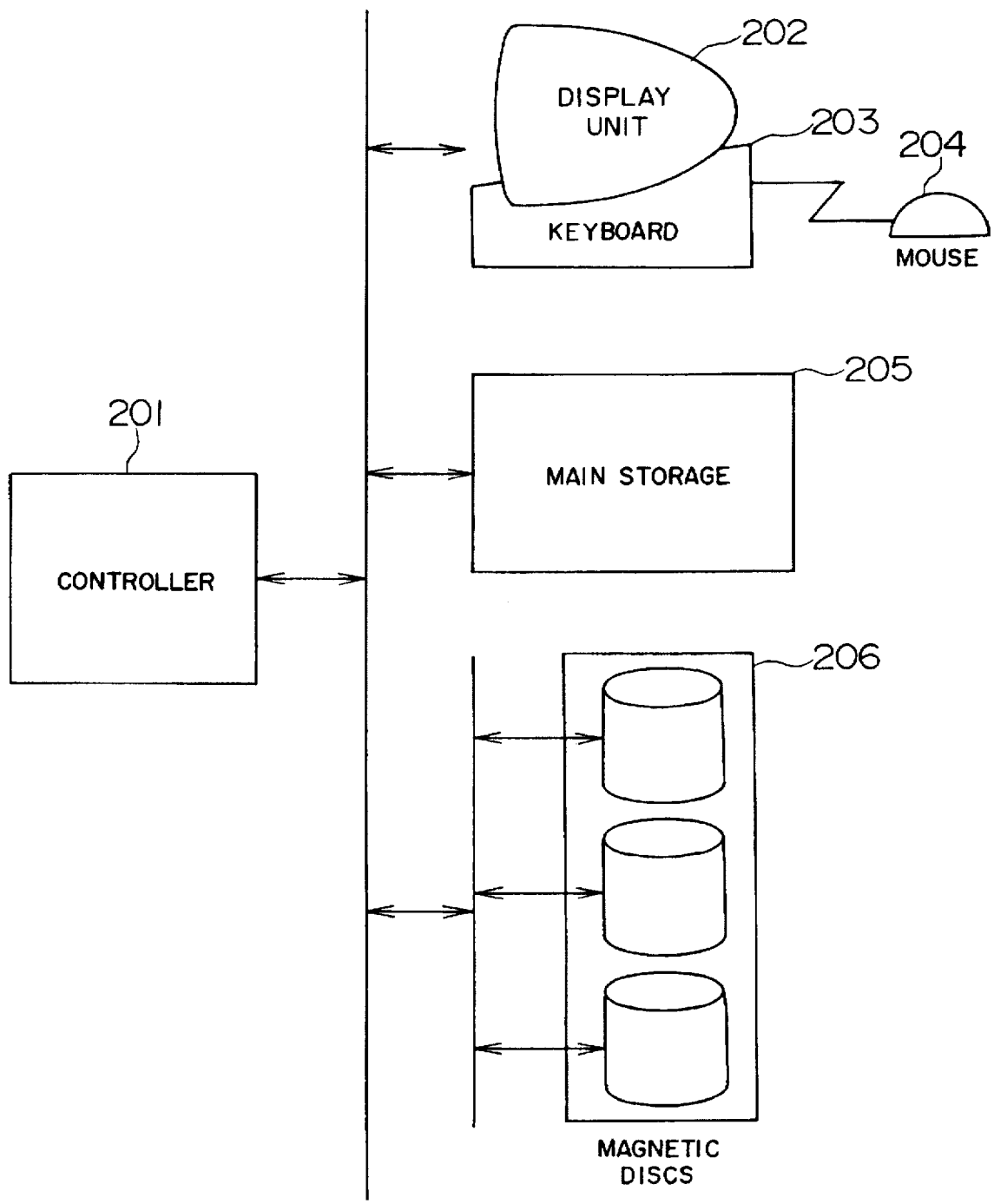
FIG. 2 is a view showing a system arrangement of a filing system using the information storage and retrieval system.

FIG. 2 is a system arrangement of an information storage and retrieval system according to an embodiment of the present invention. The system comprises a control unit 201, a main memory 205, magnetic disk units 206, a display unit 202, a keyboard 203 and a mouse 204. The system permits inputting of significant information into a knowledge base (which is stored in the magnetic disk units 206 or the like), storage of specific information or knowledge and retrieval thereof. Data are read from the knowledge base (stored in the magnetic disk units 206) and memorized in the main memory 205. Using the display unit 202, the keyboard 203 and the mouse 204, information (concerning concepts, relations and facts) registered in the knowledge base is requested as an object to be displayed, so that the retrieval result is displayed on the display unit 202. The knowledge base has Concept Network data as represented according to a predetermined representation model, that is, information concerning templates, information concerning concept dictionaries and information concerning input facts and queries. The knowledge base is stored in a text file.

The operation of the system will be outlined below by referring to FIGS. 9 through 28 (which show the data structure in the inside of the system), FIGS. 7, 8 and 29 through 52 (which show examples of displayed data) and FIGS. 53 through 72 (which show flow PAD.

Data expressing fact information are generated by referring to knowledge stored in the memory. The knowledge contains:

1) concept data,
2) template data,
3) relation data, and
4) fact data.

Figure 3:
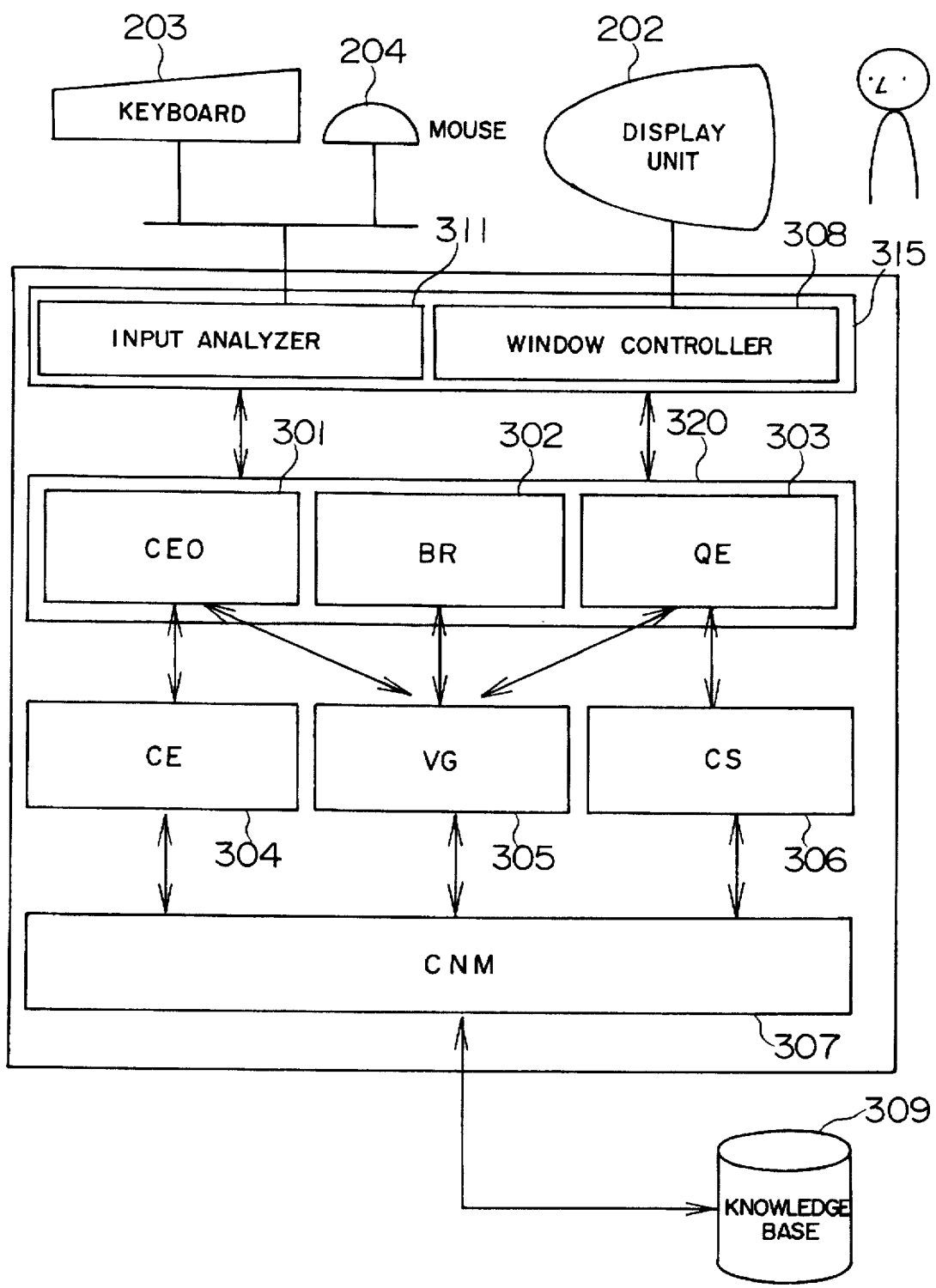
FIG. 3 is a view showing a module arrangement of the information storage and retrieval system.
Figure 4:
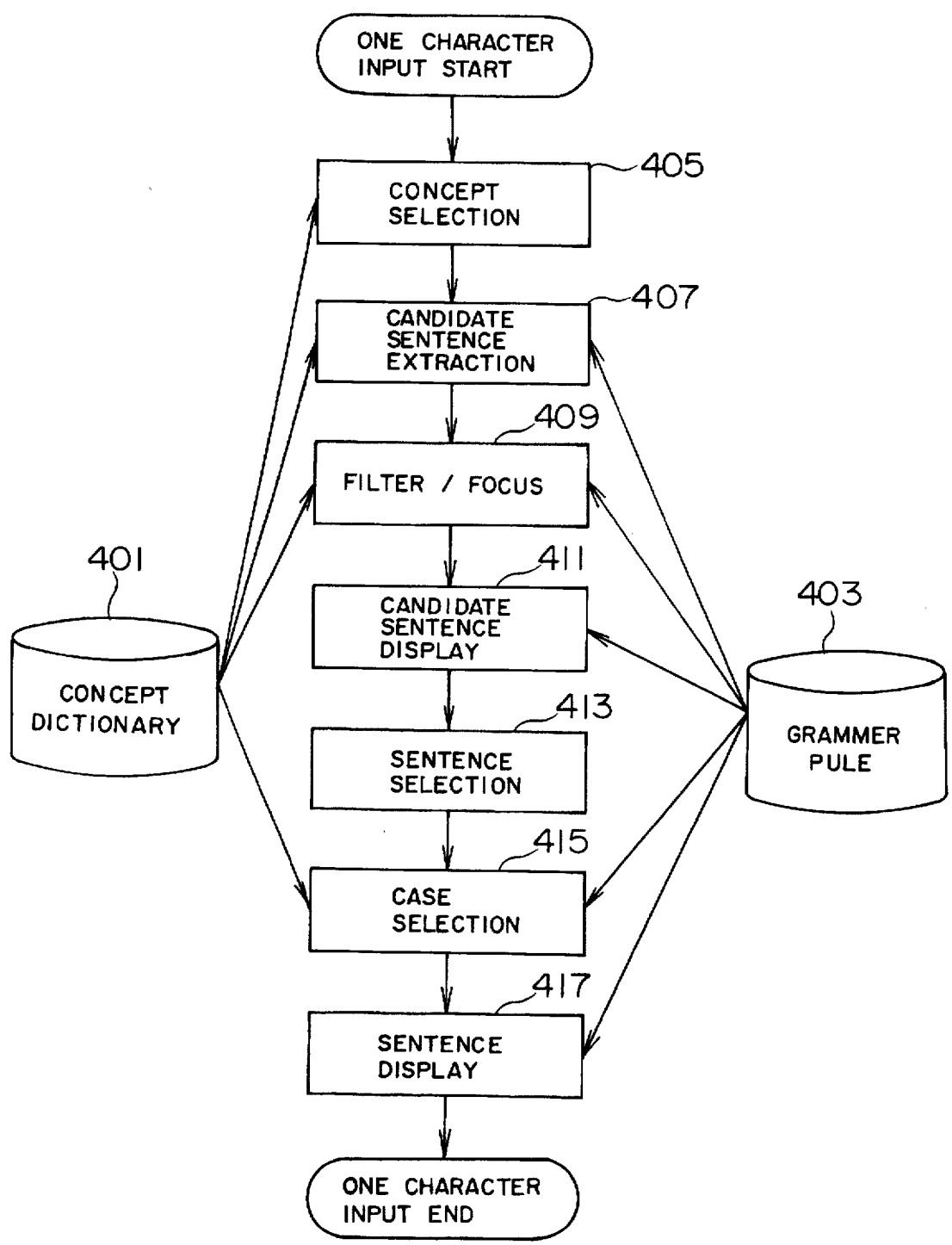
FIG. 4 is a view showing a flow of the sentence generating routine.
Figure 5:
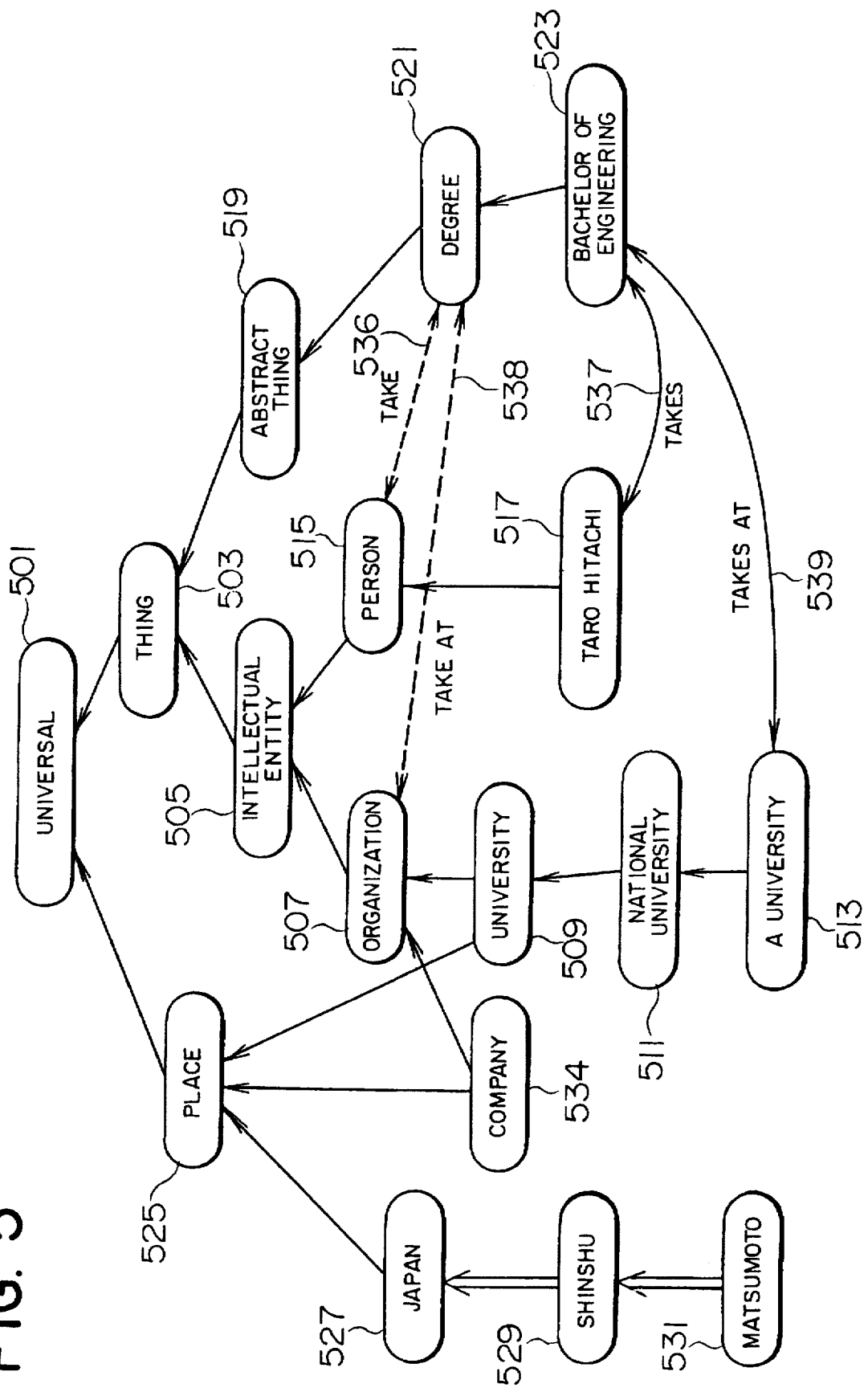
FIG. 5 is a view showing an example of conventional knowledge expression.
Figure 6:
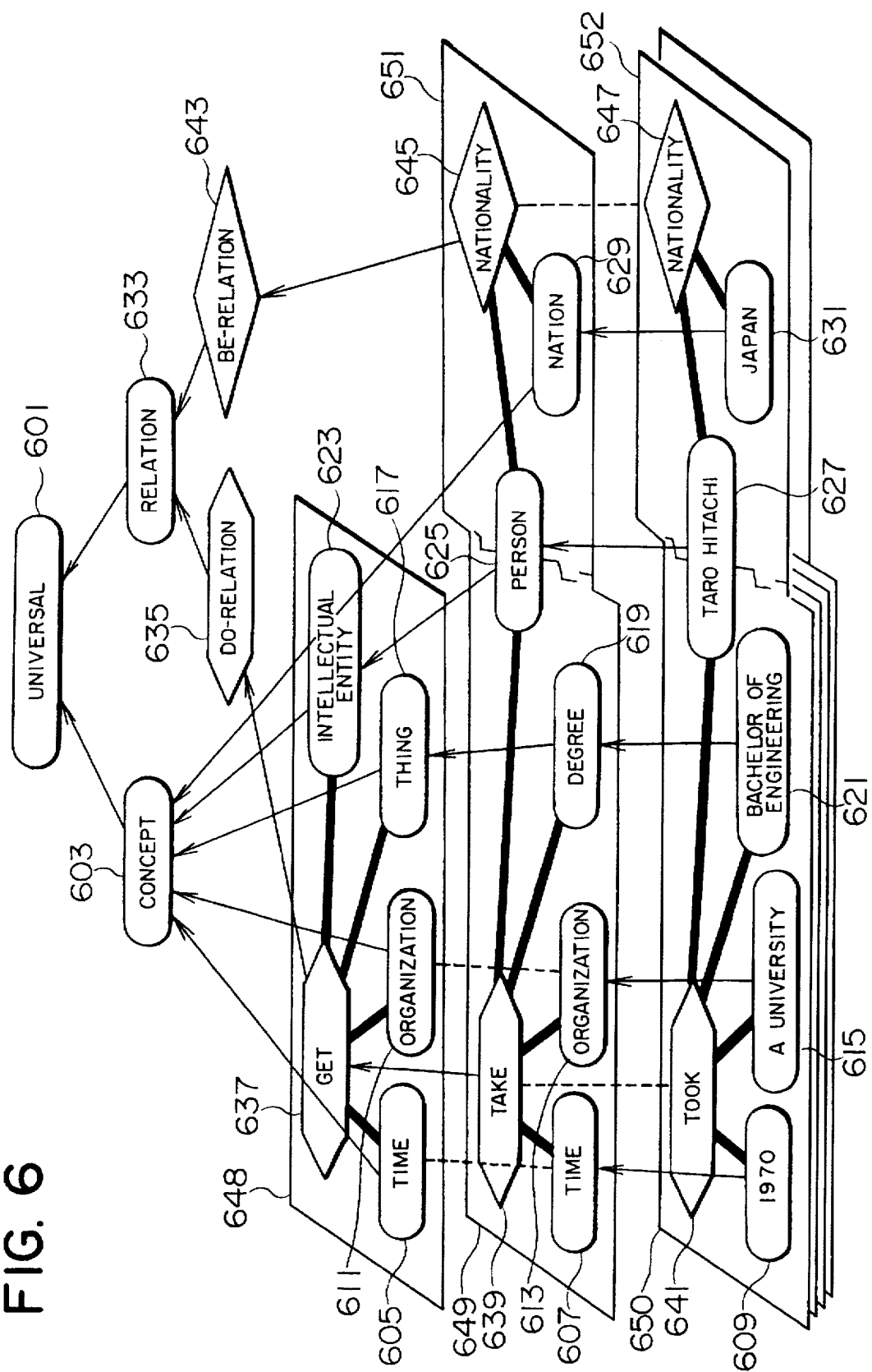
FIG. 6 is a view showing an example of knowledge expression according to the present invention.

The structures of these data will be described below. Referring to FIG. 3, text-form information stored in the knowledge base 309 is expanded on the main memory through a Concept Network Manager 307 and managed as a data structure according to a polynomial relation model.

The information is managed under ID data. The concept and relation ID data, the template ID data and the fact ID data are stored in a node management table (not shown), a template management table (not shown) and a fact management table (not shown), respectively. "Node" used herein is a general term for concepts and relations. In the following, sequencing of significant information will be described below.

5) sequencing of significant information

In this embodiment, "case link" (significant information) is classified into "attribute object (AO) case" and "attribute value (AV) case" by attribute concepts and classified into eleven, i.e., "time (TI) case", "agent (A) case", "collection in (CI) case", "recipient (R) case", "object (0) case", "collection from (CF) case", "collection to (CT) case", "reason (W) case", "instrument (I) case", "purpose (U) case" and "quantity (Q) case", by verbal concepts.

Figure 9:
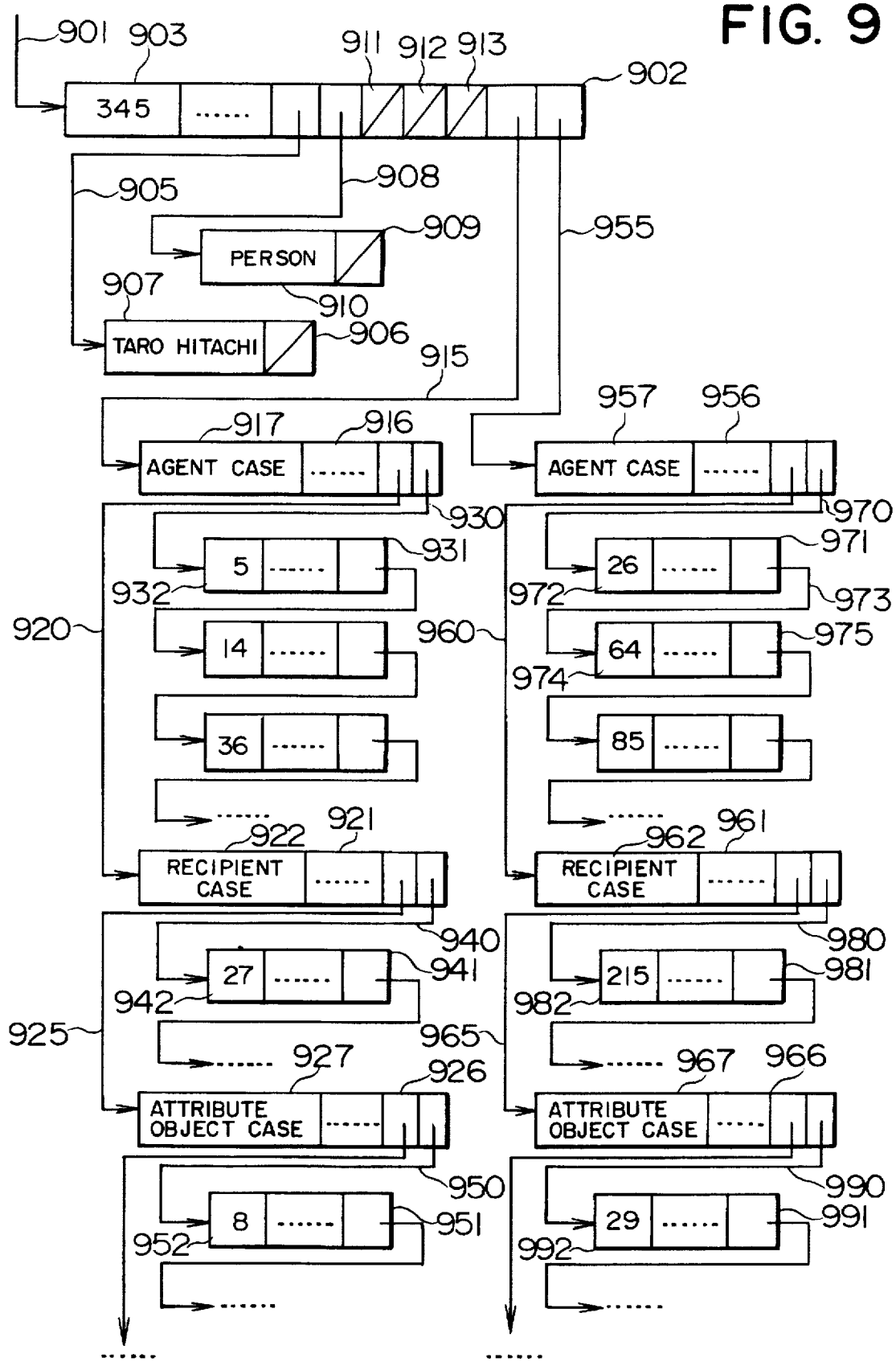
FIG. 9 is a view showing a data structure of concept information in a knowledge base.

Firstly, the data structure of concept and fact information for a concept "Taro Hitachi" is shown in FIG. 9. A concept table 902 comprises a node ID 903 for the concept "Taro Hitachi", a pointer 905 for a name table list, a pointer 908 for a super-concept table, a pointer 911 for a sub-concept table, a pointer 912 for a whole-concept table, a pointer 913 for a part-concept table, a pointer 915 for a template information table, and a pointer 955 for a fact information table. A pointer 901 from a node management table is connected to the concept table.

The name table 906 stores a string of characters "Taro Hitachi". If another expression, for example, "Hitachi, T." is registered as a synonym, another name table may be used so that the string of characters "Hitachi, T." can be stored. That is, the given concept can be stored as the two names, "Taro Hitachi" and "Hitachi, T.".

The super-concept table 909 stores "person" 910. This shows that "person" is a super concept for "Taro Hitachi". Each of the pointer 911 for the sub-concept table, the pointer 912 for the whole-concept table and the pointer for the part-concept table is NULL. This shows that "Taro Hitachi" has no sub-concept, no whole-concept and no part-concept in the knowledge base.

In the management of templates in template information tables 916, 921 and 926, templates in which the concept can be expressed as agent (A) case 917, recipient (R) case 922, attribute object (AO) case 927 or the like are classified by cases. In this embodiment, templates in which the concept "Taro Hitachi" can-be expressed as agent (A) case are templates identified by ID data 5, 14, 36, etc. Templates in which the concept "Taro Hitachi" can be expressed as recipient (R) case are templates identified by ID data 27, etc. Templates in which the concept "Taro Hitachi" can be expressed as attribute object (AO) case are templates identified by ID data 8, etc.

In the management of fact information in fact information tables 956, 961 and 966, facts really expressed by the concept are classified by cases in the same manner as in template information. In this embodiment, facts in which the concept "Taro Hitachi" is expressed as agent (A) case 956 are facts identified by ID data 26, 64, 85, etc. Facts in which the concept "Taro Hitachi" is expressed, as recipient (R) case 962 are facts identified by ID data 215, etc. Facts in which the concept "Taro Hitachi" is expressed as attribute object (AO) case 967 are facts identified by ID data 29, etc.

Figure 11:
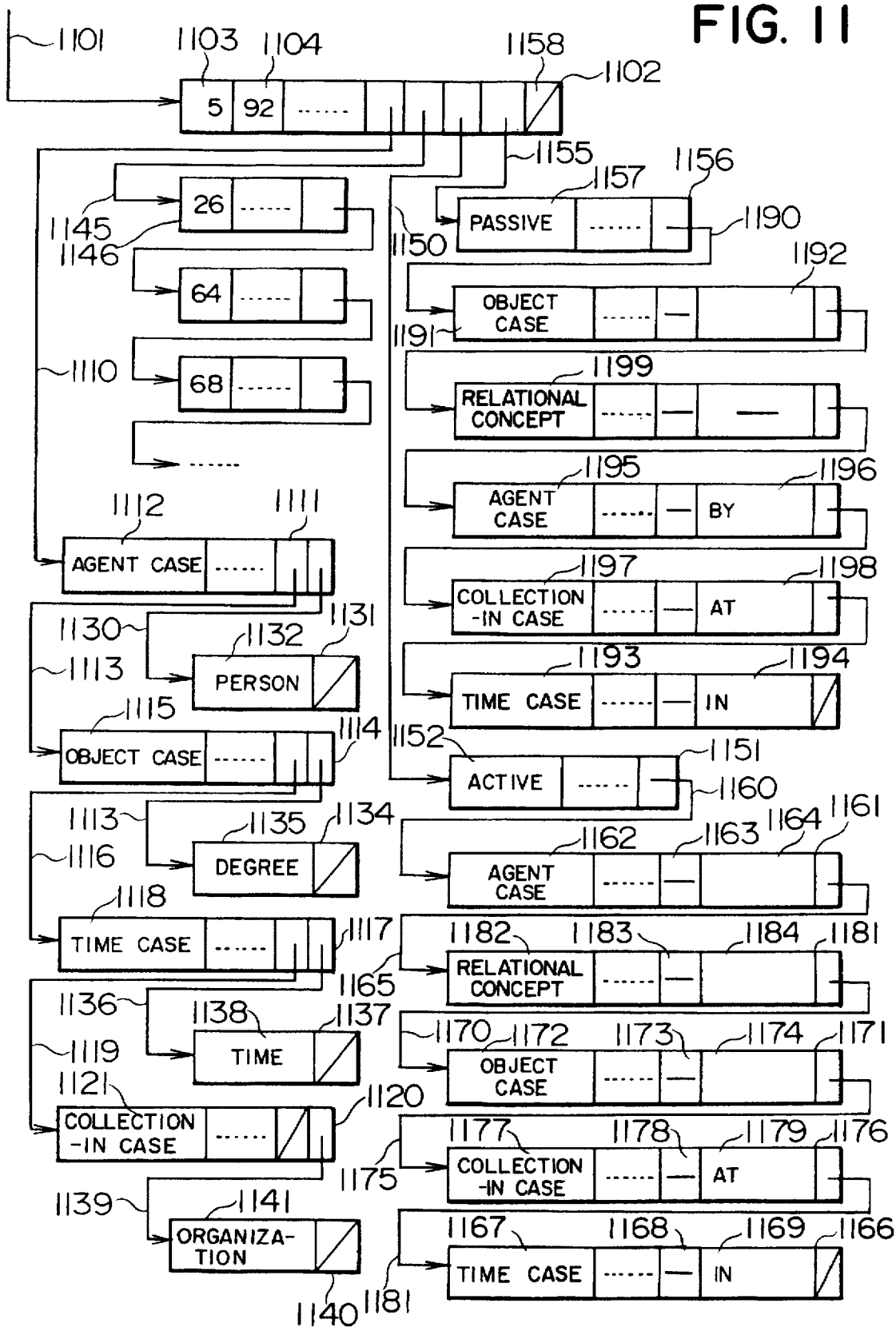
FIG. 11 is a view showing a data structure of template information for a verbal concept "take" in the knowledge base.

Secondly, the data structure of template information for a verbal concept "take" is shown in FIG. 11. A template table 1102 comprises a template ID data 1103, a node ID data 1104 for the verbal concept, a pointer 1110 for a case constraint table, a pointer 1145 for a fact-id table, and pointers 1150 and 1155 for pattern tables. A pointer 1101 from the template management table is connected to the template table.

The fact-id table 1146 stores ID data for facts expressed by the verbal concept. In this embodiment, facts to be retrieved are facts identified by ID data 26, 64, etc. Case constraint tables 1111, 1114, 1117 and 1120 are composed of cases, such as agent (A) case 1112, expressing the meaning of the verbal concept, and pointers 1130, 1133, 1136 and 1140 for case slot filler tables to manage concepts defining the cases. In this embodiment, significant information for the verbal concept "take" is classified into agent (A) case 1112, object (O) case 1115, time (TI) case 1118 and collection in (CI) case 1121. Concepts providing these cases are "person" 1132 in the agent (A) case, "degree" 1135 in the object (O) case, "time" 1138 in the time (TI) case and "organization" 1142 in the collection in (CI) case.

The pattern table is maintained so that significant information for a fact can be displayed so as to be easy to understand when the fact is expressed in the form of a sentence. Patterns for verbal facts are classified into "active" and "passive". The former is a pattern style adapted for use of the agent (A) case as a formal subject. The latter is a pattern style adapted for use of the object (O) case or the recipient (R) case as a formal subject. In the drawing, the verbal concept "take" has agent (A) case and object (O) case as significant information. Accordingly, there are two patterns, i.e., pattern 1151 using the agent (A) case as a formal subject and pattern 1155 using the object (O) case as a formal subject. The pointer 1158 for the pattern using the recipient (R) case as a formal subject is NULL.

In the pattern table 1151 using the agent (A) case as a formal subject, the sequence of cases and verbal concepts and the character strings of prepositions and postpositions added to the cases and concepts are managed. When, for example, a Japanese template "hito ga toki ni gakui wo soshiki de shutokusuru" (in English, "person takes degree at organization in time") is given, "ga", "wo" and "ni" are postpositively added to the concept "hito (person)" in the agent (A) case, the concept "gakui (degree)" in the object (O) case and the concept "toki (time)" in the time (TI) case. When, for example, an English template "person takes degree in time" is given, "in" is prepositively added to the concept "time" in the time (TI) case but nothing is added to the concept "person" in the agent (A) case and the concept "degree" in the object (O) case. That is, though a given case is used in one sense, it can be thought of that a postposition may be added to the concept expressing the case in Japanese but a preposition may be added to the concept in English and that neither postposition nor preposition may be added thereto. The judgment as to whether addition of preposition/postposition is required varies according to the language used. For the purpose of preserving the pattern information regardless of the language, a set of prepositions and postpositions is stored for each case. In this embodiment, preposition/postposition tables 1161, 1166, 1171, 1176 and 1181 are allocated in the order of agent case 1161, time case 1167, object case 1172, collection in case 1177 and relation 1182, so that these are displayed in this order. Strings of characters for prepositions/postpositions added to concepts expressing cases and relational concept are also stored in the preposition/postposition tables. In this embodiment, prepositions "at" 1178 and "in" 1168 are added to the concepts expressing the collection-in case and the time case, respectively. On the other hand, the strings of characters 1164, 1184, 1174, 1179 and 1169 for postpositions are all "-" This shows that no postposition is added to each case. The strings of characters 1163, 1183 and 1173 for postpositions are all "-". This shows that no preposition is added thereto. Accordingly, when the agent case is used as a formal subject, the template is displayed as "person takes degree in time". The pattern table 1156 using the object case as a formal subject shows that facts are displayed in the order of object case 1191, relational concept 1199, agent case 1195, collection-in case 1197 and time case 1193 and that prepositions added to concepts expressing the cases are "by" 1196, "at" 1198 and "in" 1194, respectively.

Figure 10:
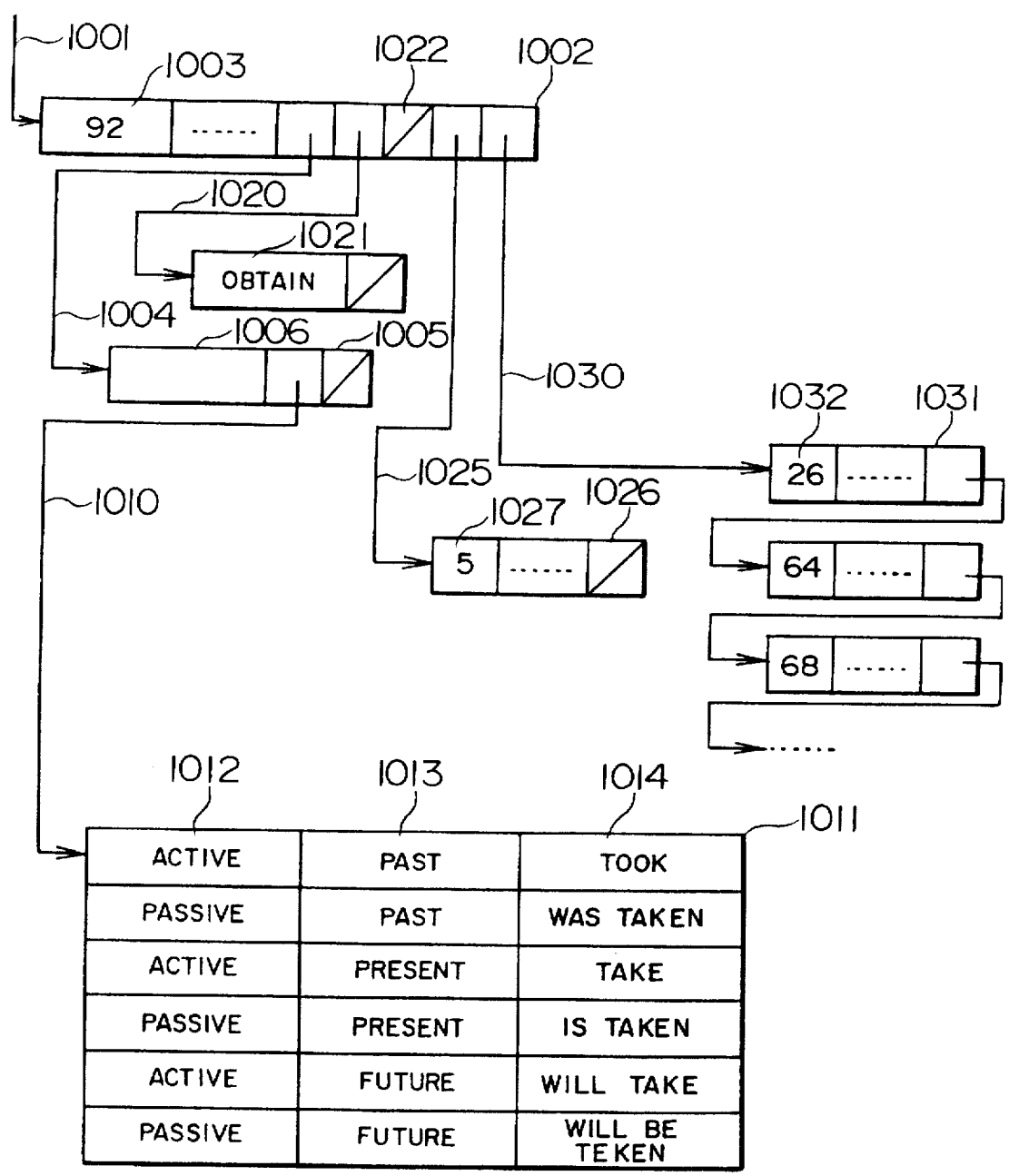
FIG. 10 is a view showing a data structure of verbal concept information in the knowledge base.

Thirdly, the data structure of concept information and fact information for a verbal concept "take" is shown in FIG. 10. A verbal concept table 1002 comprises a node ID data 1103 for the verbal concept "get", a pointer 1104 for a name table for relations, a pointer 1020 for a super-concept table, a pointer 1023 for a sub-concept table, a pointer 1025 for a template-id table, and a pointer 1030 for a fact-id table. A pointer 1001 from the node management table is connected to the verbal concept table in the same manner as in the concept table. In the drawing, the verbal concept "get" 1022 is a super concept for the verbal concept "take". The drawing further shows that the ID data 1027 for the template expressed by the verbal concept is 5 and that the ID data 1032 for facts are 26 and so on.

The name table 1005 for relations comprises a String of characters 1006 for "take", and a pointer 1010 for a name table for voice and tense. The verbal concept has different names according to (active/passive) voice and (past/present/future) tense. Accordingly, strings of characters for names given to relations classified by a set of voice and tense are managed on the name table 1011 for voice and tense. When, for example, the voice is active and the tense is past, the name for "take" is given by a string of characters "take" 1014 corresponding to the active voice 1012 and the past tense 1013 in the first line of the name table 1011 for voice and tense.

Figure 12:
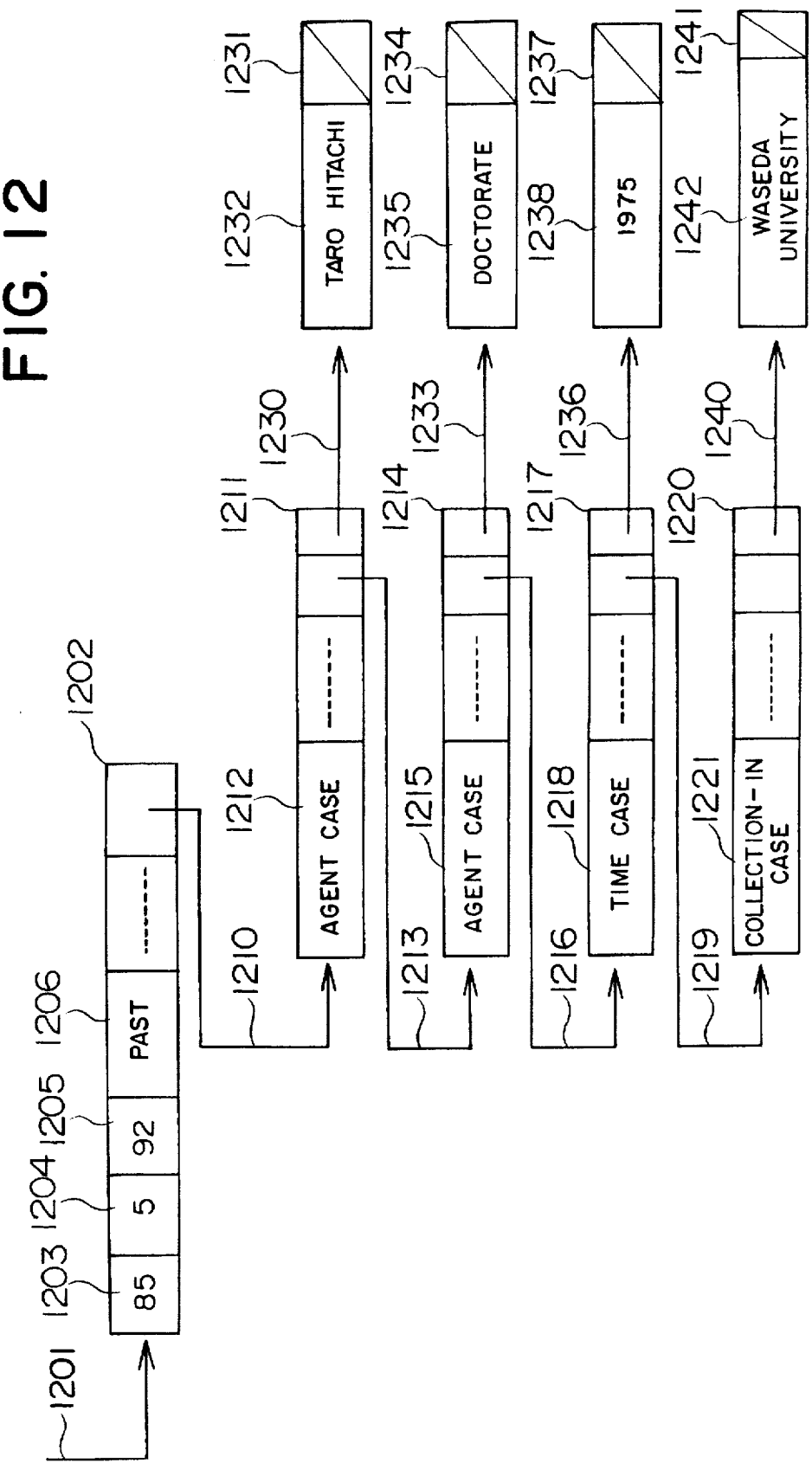
FIG. 12 is a view showing a data structure of fact information "Taro Hitachi took doctorate at University A in 1975" expressed by a verbal concept in the knowledge base.

Fourthly, the data structure of fact information for a verbal fact expressed on the basis of concept, verbal concept and template information preserved as described above is shown in FIGS. 12 and 13. FIG. 12 shows the data structure of the following fact:

"Taro Hitachi took doctorate at University B in 1975".

A fact information table 1202 comprises a fact ID data 1203, a template ID data 1204, a node ID data 1205 for a verbal concept, a tense data 1206, and a pointer 1210 for a case information table. A pointer 1201 from the fact management table is connected to the fact information table.

The case information table 1211 comprises a case name 1212, and a pointer 1230 for a case filled concept table for the case. For example, "Taro Hitachi" 1232, "doctorate" 1235, "1975" 1238 and "University B" 1241 are concepts expressing agent case 1212, object case 1215, time case 1218 and collection-in case 1221, respectively.

Figure 13:
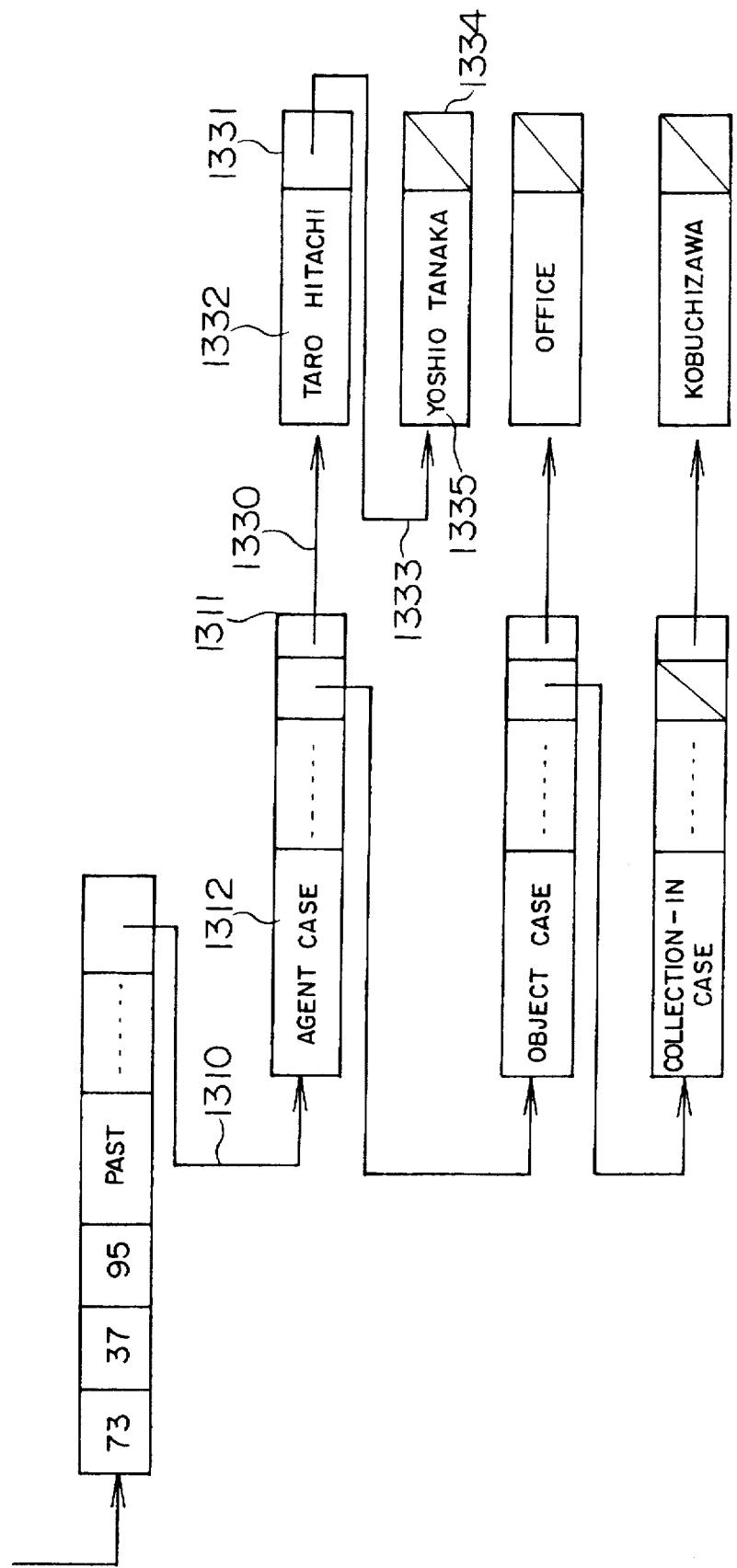
FIG. 13 is a view showing a data structure of fact information "Taro Hitachi and Taro Tanaka established office at Kobuchizawa" expressed by a verbal concept in the knowledge base.

When one case is expressed by a plurality of concepts, for example, when a fact "Taro Hitachi and Yoshio Tanaka established office in Kobuchizawa" is written, a plurality of case filled concept tables are allocated for one case information table (see FIG. 13). In the drawing, case filled concept tables 1331 and 1334 for "Taro Hitachi" 1332 and "Yoshio Tanaka" 1335 are allocated for one case information table 1311 expressing agent case 1302.

Figure 14:
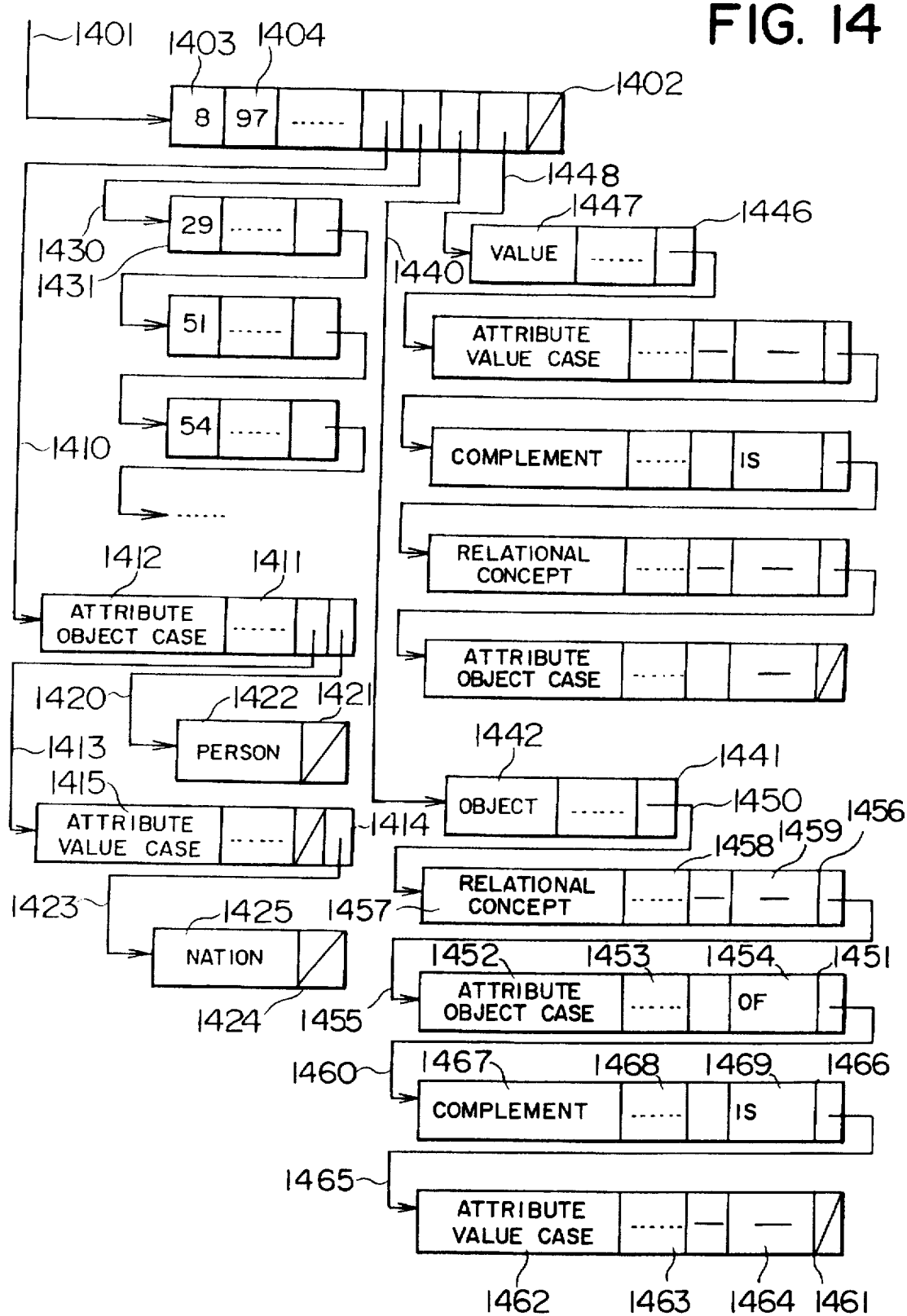
FIG. 14 is a view showing a data structure of template information for an attribute concept "nationality" in the knowledge base.
Figure 15:
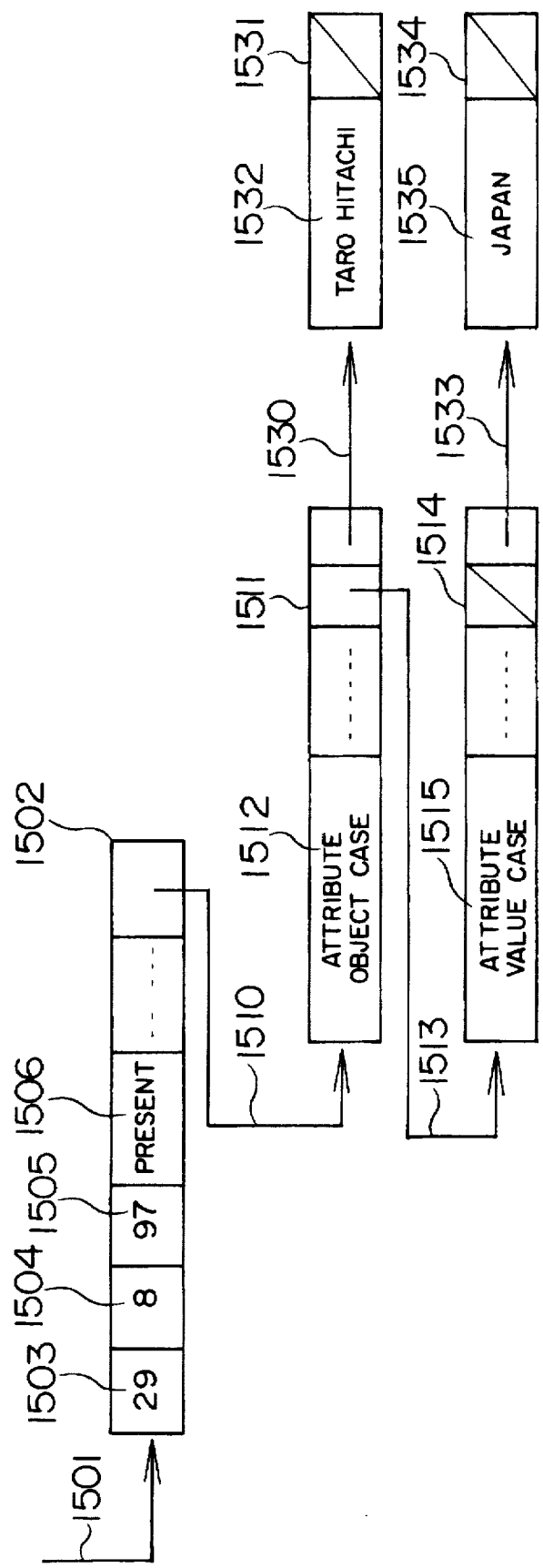
FIG. 15 is a view showing a data structure of fact information "Nationality of Taro Hitachi is Japan" expressed by an attribute concept in the knowledge base.
Figure 16:
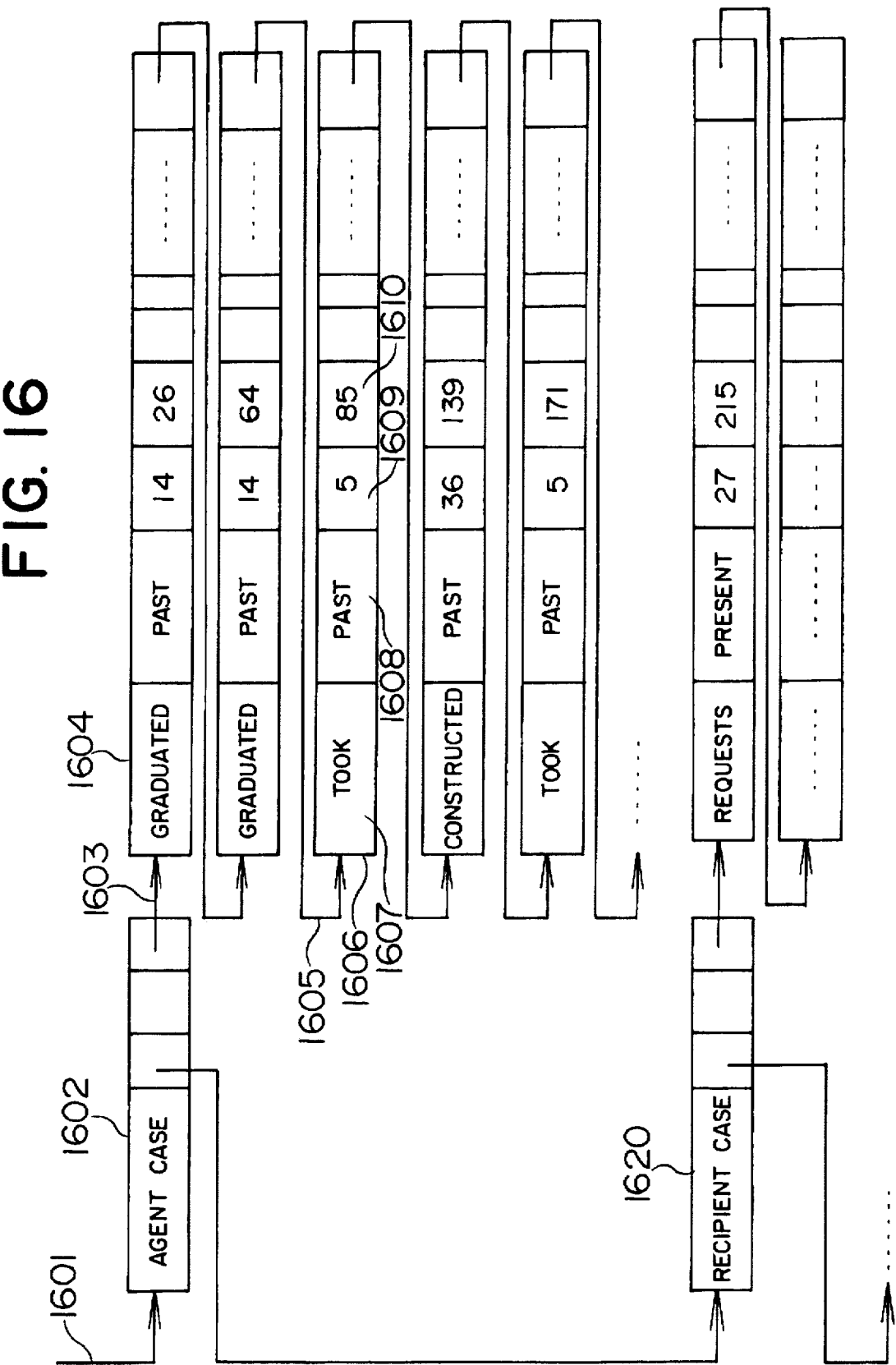
FIG. 16 is a view showing a data structure in which verbal facts expressed by a pointed concept "Taro Hitachi" are developed on a memory by reference to the semantic priority order of cases.
Figure 17:
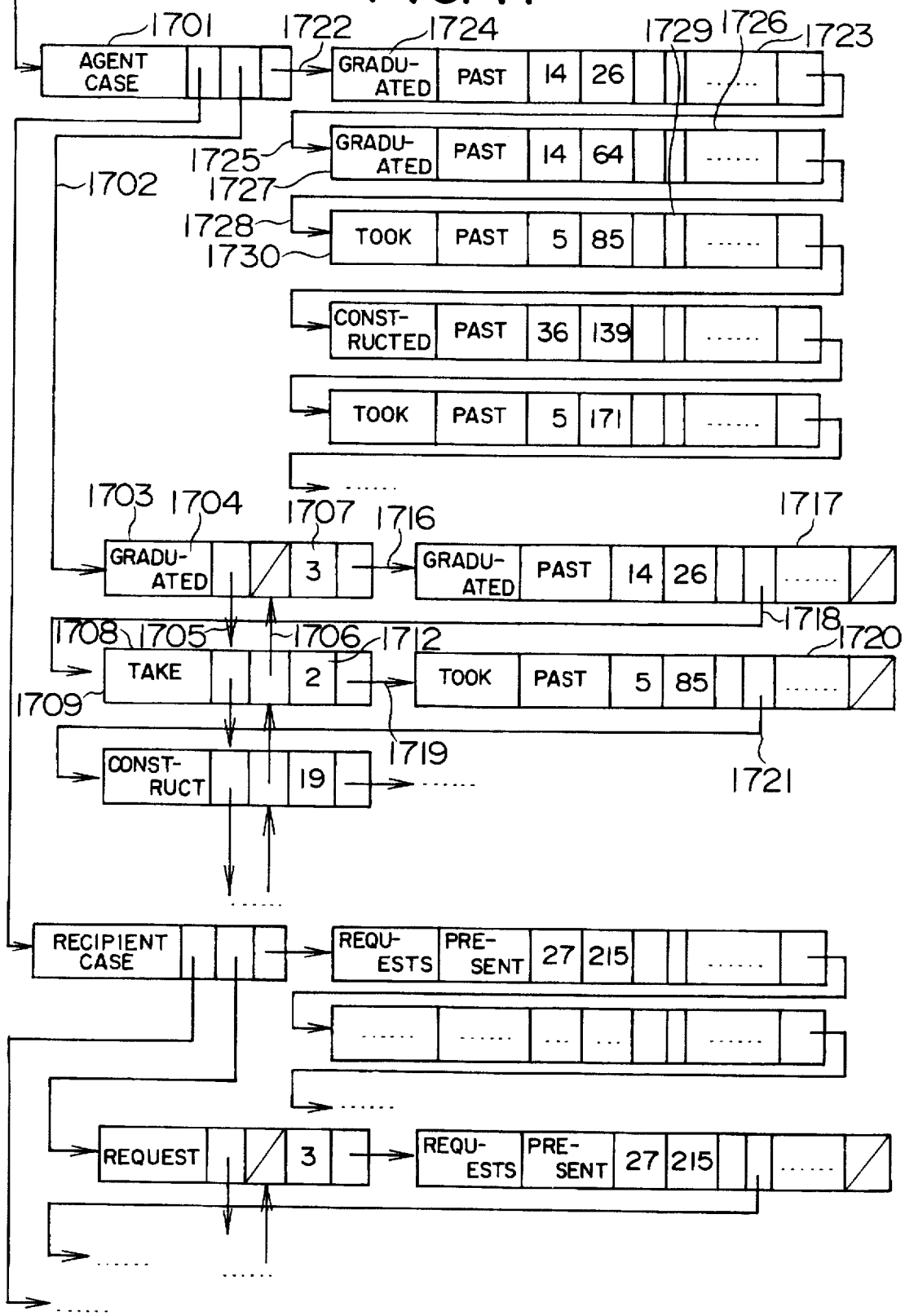
FIG. 17 is a view showing a data structure in which view data of representative facts are reconstructed by grouping developed facts by verbal concepts.
Figure 18:
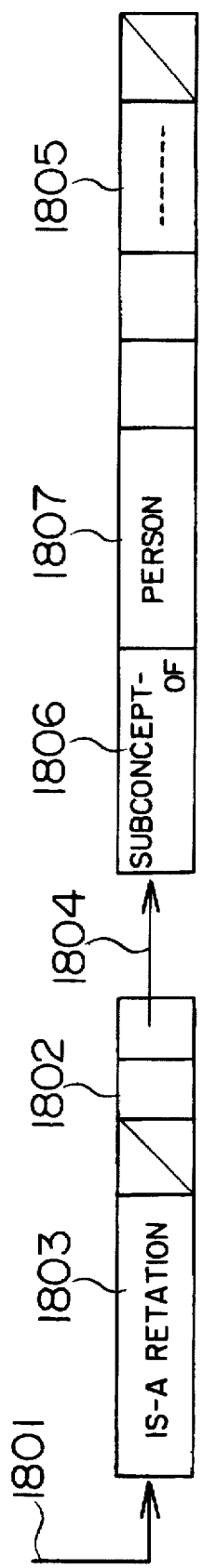
FIG. 18 is a view showing a data structure in which super concepts are developed on a fact information view memory.

On the other hand, concept information, template information and fact information for an attribute concept can be expressed by data structures similar to those for the verbal concept. For example, the data structure of template information for an attribute concept "nationality" is shown in FIG. 14. Like the template information for the verbal concept, a template table 1402 comprises a template ID data 1403, a node ID data 1404 for the attribute concept, a pointer 1410 for a case constraint table, a pointer 1435 for a fact-id table, and pointers 1440 and 1445 for pattern tables. A pointer 1401 from the template management table is connected to the template table.

The attribute concept always has two cases (attribute object case and attribute value case) as significant information. Accordingly, the case constraint tables 1411 and 1414 are allocated for the attribute object case 1412 and the attribute value case 1415. In the drawing, concepts providing these cases are "person" 1422 in the attribute object case and "nation" 1425 in the attribute value case.

The attribute fact pattern is classified into two, namely, object and value. The former is a pattern using the attribute object case as a formal subject. The latter is a pattern using the attribute value case as a formal subject. As described above, the attribute concept always has two cases, i.e., attribute object case and attribute value case, as significant information. Accordingly, the attribute concept has two patterns which are referred to as pattern 1441 using the attribute object case as a formal subject and pattern 1446 using the attribute value case as a formal subject. In the pattern using the attribute object case as a formal subject, the relational concept 1457, the attribute object case 1452, the complement 1467 and the attribute value case 1462 are allocated to the preposition/postposition tables 1456, 1451, 1466 and 1461 in order. The word "complement" used herein means a string of characters for complementing the significant structure among the attribute concept and the two case slot fillers when an attribute fact is expressed in the form of a sentence. In this embodiment, "of" and "is" are used as a preposition added to the concept of the attribute object case and a complement, respectively. On the other hand, the strings of characters 1458, 1459, 1454, 1469, 1463 and 1464 for prepositions/postpositions are all "-". This shows that the prepositions/postpositions are not added thereto. Accordingly, the template using the attribute object case as a formal subject is expressed as "nationality of person is nation".

The data structure of fact information for an attribute fact expressed on the basis of concept, attribute concept and template information preserved as described above is shown in FIG. 15. This drawing shows the data structure of the following fact:

"nationality of Taro Hitachi is Japan".

Like the data structure of the verbal fact, the data structure comprises a fact information table 1502, a fact ID data 1503, a template ID data 1504, a node ID data 1505 for an attribute concept, a tense information 1506, and a pointer 1510 for a case information table. A pointer 1501 from the fact management table is connected to the fact information table.

Like the case information table for the verbal fact, the case information table 1511 comprises a case 1512 expressing a fact, and a pointer 1530 for a case filled concept table in the case. For example, the concepts expressing the attribute object case 1512 and the attribute value case 1515 are "Taro Hitachi" and "Japan", respectively.

Fifthly, the sequencing of significant information will be described below. When facts in fact information in which a concept is registered are to be displayed in order of importance of the concept, the importance of the case expressing a sense is required to be referred to. Therefore, sequencing of significant information is performed so that the information is memorized in the form of a list of binary trees. Specifically, sequencing of cases with respect to the verbal concept is performed in order of agent case, object case, recipient case, ... so that the cases are stored in the list of binary trees. Sequencing of cases with respect to the attribute concept is performed in order of attribute object case and attribute value case so that the cases are stored in the list of binary trees. Hereinafter, the list is called "case priority list".

The display of fact information for a concept will be described below as a first embodiment according to the display method of the present invention. A method of generating display data by referring to fact information for a concept stored in a memory will be described below.

When a user clicks a concept in a node tree and then selects an item from a function list in a pop-up menu displayed, a fact window is displayed.

For example, a fact window (see FIG. 7) for a concept "Taro Hitachi" is displayed as follows. When a user clicks a concept "Taro Hitachi" in the displayed node tree through a mouse in step 5300 (see FIG. 53), the system takes a mouse event in step 5310 and detects a node ID data of a node corresponding to the clicked area in step 5320. Then, in step 5330, the kind of the node is judged by inquiring of the knowledge base in the Concept Network Manager on the basis of the node ID data detected in the step 5320. In step 5340, a pop-up menu corresponding to the kind of the node thus judged is displayed. In step 5350, the user selects an item from a function menu displayed as the pop-up menu and then the situation of the routine goes to step 5400. In step 5410 (see FIG. 54), a judgment is made as to whether the fact window required has been already displayed. When the window has not been displayed yet, fact information in which nodes have been registered is extracted from the knowledge base according to the kind of the node judged in the step 5330, to thereby generate display data. In this embodiment, the kind of the node is concept, so that the situation of the routine goes to step 5500.

Initially, in step 5510, a list of fact ID data for verbal fact to be displayed and a total number counter are initialized and, in step 5515, a list of fact ID data for attribute fact to be displayed and a total number counter are initialized.

In step 5520, a case which is a head data is picked up from a case priority list for a verbal concept. The data is agent case. The pointer of the list is not NULL, so that the situation of the routine goes to step 5525. In this step, a judgment is made as to whether there is any verbal fact accumulated as agent case, while tracing the pointer 901 (see FIG. 9) from the node management table to the concept table for the concept and the pointer 955 to the fact information table on the basis of the node ID data for the concept "Taro Hitachi". There is some fact in which "Taro Hitachi" is registered in the agent case, so that the situation of the routine goes to step 5600.

Then, in step 5610 (see FIG. 56), the case management table 1602 is allocated (see FIG. 16) so that the pointer 1601 from the fact window table is connected to the case management table.

Then, a view table 1604 for fact is generated to store information to display a fact therein, so that the pointer 1603 from the case management table is connected to the view table 1604. The view table for fact comprises a fact ID data 1610, a template ID data 1609 of a verbal concept for the fact, a tense 1608 of a relational concept, a relational name 1607, a display/not-display flag, a positional data, and a pointer for a view table for case. Counters provided correspondingly to the number of facts in which "Taro Hitachi" is registered as agent case are initialized and then the situation of the routine goes to step 5620. There is some fact expressed by "Taro Hitachi", so that the situation of the routine goes to step 5625. In the step 5625, the fact ID data 972 stored in the table 971 is referred to while tracing the pointer 970 from the fact information table 956 for the agent case to the fact-id table (see FIG. 9). Then, a list of binary trees is allocated so separately that the fact ID data is stored as a head data in the list. Then, the fact ID data 975 in the next fact-id table 974 is referred to and stored as the next data in the list of binary trees. Thus, a list of binary trees of fact ID data for verbal facts in which "Taro Hitachi" is registered as agent case is generated.

Then, in step 5630, a judgment is made as to whether the fact ID data in the list of binary trees generated in the step 5625 is contained in the list of fact ID data for the verbal fact to be displayed. In this embodiment, there is no overlapped fact ID data, so that the situation of the routine goes to step 5640. In this step, the list of fact ID data (or the list obtained by excluding the fact ID data in step 5635 when there is any overlapped fact ID data) generated in the step 5625 is added to the list of fact ID data for the fact to be displayed.

Then, in step 5645, the number of retrieved facts is added to the counter expressing the total number of verbal facts.

Then, the situation of the routine goes to step 5650. In this embodiment, the concept "Taro Hitachi" has no subconcept, so that the situation of the routine goes to step 5680.

Then, in step 5685, verbal concept information, template ID data, fact ID data, tense information and so on are stored in a corresponding view table for fact on the basis of the list of binary trees. When, for example, the fact identified by the fact ID data 85 is the third data in the list of binary trees, the ID data is stored in the fact ID area 1610 in the view table 1606 allocated as the third view table for fact (see FIG. 16). Then, the pointer 1201 to a fact information table 1202 corresponding to the fact ID data is traced by referring the fact management table (see FIG. 12). Further, template ID data and tense information are respectively stored in the template ID area 1609 and the tense information area 1608 in the view table for fact by referring the template ID data 1204 and the tense information 1206. The pointer to a verbal concept table 1002 corresponding to the ID data by referring to the node management table after referring to the verbal concept ID data 1205 (see FIG. 10). The pointer 1004 from the table 1002 to a name table for relations is traced so that the name "take" 1006 relational to the verbal concept is referred-to. The relational name is stored in the relation name area 1607 in the view table 1606 for fact, whereafter the situation of the routine goes back to the step 5680.

This procedure is repeated before the pointer of the list of binary trees of the fact ID data for facts in which "Taro Hitachi" is registered as agent case changes to NULL. Thus, a corresponding view table for fact is generated.

After the view table for fact with respect to agent case is generated as described above, view tables for fact are generated in order of the priority of cases, for example, in order of the object case, the recipient case, . . . .

The situation of the routine goes back to the step 5520, so that the step 5525 is carried out with respect to the object case. Because the concept "Taro Hitachi" has no fact registered as object case, the situation of the routine goes back to the step 5520 without generation of the case management table for object case. Then, a case management table 1620 for recipient case is generated because the fact for recipient case is registered (see FIG. 16). The view tables for fact with respect to verbal facts registered as respective cases are allocated as described above, whereafter the situation of the routine goes back to the step 5535. The number of verbal facts is stored in the fact window table.

Then, the situation of the routine goes to step 5700 (see FIG. 57) in which the view tables for fact are classified into groups by verbal concepts to reconstruct the list. Specifically, in step 5710, the pointer from the case management table to a view table for fact is traced (see FIG. 17). Because the pointer is not NULL, the situation of the routine goes to step 5720.

In this step, facts are classified into groups by verbal concepts. Initially, in step 5725, by referring to the verbal concept "take" in the view table 1723 for fact, a judgment is made as to whether there is any case order table allocated for the verbal concept. Because there is no table allocated, the situation of the routine goes to step 5760. The case order table 1703 is allocated for the verbal concept so that the pointer 1702 from the case management table is connected to the table 1703.

The case order table 1703 comprises a pointer 1716 to a view table for a fact expressed by the same verbal concept, the number 1707 of the facts, and forward and backward pointers 1705 and 1706 between case order tables and so on. Facts corresponding to the view table for fact to which the pointer from the case order table is connected are displayed when the window is displayed initially.

In the display of fact information for the concept "Taro Hitachi" in this embodiment, it is now assumed that the number of verbal facts registered is larger than a threshold. In this case, a representative fact is automatically selected by the system and displayed. In this embodiment, a method of generating view tables for fact in order of accumulation on the knowledge base to select facts in order of the tables is described.

A new view table 1717 for fact is allocated so that the pointer 1716 from the case order table is connected to the view table 1717. The verbal concept "graduate" is stored in an area 1704 corresponding to the case order table 1703. Then, in step 5765, the display/not-display flag in the view table 1717 for fact is turned to "display". In step 5770, the number 1707 of facts expressed by the same verbal concept is added, whereafter the situation of the routine goes back to the step 5710.

The pointer 1725 to the next view table for fact is then traced to detect in step 5720 whether the verbal concept "graduate" 1727 in the view table 1726 for fact overlaps the verbal concept in the case order table allocated currently. Because the two concepts overlap each other, the situation of the routine goes to step 5770. In the step 5770, the number 1707 of facts in a corresponding case order table is added, whereafter the situation of the routine goes back to the step 5710.

In this embodiment, the number of verbal facts is larger than the threshold. Accordingly, facts in the view table 1717 connected to the case order table 1703 for the concept "graduate" are selected.

The pointer 1728 to the next view table for fact is further traced to detect in step 5720 whether the verbal concept "take" 1730 in the view table 1729 overlaps the verbal concept in the case order table allocated currently. Because the verbal concept in the case order table is only "graduate" 1704, the situation of the routine goes to step 5760. In the step 5760, a new case order table 1708 is allocated, so that the verbal concept "take" 1730 in the view table 1729 for fact is stored in the case order table 1708. Further, in the step 5760, the display/not-display flag is turned to "display" and, in the step 5770, the number 1712 of facts is added. Further, a new view table 1720 for fact is allocated so that fact information is stored therein. The pointer from the case order table 1719 is connected to the view table 1720 for fact. Further, case order tables are connected by the forward and backward pointers 1705 and 1706. This procedure is repeated to generate case order tables and view tables for fact for initial display.

Here, the number of facts expressed by the same verbal concept is as follows. The number of facts expressed by "graduate" is 3. The number of facts expressed by "take" is 2. The number of facts expressed by "build" is 19. Further, the last view table 1717 for fact for initial window in one verbal concept is connected to the case order table in the next verbal concept by the pointer 1718. Facts to be displayed are thus classified into groups and selected.

As another selection method, verbal concepts may be selected in the order of the number of facts registered with respect to the verbal concepts, in the order of frequency in use for reference or in the alphabetical order of name for verbal concepts. Facts classified by the same verbal concept may be selected in the order of importance of cases registered, in the order of the number of concepts registered in the cases, the order of frequency in use for reference or in the alphabetical order of name for concepts.

After facts to be displayed are selected as described above, in step 5780, number temporarily effective in the fact window is given to each fact. For example, the facts are numbered so that number "1" is given to the fact selected by "graduate" 1704 and that number "4" obtained by adding the number (three) of facts expressed by "graduate" 1704 thereto is given to the fact selected by "get" 1709.

Verbal facts are displayed in the verbal fact area in the form of a sentence and, on the other hand, attribute facts in which is-a relation, part-whole relation and the concept are registered as attribute object case and attribute facts in which the concept is registered as attribute value case are successively displayed in tabular form in the attribute fact area.

Initially, in step 5540 (see FIG. 55), information of super concepts with respect to the concept "Taro Hitachi" is extracted. Specifically, the pointer 901 (see FIG. 9) from the node management table to the concept table for the concept "Taro Hitachi" and the pointer 908 to the super-concept table are traced on the basis of the node ID data for the concept to thereby refer to the concept ID data 910 in the table 909. Then, the case management table 1802 is allocated so that the pointer 1801 from the fact window table is connected to the case management table 1802. A flag "is-a" expressing is-a relation, instead of the case, is stored in the case area 1803. Then, the view table 1805 for fact is allocated so that the pointer 1804 from the case management table is connected thereto. The view table for fact comprises attribute concepts, and other case slot fillers for attribute facts and so on. The is-a relation is a linkage relation which is different from the attribute concept as a node. Accordingly, "subconcept-of" (or "is-a") 1806 expressing a super-concept item name and "person" 1807 which is a super concept are stored in the attribute concept area and the area of the concept expressing the other attribute case, i.e., the attribute value case, respectively.

Then, in step 5575, a judgment is made as to whether there is any whole-concept. When there is some whole-concept, in step 5550, a data for displaying a fact is extracted from the list of binary trees in the same manner as in the is-a relation. The item name used herein is "part-of". In this embodiment, there is no whole-concept in the knowledge base with respect to the concept "Taro Hitachi". Accordingly, the situation of the routine goes to step 5555.

In this step, a case as a head data in the case priority list for attribute concepts is obtained. The data is attribute object case. Because the pointer of the list is not NULL, the situation of the routine goes to step 5560. A judgment is made as to whether there is any attribute fact in which "Taro Hitachi" is registered as attribute object case. Because there is some fact, the situation of the routine goes to step 5800.

In step 5810 (See FIG. 58), the case management table 1909 is allocated so that the pointer 1908 from the case management table for is-a relations is connected to the case management table. Further, counters corresponding to the number of facts registered as attribute object case in the case area 1910 are initialized and then the situation of the routine goes to step 5825.

In this step, a list of binary trees of fact ID data for facts in which the concept is registered as the case is generated in the same manner as in the verbal facts. When there is some fact ID data overlapping between the list of fact ID data for the next attribute fact and the list of binary trees, the overlapping fact ID data is excluded in step 5835 and added to the list of fact ID data for the fact to be displayed in step 5840. In step 5845, the number of retrieved facts is added to the counter expressing the number of attribute facts and then the situation of the routine goes to step 5850. As described above, there is however no part-concept with respect to "Taro Hitachi". Accordingly, the situation of the routine goes to step 5880.

Then, in step 5885, attribute concept information, template ID, fact ID and so on are stored in a corresponding view table for fact on the basis of the list of binary trees, whereafter the situation of the routine goes back to the step 5880.

After the view table for fact with respect to the attribute object case is thus generated, the situation of the routine goes back to the step 5520 in which the table with respect to the attribute value case is generated.

Figure 19:
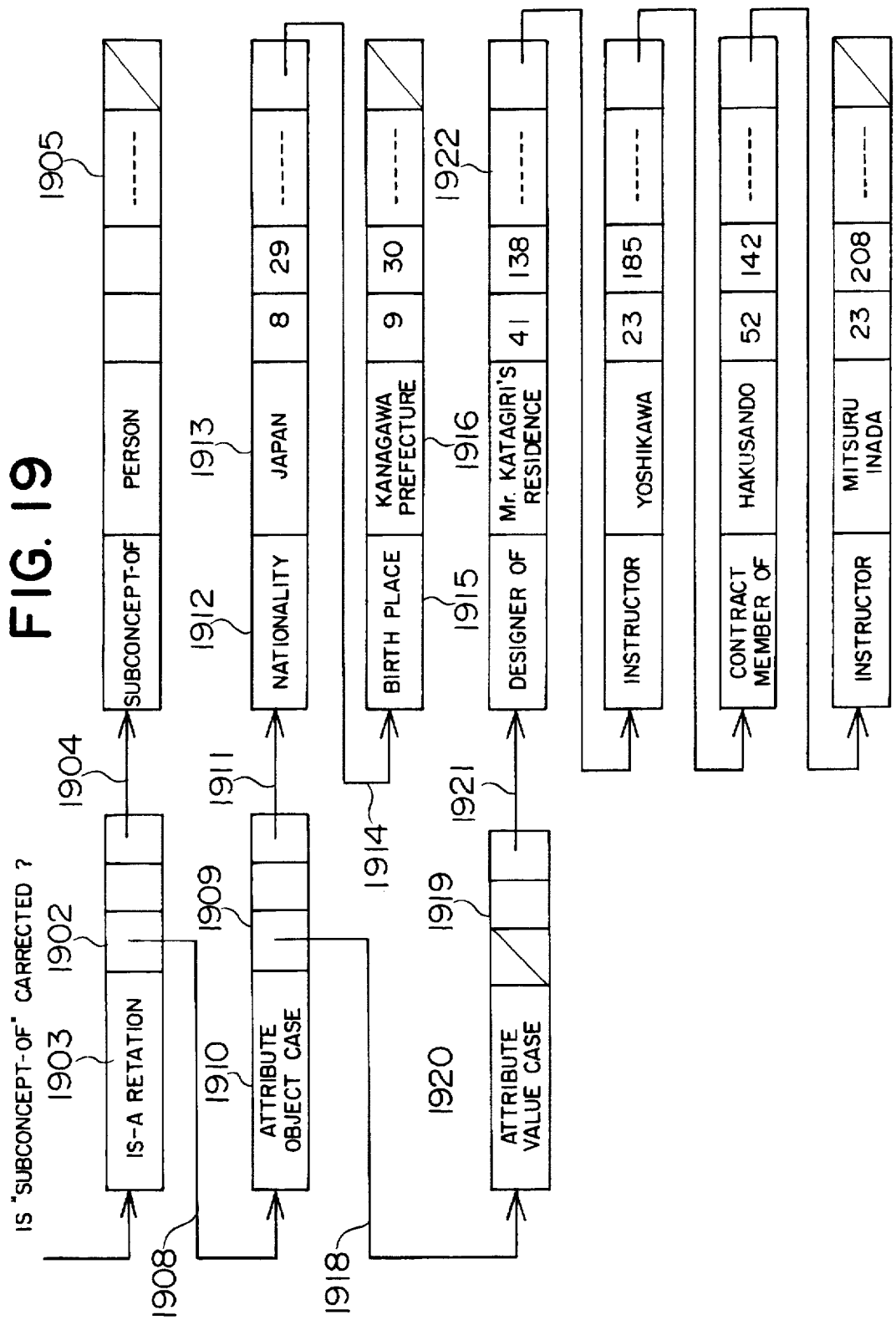
FIG. 19 is a view showing a data structure in which attribute facts expressed by a pointed concept are extracted by reference to the semantic priority order of cases and developed to be added to the data structure of FIG. 18.

Then, the situation of the routine goes to step 5570 in which the number of attribute facts is stored in the fact window table. The structure of data thus generated is shown in FIG. 19.

Figure 20:
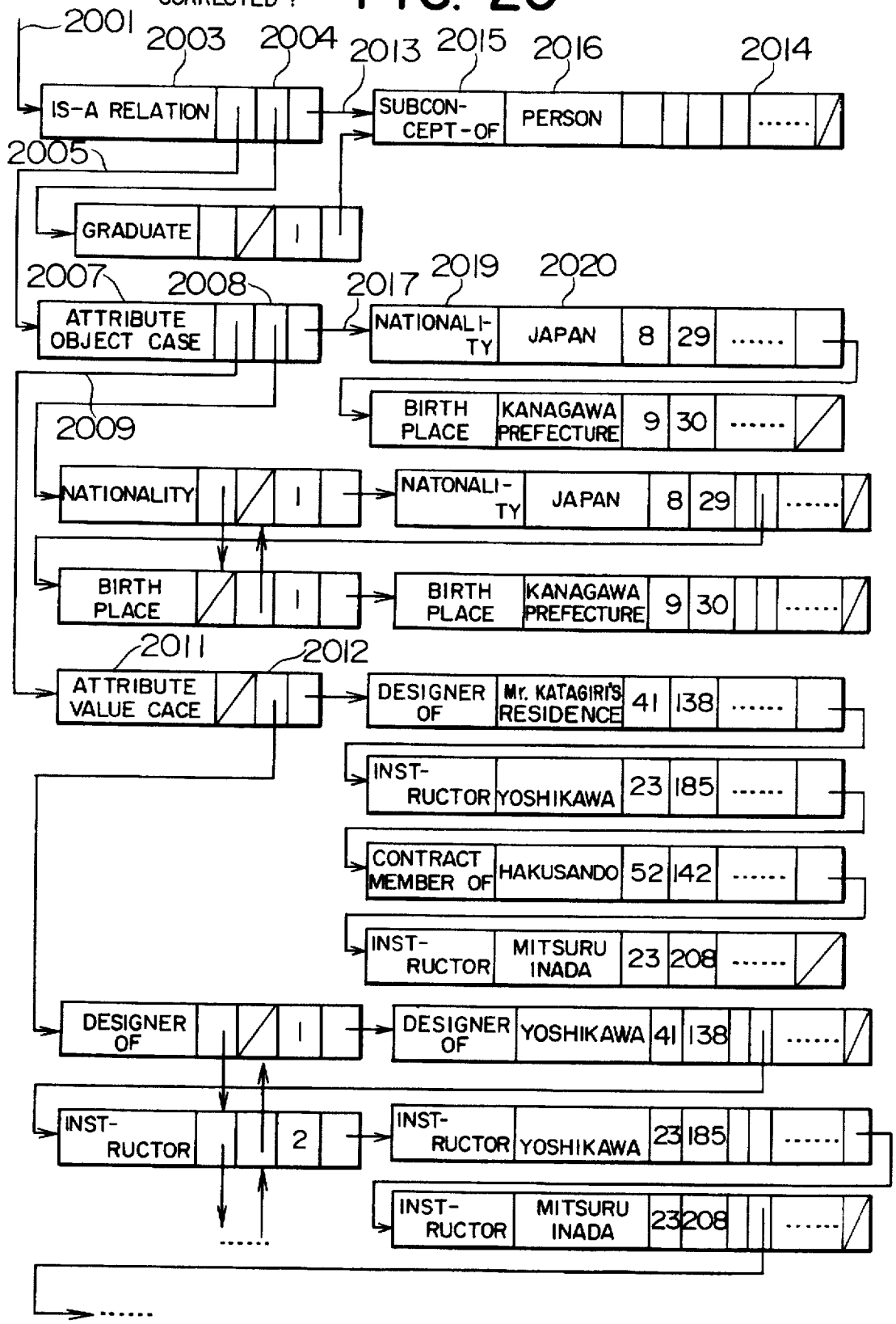
FIG. 20 is a view showing a data structure in which the facts developed in FIG. 19 are grouped by attribute concepts and reconstructed.
Figure 21:
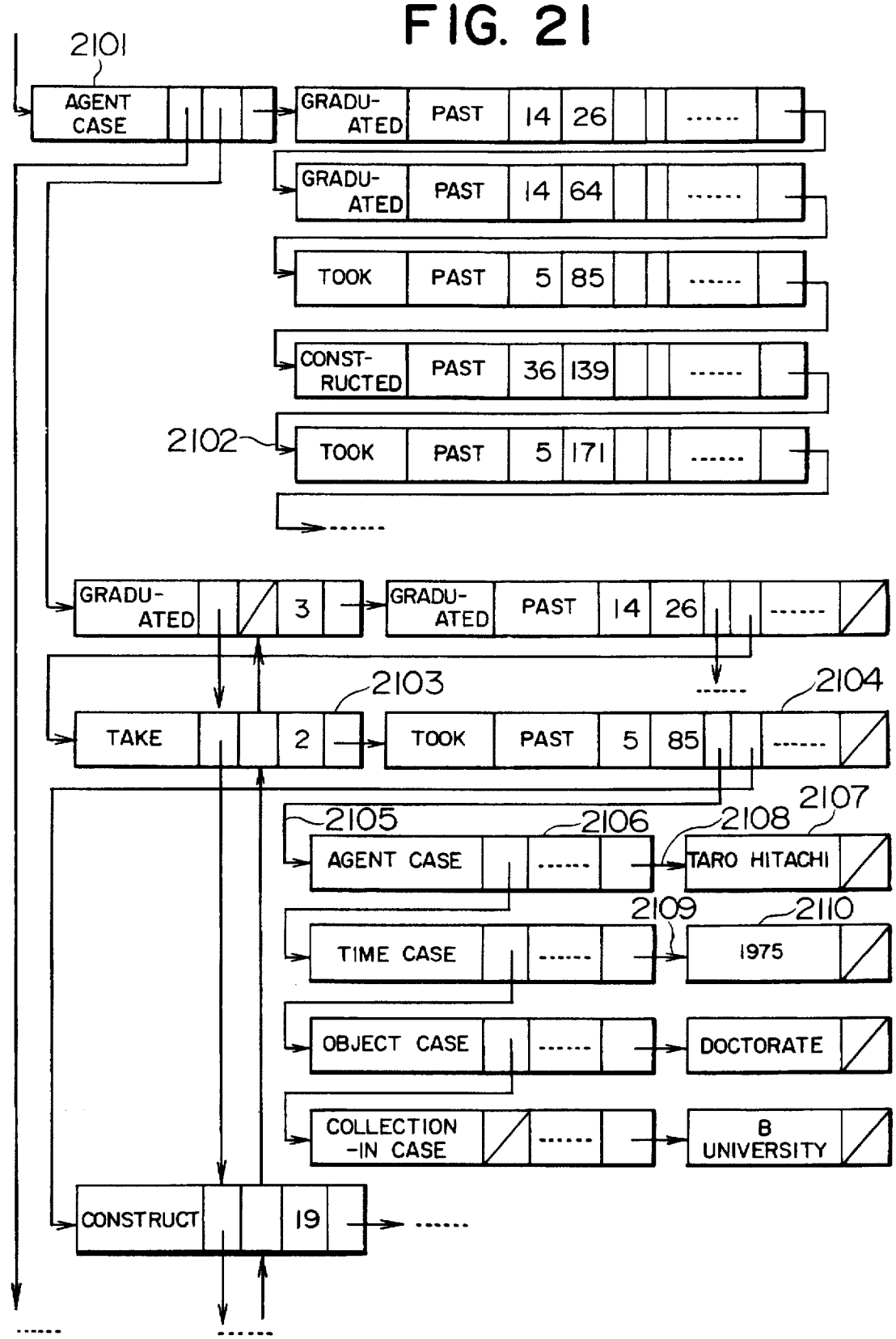
FIG. 21 is view showing a data structure in which view data of facts initially displayed in the view data in FIG. 17 are developed.
Figure 22:
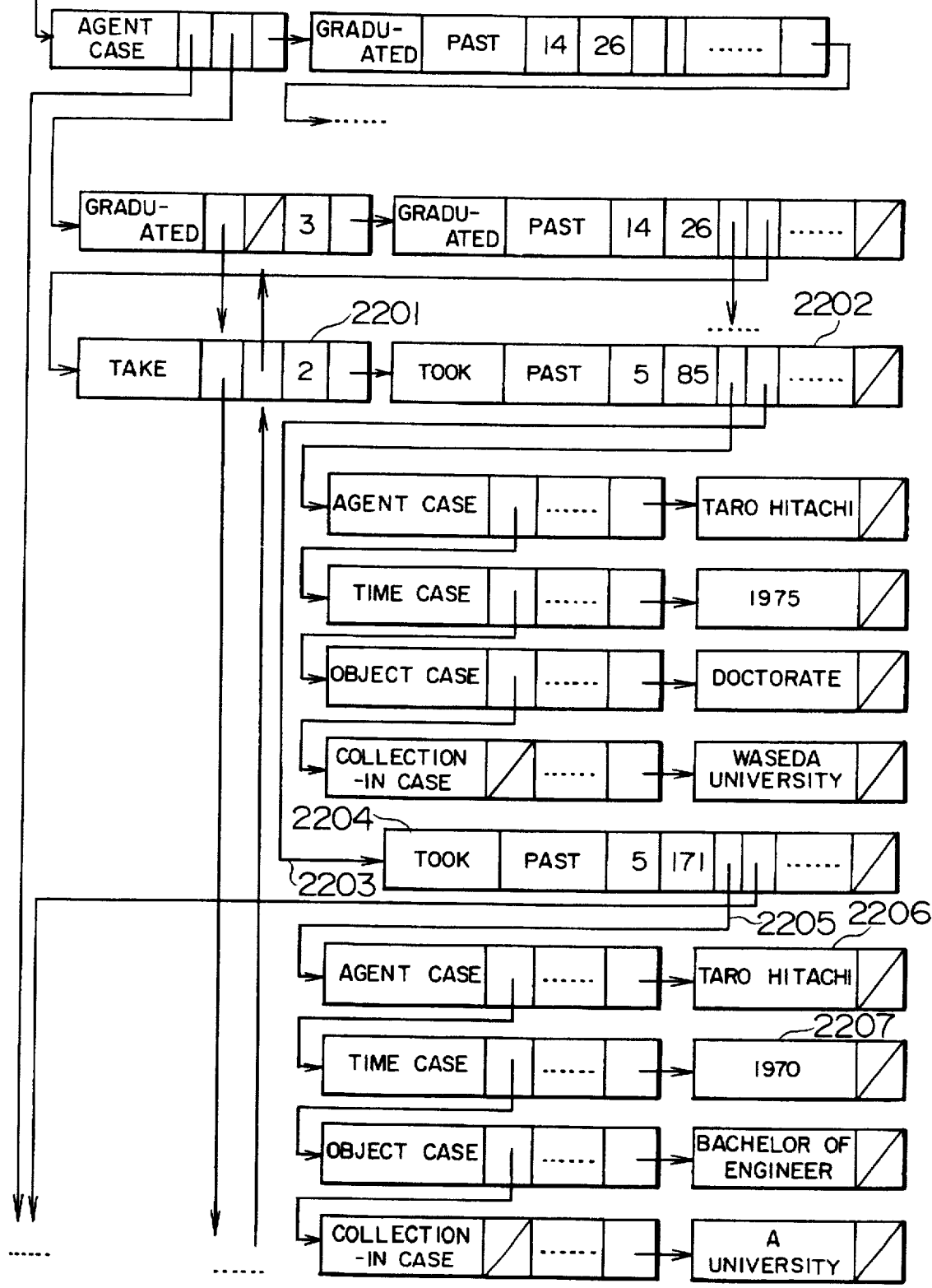
FIG. 22 is a view showing a data structure in which the view data of facts selected in FIG. 35 are added to the view data in FIG. 21.
Figure 57:
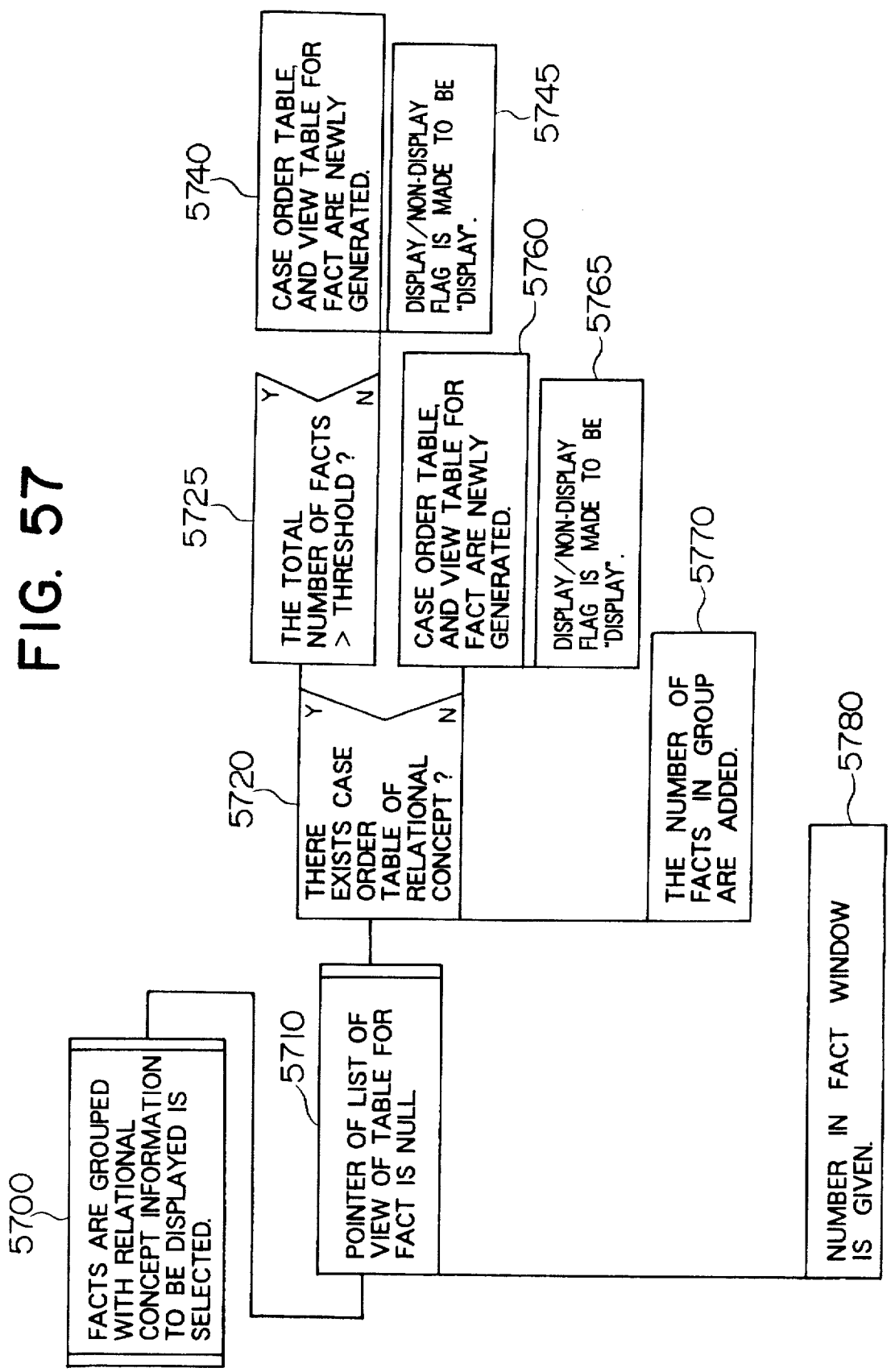
FIG. 57 is a view showing a flow of the case where facts are grouped by relational concepts to discriminate between view and non-view in the concept fact information display routine.
Figure 58:
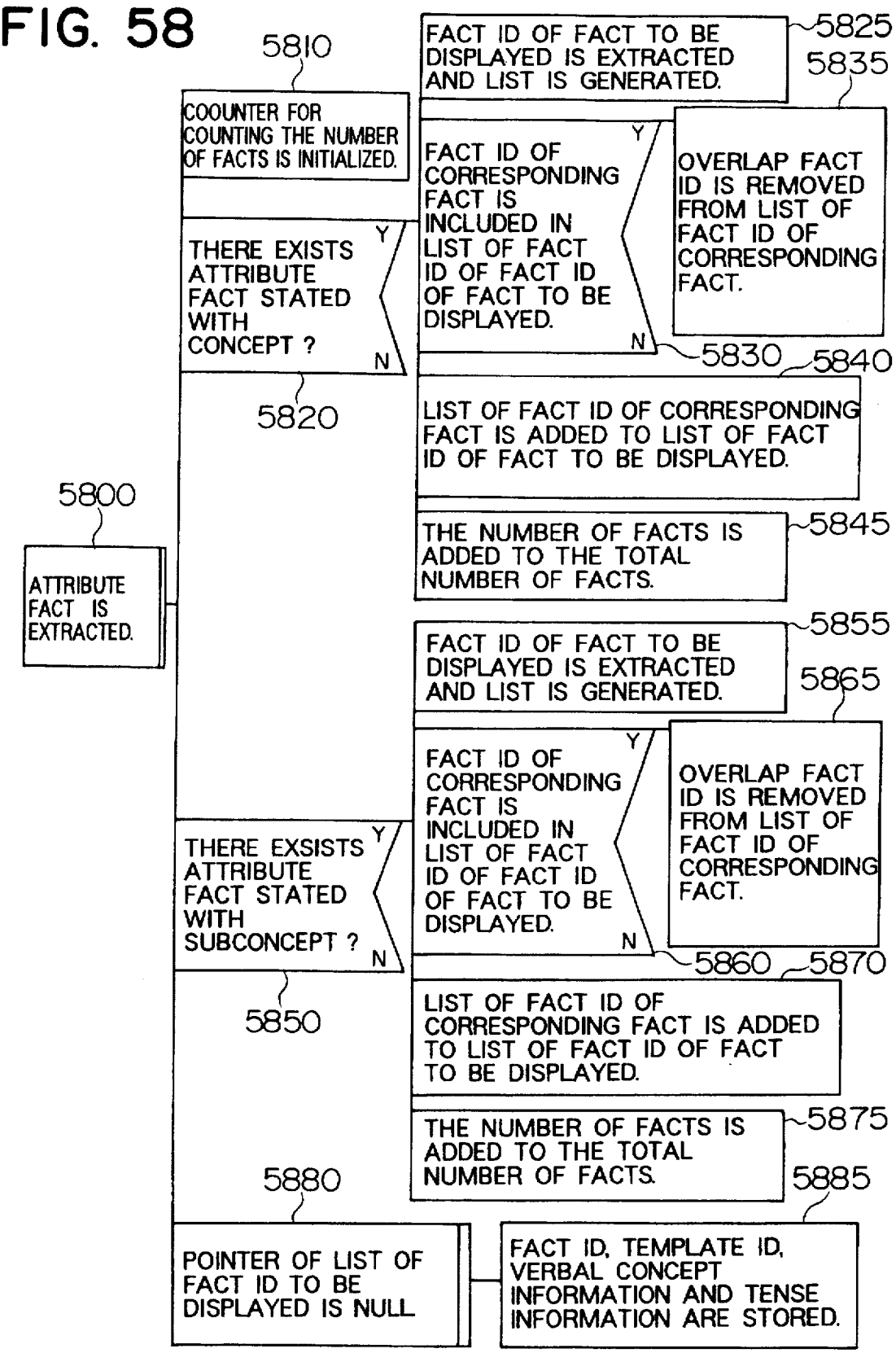
FIG. 58 is a view showing a flow of the case where view data of attribute facts are generated in the concept fact information display routine.
Figure 59:
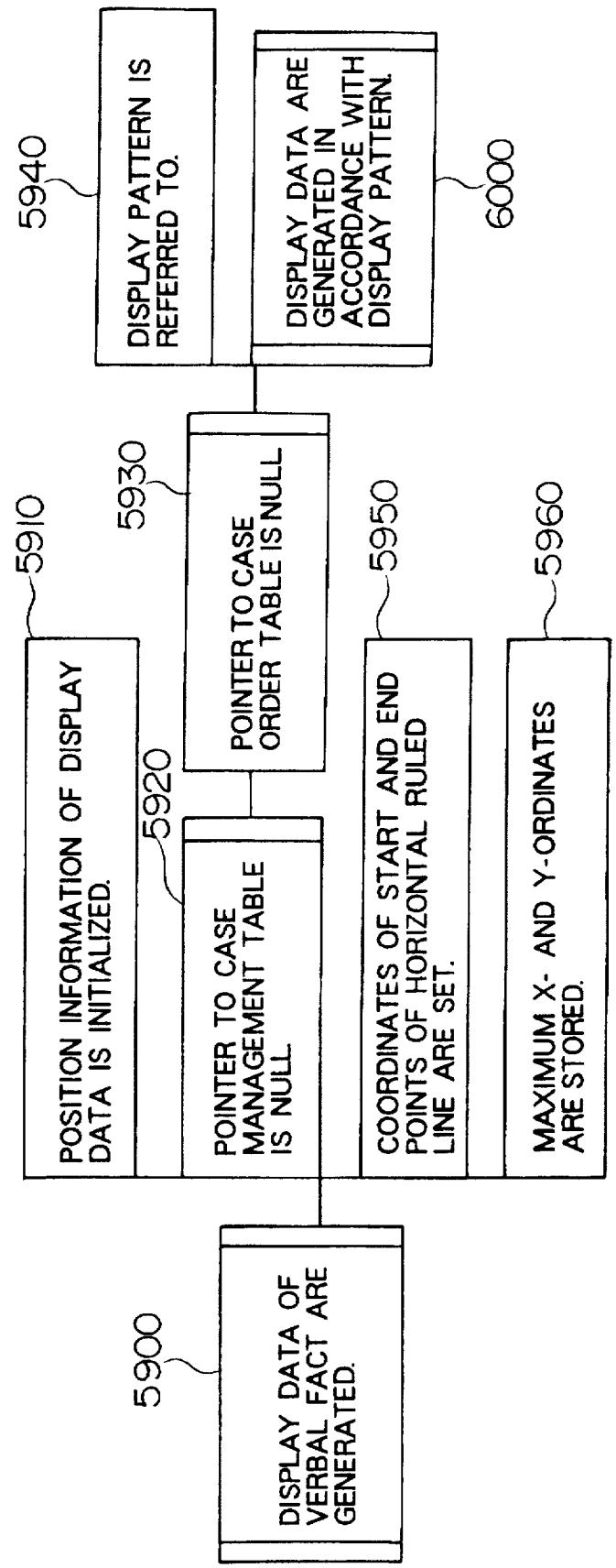
FIG. 59 is a view showing a flow of the case where view positions are determined in the verbal fact display routine.
Figure 60:
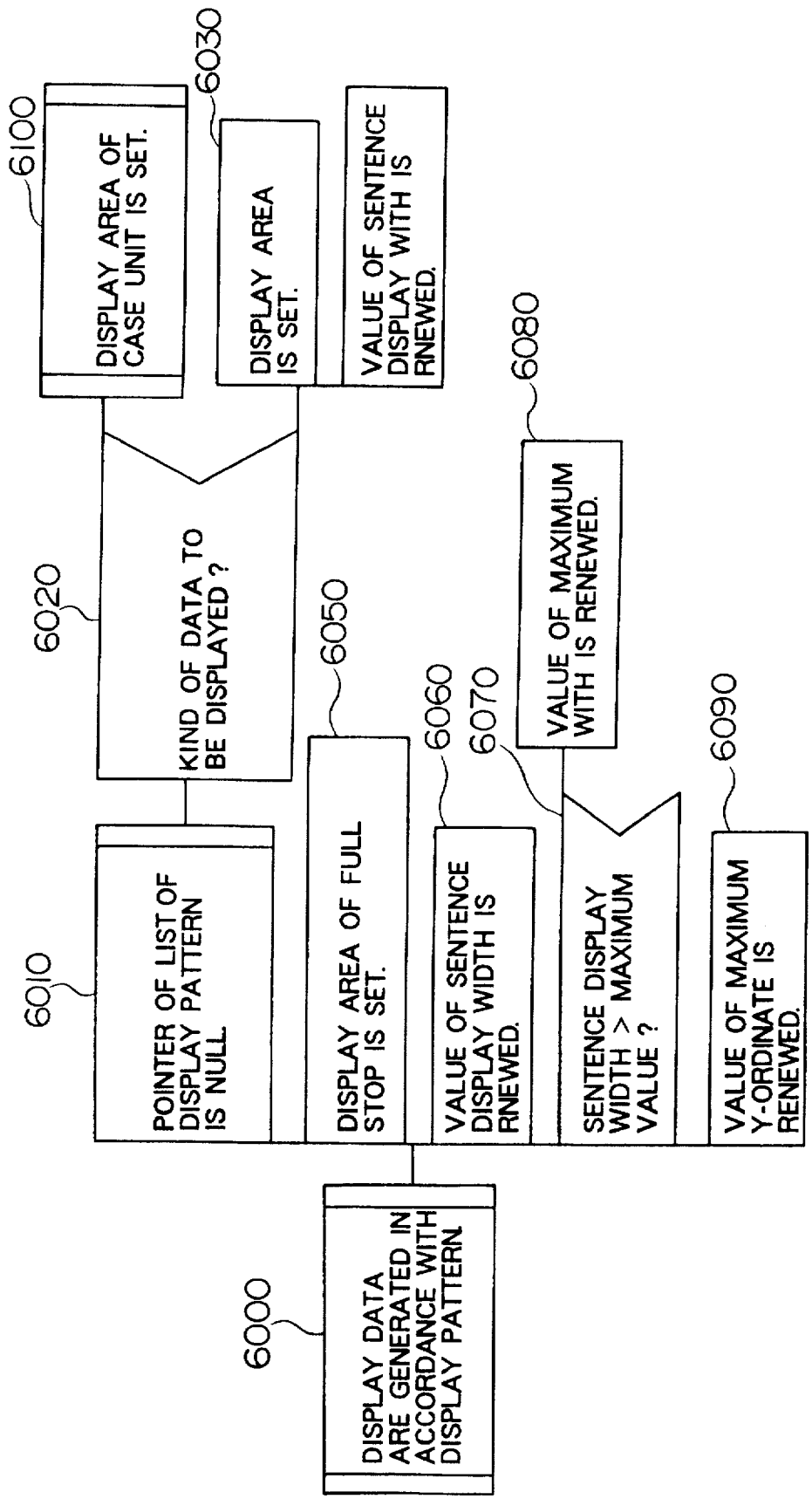
FIG. 60 is a view showing a flow of the case where view positions are determined in the verbal fact display routine.

Then, the situation of the routine goes back to the step 5700 again (see FIG. 57). In the step 5700, the view tables for fact are classified into groups by attribute concepts to reconstruct the list. The structure of data classified into groups by attribute concepts is shown in FIG. 20. In FIG. 20, the number of facts to be displayed is smaller than the threshold. Accordingly, all view tables for fact are allocated newly.

Then, view position information is generated. Specifically, information concerning the view position of facts and super- or whole-concepts temporarily numbered in the step 5700 is generated in steps 5900 and 6200. As a result, not only the position pointed by a pointing device can be detected in the fact window area but the area can be displayed reversally.

With respect to verbal facts, after the view position information is initialized in step 5910 (see FIG. 59), the pointer of the fact window table and the pointer of the case management table are traced to refer to patterns corresponding to the template ID in the head table in step 5940. In the active pattern (see FIG. 11) with respect to "take" classified in the case order table for agent case, as described above, agent case 1162, the verbal concept 1182, object case 1172, collection-in case 1177 and time case 1167 are stored in order.

The case where view position information for the fact ID 85 is generated will be described as an example. As described above (see FIG. 12), it is now assumed that "Taro Hitachi", "doctorate", "b 19751" and "University B" are registered in agent case, object case, time case and collection-in case, respectively. The view table 2106 for case is allocated (see FIG. 21) so that the pointer from the view table 2104 for fact is connected thereto. Further, view tables 2107 for concept given correspondingly to the number of the case filled concepts are generated so that the pointer 2108 from the view table 2106 for case is connected thereto. In the fact, "Taro Hitachi" is a concept expressing agent case and is stored in the view table for concept for agent case, whereafter the situation of the routine goes to step 6000 (see FIG. 60).

Figure 61:
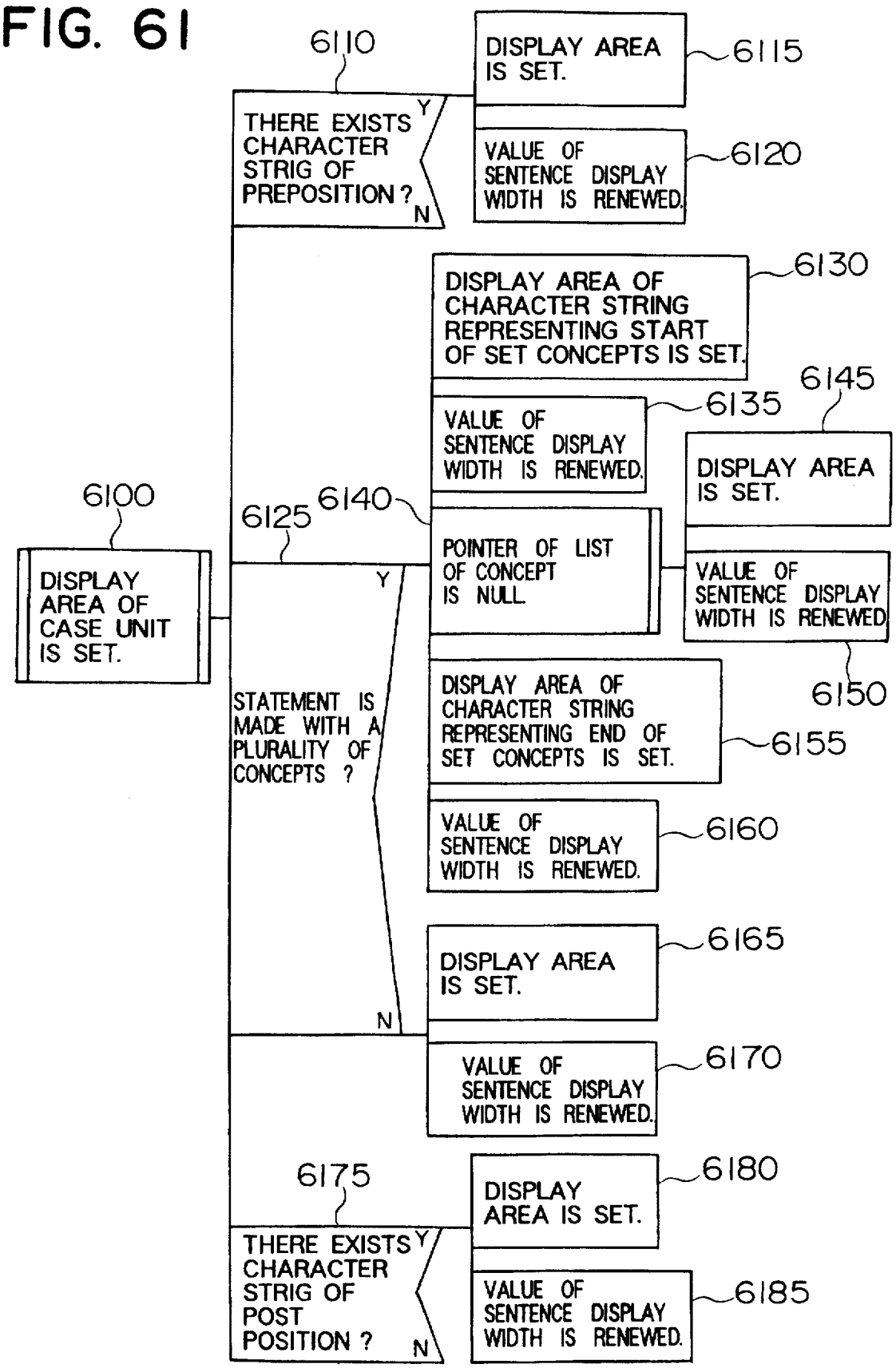
FIG. 61 is a view showing a flow of the case where view positions of strings of characters for a preposition/ postposition and a concept are determined in the verbal fact display routine.
Figure 62:
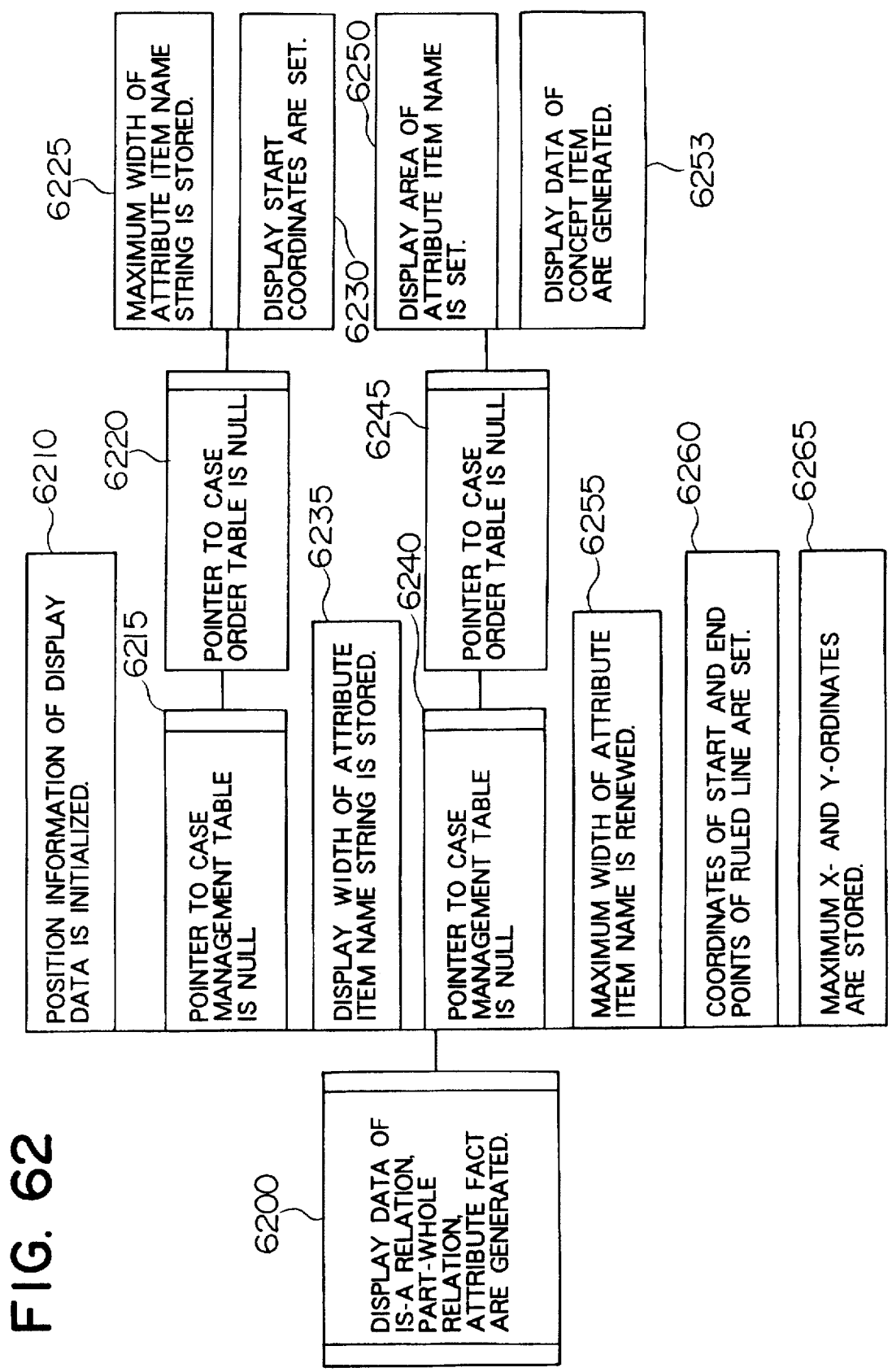
FIG. 62 is a view showing a flow of the case where view positions are determined in the routine for displaying is-a relations and part-whole relations between concepts and attribute facts.
Figure 63:
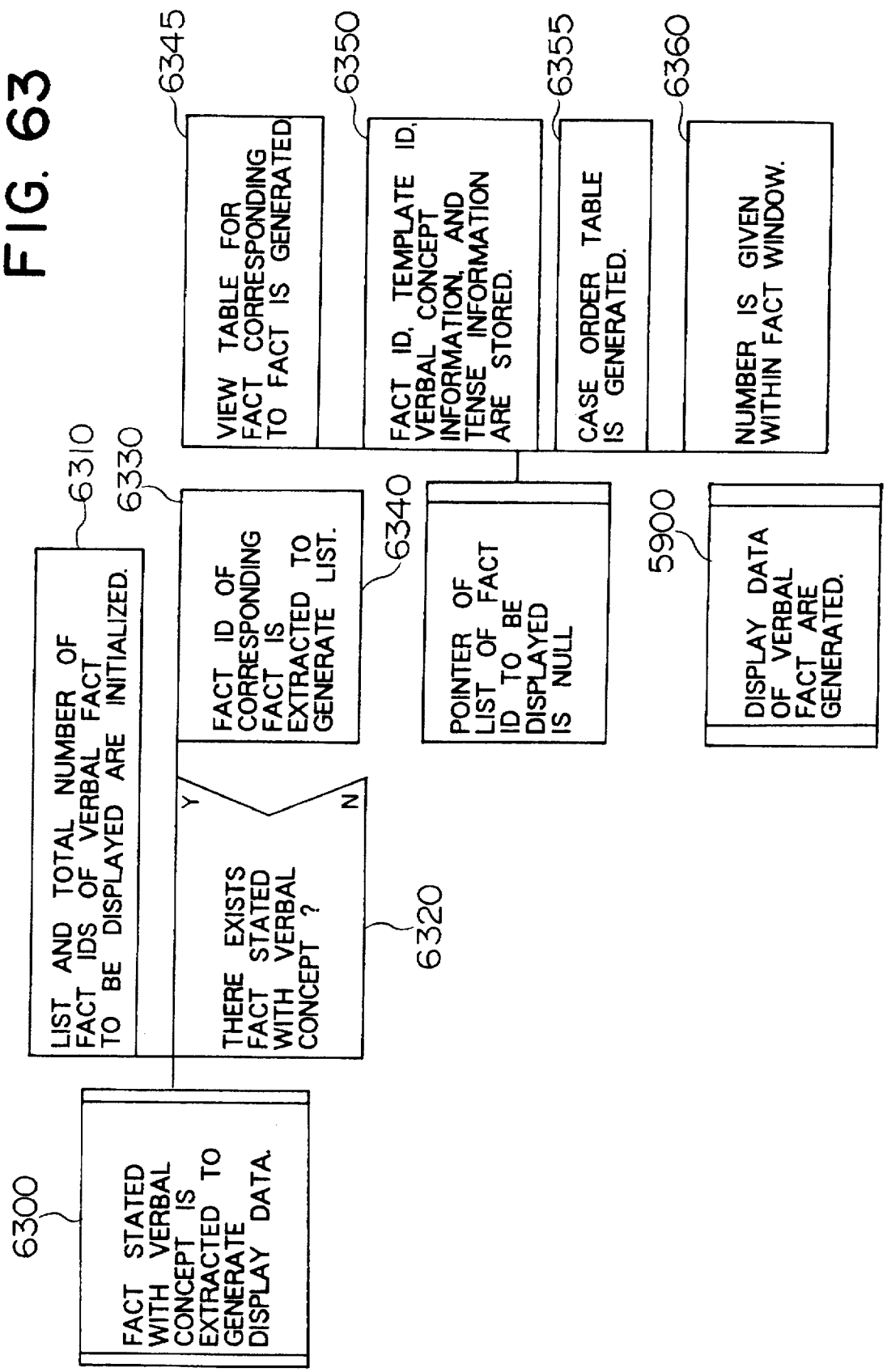
FIG. 63 is a view showing a flow of the routine for displaying fact information of verbal concepts.
Figure 64:
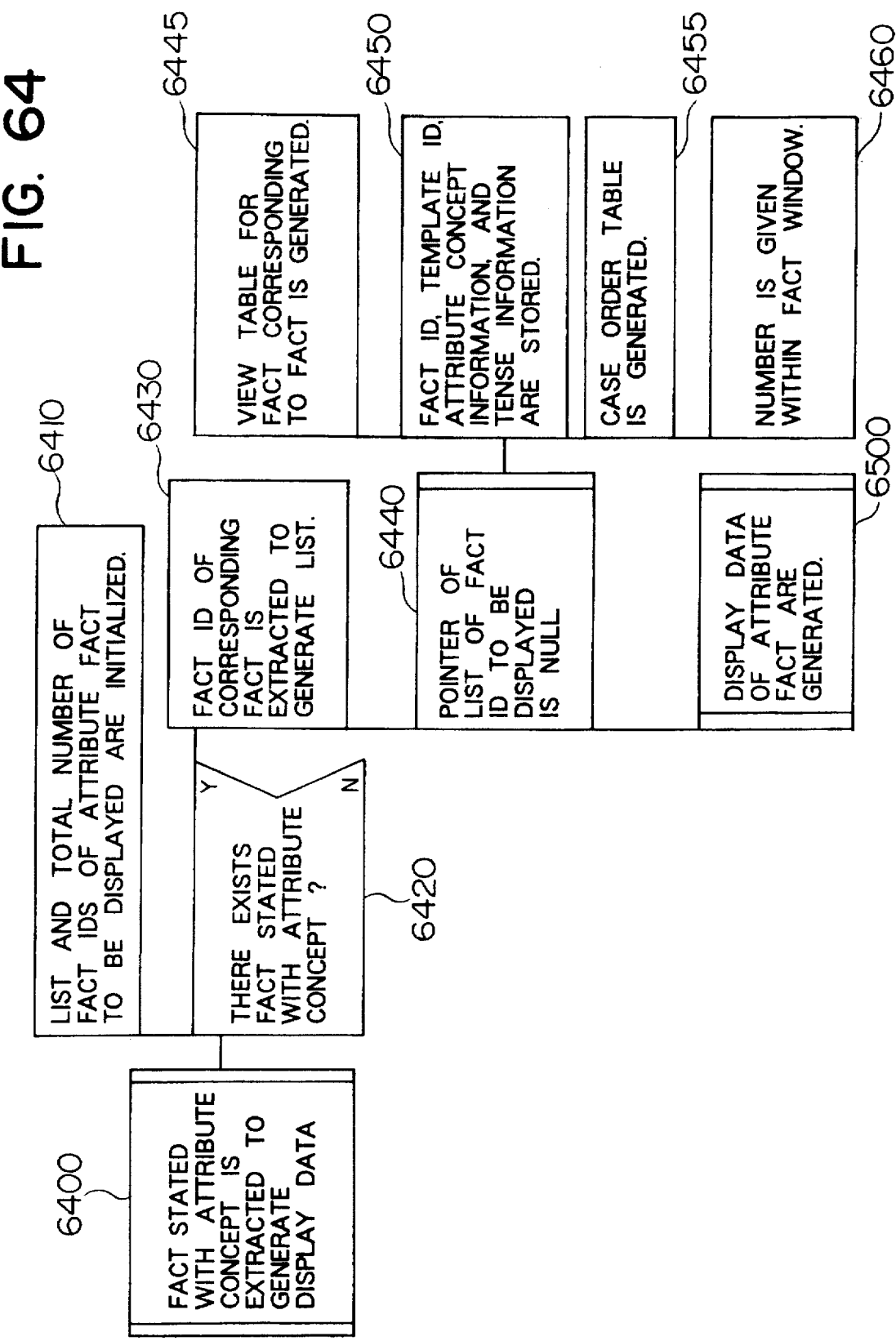
FIG. 64 is a view showing a flow of the routine for displaying fact information of attribute concepts.
Figure 65:
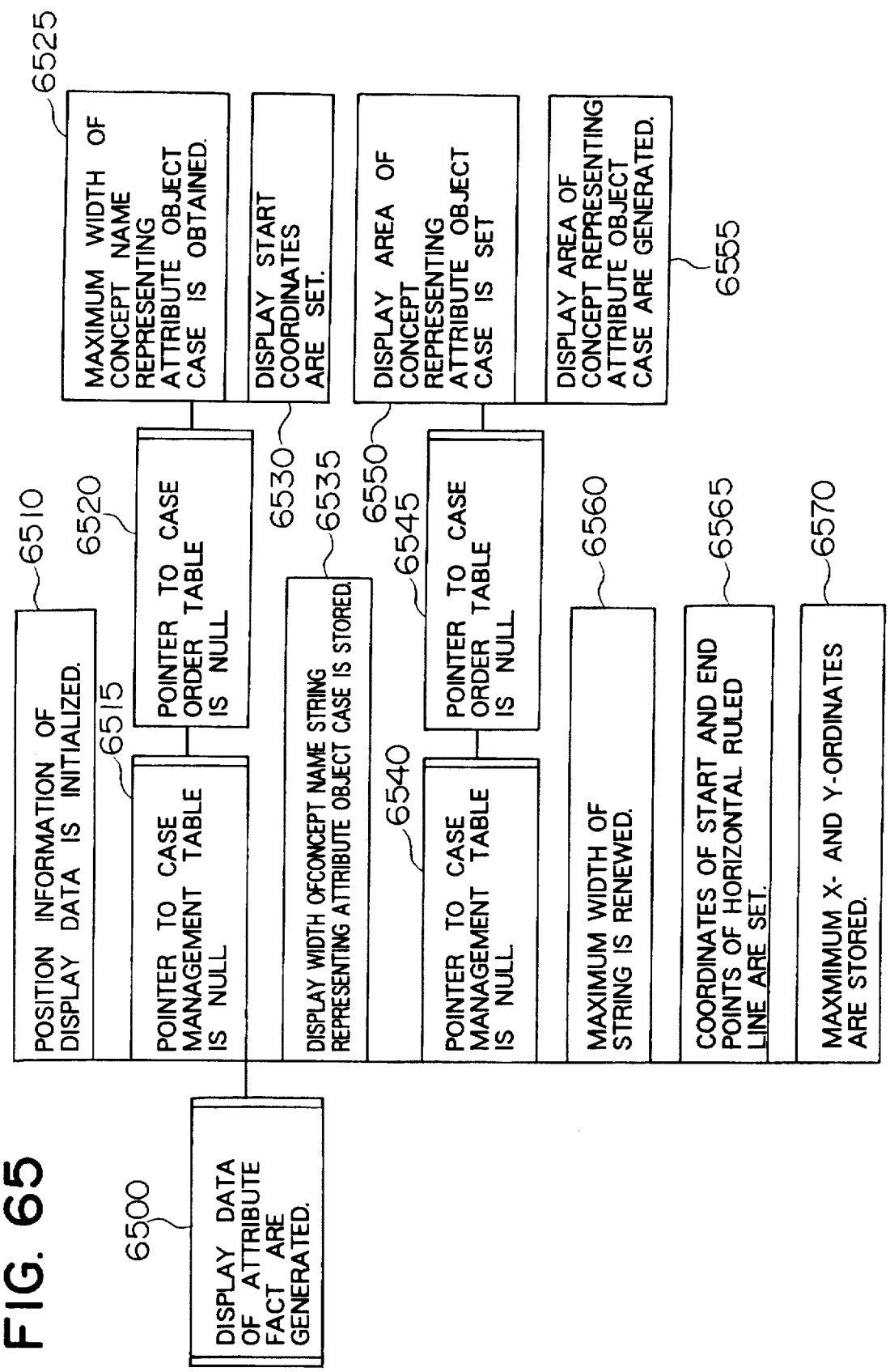
FIG. 65 is a view showing a flow of the case where view data are generated in the routine for displaying fact information of attribute concepts.
Figure 66:
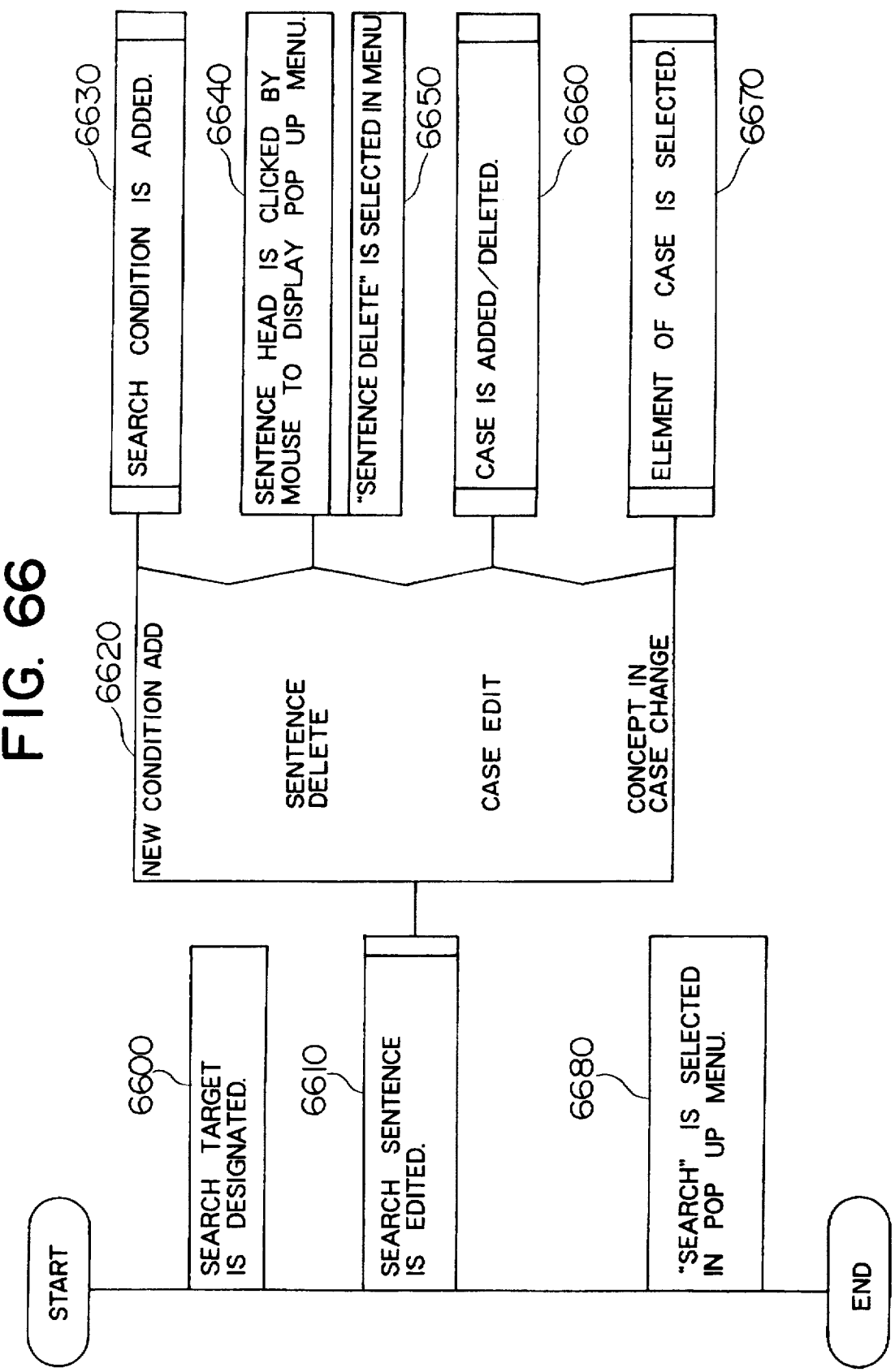
FIG. 66 is a view showing a flow of the query editing routine.
Figure 67:
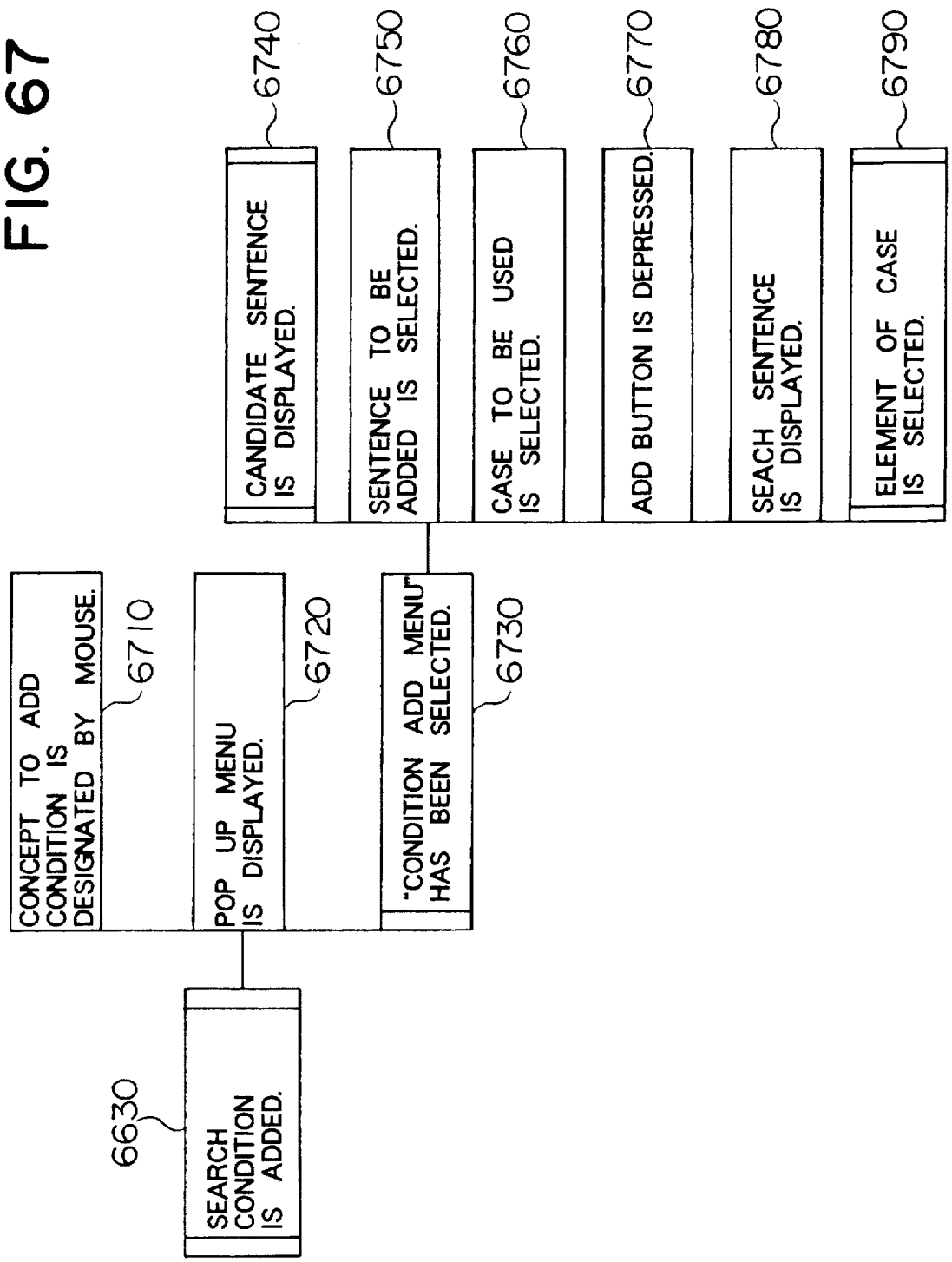
FIG. 67 is a view showing a flow of the query editing routine.
Figure 68:
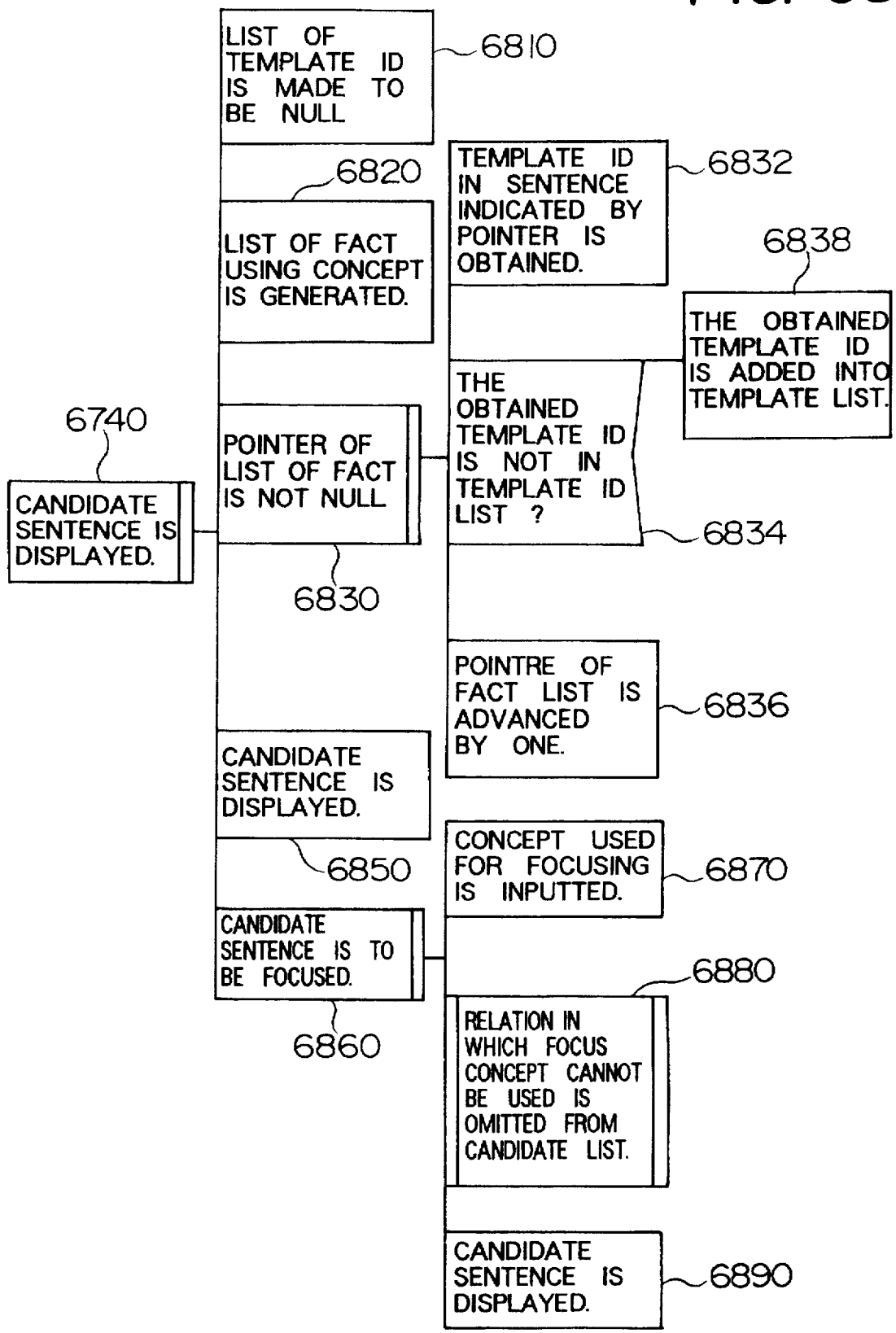
FIG. 68 is a view showing a flow of the query editing routine.
Figure 69:
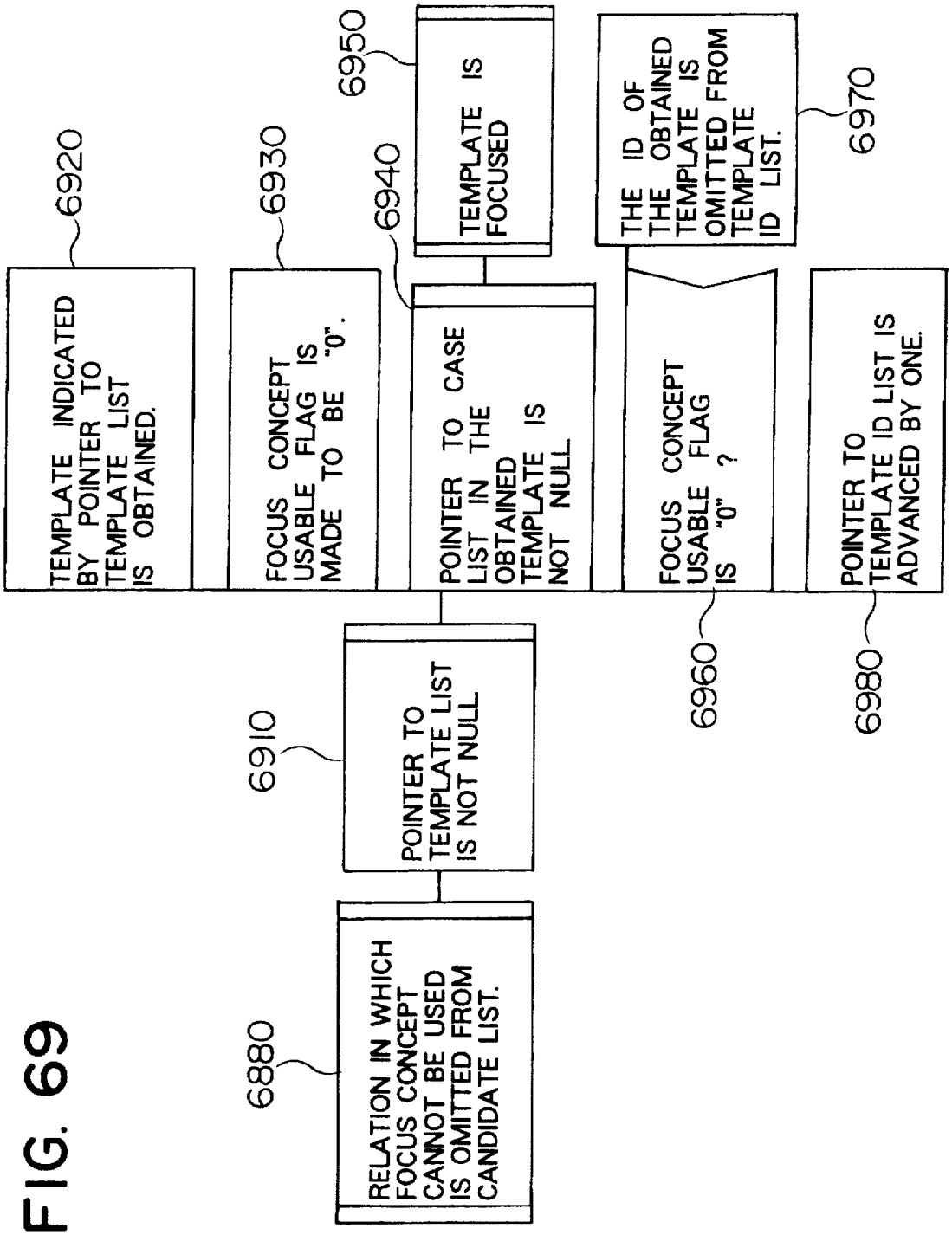
FIG. 69 is a view showing a flow of the query editing routine.
Figure 70:
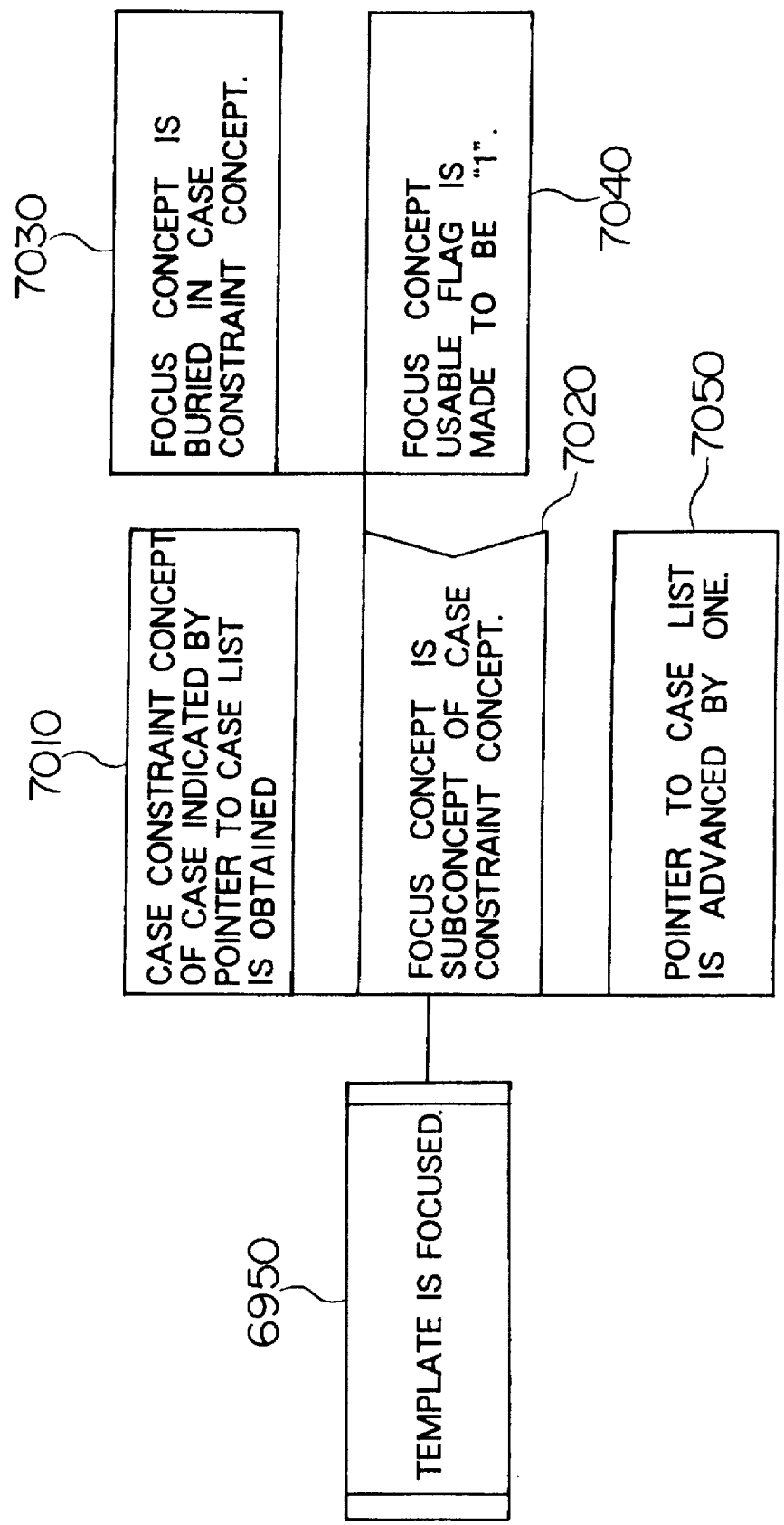
FIG. 70 is a view showing a flow of the query editing routine.
Figure 71:
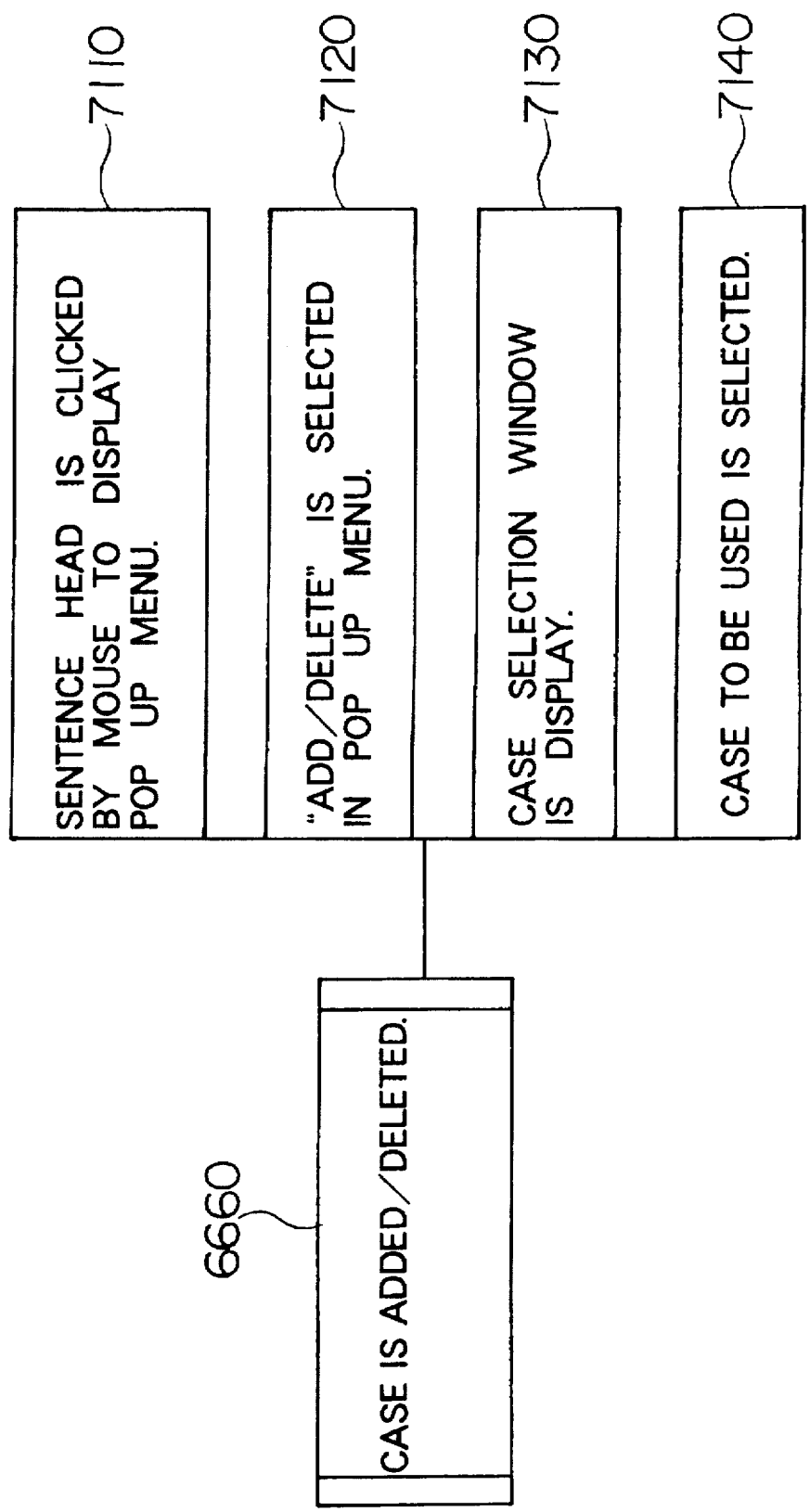
FIG. 71 is a view showing a flow of the query editing routine.
Figure 72:
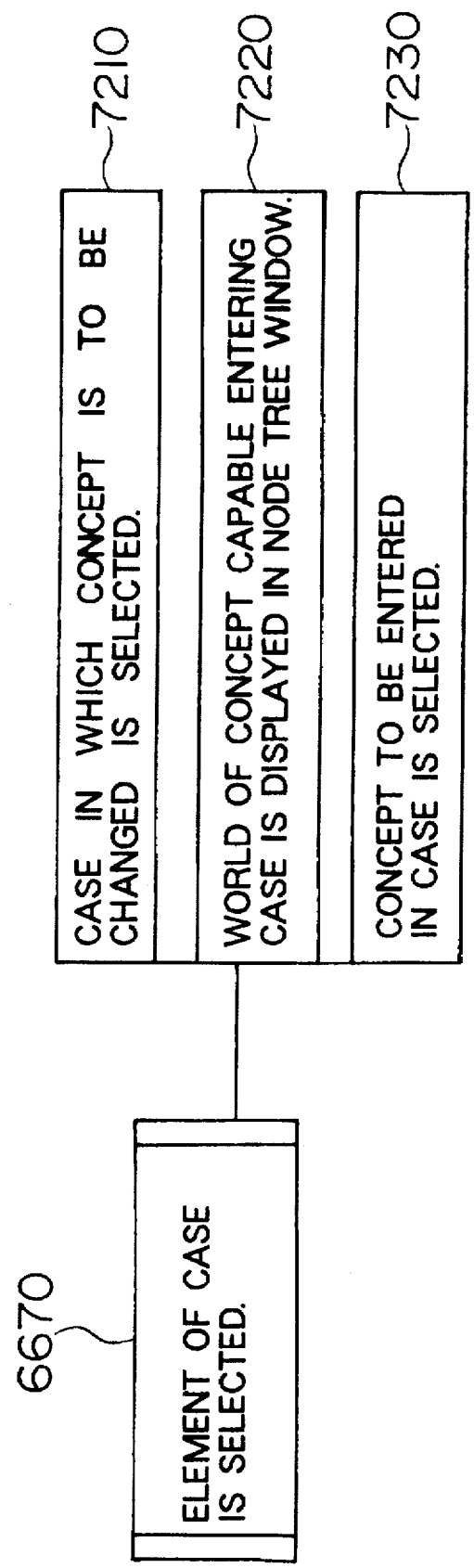
FIG. 72 is a view showing a flow of the query editing routine.

When the pattern is referred to in step 6020 for setting the view position of the fact ID 85 for "take", the initial case is an agent case and the situation of the routine goes to step 6100 (see FIG. 61). In step 6110, a judgment is made as to whether there is any string of characters for preposition in the case. Because there is no string of characters, the situation of the routine goes to step 6125.

In this step, a judgment is made as to whether there are a plurality of case slot fillers. Because the case slot filler is only "Taro Hitachi" 1232 (see FIG. 12), the situation of the routine goes to step 6065. After the view area of "Taro Hitachi" is set, the value of the width of the sentence is updated in step 6170. The view area is set by the width of the string of characters and the height thereof (unit: dots) as represented by the expression:

[X1, Y1, H1, W1]

in which X1 represents the X coordinate of the left end of the rectangular character area for the string of characters "Taro Hitachi", Y1 represents the Y coordinate of the upper left thereof, H1 represents the height of the character area, and W1 represents the width. The values of X1 and Y1 show the fact start coordinates calculated on the basis of the view area of a temporary number given to the fact to be displayed.

Then, the situation of the routine goes to step 6175 in which a judgment is made as to whether there is any string of characters for postposition in the case. Because the string of characters is "ga" 1164 (see FIG. 11), the situation of the routine goes to step 6180. In this step, the view area of postposition is set in the same manner as the procedure of from the step 6165 to the step 6170, whereafter the situation of the routine goes back to the step 6010.

The view area of the string of characters in time case or the like is calculated on the basis of the coordinates, the width of the string of characters and the height thereof in the same manner as described above.

Figure 7:
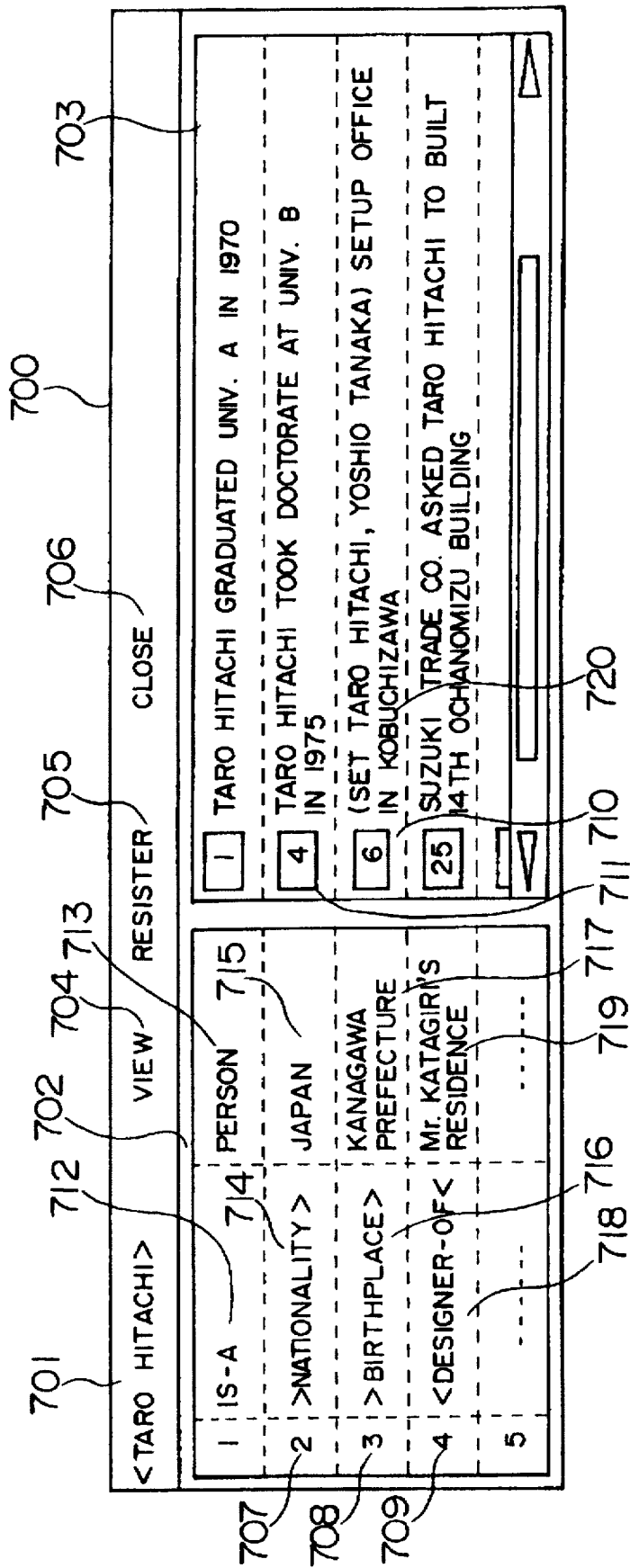
FIG. 7 is a view showing an example of display of facts expressed in terms of a pointed concept "Taro Hitachi"
Figure 8:
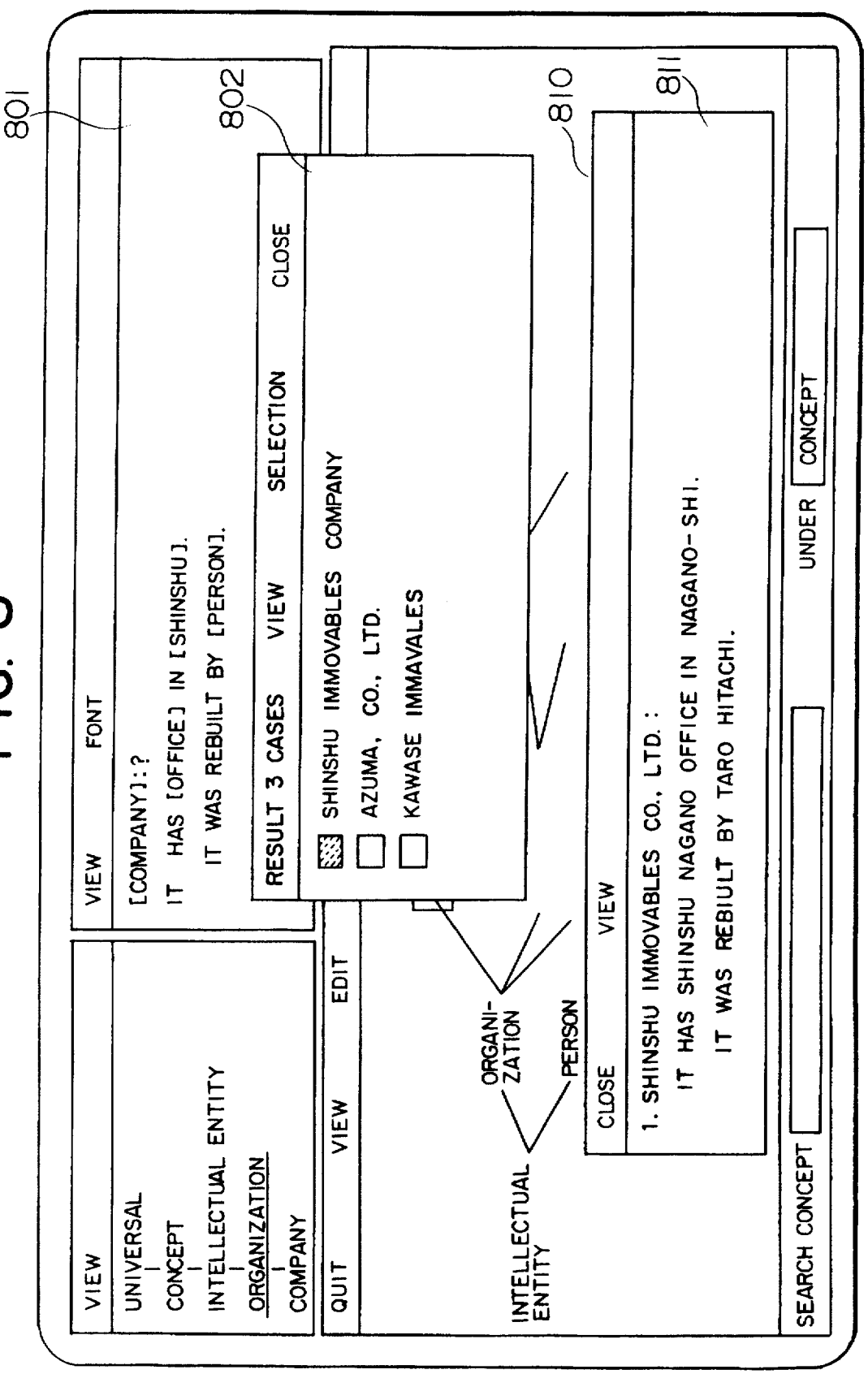
FIG. 8 is a view showing an example of display of a result retrieved by a retrieval function of the information storage and retrieval system.

When there are a plurality of case slot fillers as shown in FIG. 13, that is, when a set of concepts is registered, a string of characters "SET" is put in the left of the string of characters for the set of concepts and then the string of characters including "SET" and the set of concepts is enclosed in parentheses to make the range of the set of concepts obvious (see FIG. 7). Not only the view areas of respective concepts in the set of concepts are set in the procedure of from step 6140 to step 6150 but the view area of the set of concepts as a whole is set in step 6155, so that relational information can be obtained even if the set of concepts is regarded as one concept.

When the case slot filler is an indefinite concept, "?" is put in the right of the string of characters for the concept. For example, the fact "Taro Hitachi and Yoshio Tanaka or else set up office" is expressed as follows.

(SET: Taro Hitachi; Yoshio Tanaka ?)

With respect to other cases, view tables for case and view tables for concept are generated successively in the same manner as described above.

When the data to be displayed in the step 6020 (see FIG. 60) is a verbal concept, the situation of the routine goes to step 6030. The verbal concept is accompanied with tense information. Accordingly, a string of characters for the verb is generated on the basis of voice and tense information.

Because the verb is "active" and "past", "took" 1014 is obtained by referring to the voice and tense name table (see FIG. 10). Then, the view area of the string of characters is set in steps 6030 and 6040.

The maximum width of the sentence is updated in the procedure of from step 6060 to step 6080 so that one fact can be displayed in one line.

A verbal fact is expressed in the form of a sentence and, on the other hand, an attribute fact is expressed in the form of a table. Specifically, an attribute fact expressed by a concept is constituted, as attribute items, by 1) is-a relation,
2) part-whole relation,
3) attribute concept, and constituted, as concept items, by 4) super-concept,
5) whole-concept,
6) other case slot filler for fact.

Accordingly, the attribute fact is different from the verbal fact in that the attribute fact requires no preposition/postposition. However, an attribute item area and a concept item area must be set preliminarily.

After the view position information is initialized in step 6210 (see FIG. 62), the pointer of the view table for fact and the pointer of the case management table are traced successively to generate a string of characters for attribute item on the basis of information such as attribute concept ID stored in the view table for fact and measure the view width of the string of characters in step 6225. Then, in step 6230, the coordinates of the view start point of the string of characters are set.

In this embodiment, the view width of "subconcept-of" (or "is-a") 2015 which is an item name for is-a relation is measured. Then, the pointer 2005 of the case management table is traced (see FIG. 20) to generate an item name on the basis of the attribute concept of an attribute registered as an attribute object case. However, the attribute fact is not accompanied with any preposition/postposition, so that the sense of the case cannot be understood easily. Therefore, a string of characters for the attribute concept of-a fact registered as an attribute object case is enclosed by ">" to generate a new string of characters and set the coordinates of the view start point. When, for example, the attribute concept is "nationality" 2019, the string of characters is expressed as ">nationality>" or simply "nationality". Then, the view width of the string of characters is measured and then the situation of the routine goes back to the step 6220. The string of characters for the attribute object case is generated thus to measure the view width thereof.

Further, the pointer 2009 of the case management table is traced to generate an item name on the basis of the attribute concept for an attribute registered as an attribute value case. To show that the attribute value case and the attribute object case are relative to each other, a string of characters obtained by putting "of" in the right of the string of characters for the attribute concept is regarded as an attribute item name and then the view width of the string of characters is measured. The maximum view width of the attribute item is thus set and stored separately in step 6235.

Then, the situation of the routine goes to step 6240. In step 6250, the pointer of the case management table is traced to set the view area of the concept item in the same manner as in the attribute item. The string of characters for the concept "person" 2016 which is a super-concept with respect to "Taro Hitachi" stored in the view table for fact is regarded as a view string of characters and then the width thereof is measured. Further, the coordinates of the upper left of the rectangular form in the view area of the concept item are calculated on the basis of the view width of the attribute item and set. Then, the situation of the routine goes back to the step 6245.

Then, the pointer 2005 of the case management table is traced so that the concept of the attribute value case which is the other case defined by an attribute with respect to the attribute registered as an attribute object case is given as an item name to measure the width of the string of characters. For example, the concept "Japan" corresponds to the view item ">nationality>" (or "nationality"). Further, the coordinates of the upper left of the view area are set. The same procedure as described above is applied to the attribute value case. Thus, the maximum view width of the concept item is set and stored separately.

When there are a plurality of super- or whole-concepts or when a set of concepts is registered in the other case for attribute, the view area is set while regarding the number of concepts as the number of display lines.

After the view positions of verbal facts and attribute facts are set as described above, the facts are displayed according to the position information in step 5450. In FIG. 7, "subconcept-of" (or "is-a") 712 in the area of the attribute item name and "person" 713 in the area of the concept item name are displayed as superconcept information with respect to "Taro Hitachi" in the attribute view area. In the fact "nationality of Taro Hitachi is Japan" in which "Taro Hitachi" is registered as an attribute object case, ">nationality>" (or "nationality") 714 and "Japan" 715 are displayed in the area of the attribute item name and the area of the concept item name, respectively. In the fact "Taro Hitachi is designer of Katagiri house" in which "Taro Hitachi" is registered as an attribute value case, "<designer<" (or "designer-of") 718 and "Katagiri's residence" 719 are displayed.

Displaying of verbal facts expressed by concepts and displaying of is-a relation, part-whole relation and attribute facts can be performed on the basis of the view position information set as described above.

In the following, the display of fact information for verbal concepts will be described as a second embodiment according to the display method of the invention.

Figure 29:
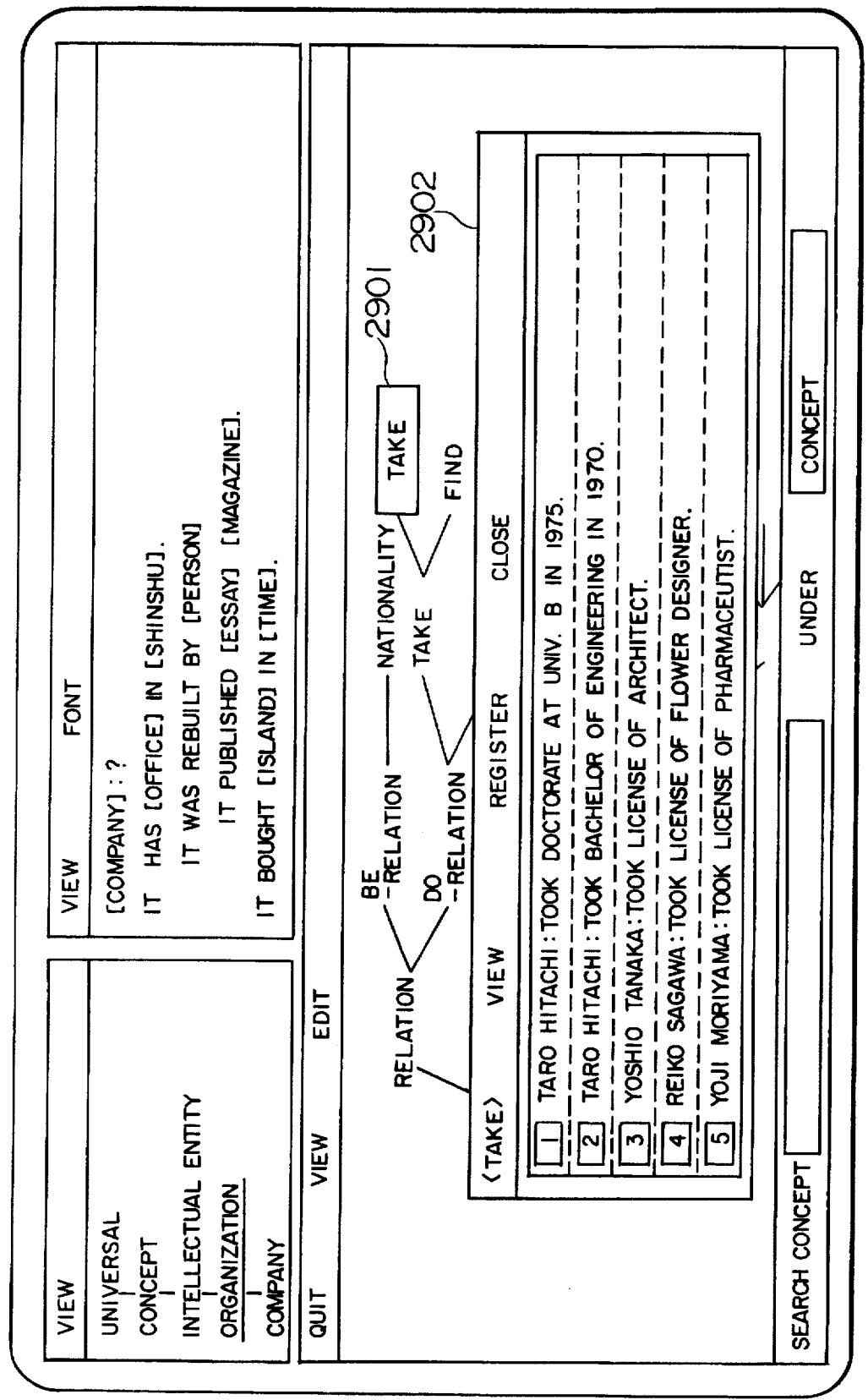
FIG. 29 is a view showing display at browsing through fact information expressed by a pointed verbal concept "take"

The fact information is displayed by clicking a verbal concept in a concept tree through a mouse and selecting a menu from a list of functions expressed as a pop-up menu in the same manner as in the display of a view window for fact with respect to concepts. FIG. 29 shows an interactive display at browsing. The verbal concept "take" 2901 displayed in the node tree is clicked through a mouse and the procedure of from the step 5310 to the step 5350 is carried out in the same manner as in the method for displaying fact information for concept (see FIG. 53), whereafter the situation of the routine goes to step 6300. The view window 2902 for fact with respect to "take" is displayed according to the display data generated. The method for displaying fact information for verbal concepts is similar to the method for displaying the view window (see FIG. 7) for fact with respect to concepts in the verbal area, except the method of referring to verbal facts. The method of referring to verbal facts will be described below.

In step 6310 (see FIG. 63), a list of fact ID data to be displayed and a counter expressing the total number of verbal facts are initialized. Then, in step 6320, a judgment is made as to whether there is any verbal fact registered with respect to the verbal concept "take". When there is some verbal fact, in step 6330, a list of binary trees is generated so that fact ID data are stored therein. Further, the case management table is allocated so that the pointer from the view window table for fact is connected thereto.

In step 6345, the view table for fact is allocated so that the pointer from the case management table is connected thereto on the basis of the list of binary trees of fact ID data. In step 6350, fact ID, template ID, verbal concept information and tense information are stored by successively referring to the fact information. In step 6355, the case order table is allocated so that the pointer from the case management table is connected thereto. Then, in step 6360, number temporarily used in the view window for fact is given, whereafter the situation of the routine goes back to the step 6340.

In this embodiment, data to be displayed are generated by successively referring facts in the order of accumulation on the knowledge base. Accordingly, there is no sorting on the basis of case priority. Therefore, the view table for fact designated by the case management table coincides with the view table for fact designated by the case order table. As another method, sorting may be performed in the order of importance of the cases registered, in the order of frequency in use for reference or in the alphabetical order of name for case slot fillers.

FIG. 30 shows a view window for fact in which facts expressed by "take" are sorted in the order of the number of cases. The fact "Taro Hitachi took doctorate at University B in 1975" 3001 corresponding to the number "1" is expressed by four cases, namely, the concept "Taro Hitachi" expressed by agent case, the concept "1975" expressed by time case, the concept "doctorate" expressed by object case and the concept "University B" expressed by collection-in case. The next fact "Taro Hitachi took bachelor of engineering in 1970" 3002 is expressed by three cases. Each of the fact "Yoshio Tanaka took license of architect" 3003 and the following facts is expressed by two cases. Facts may be displayed by such sorting method.

The setting of view areas for respective strings of characters in the window is performed in the same manner as the setting of the verbal area in the view window for fact with respect to concepts.

The view window for fact with respect to verbal concepts is displayed on the basis of the display data thus generated.

The display of fact information for verbal concepts can be performed as described above.

In the following, the display of fact information for attribute concepts will be described as a third embodiment according to the display method of the invention.

Figure 31:
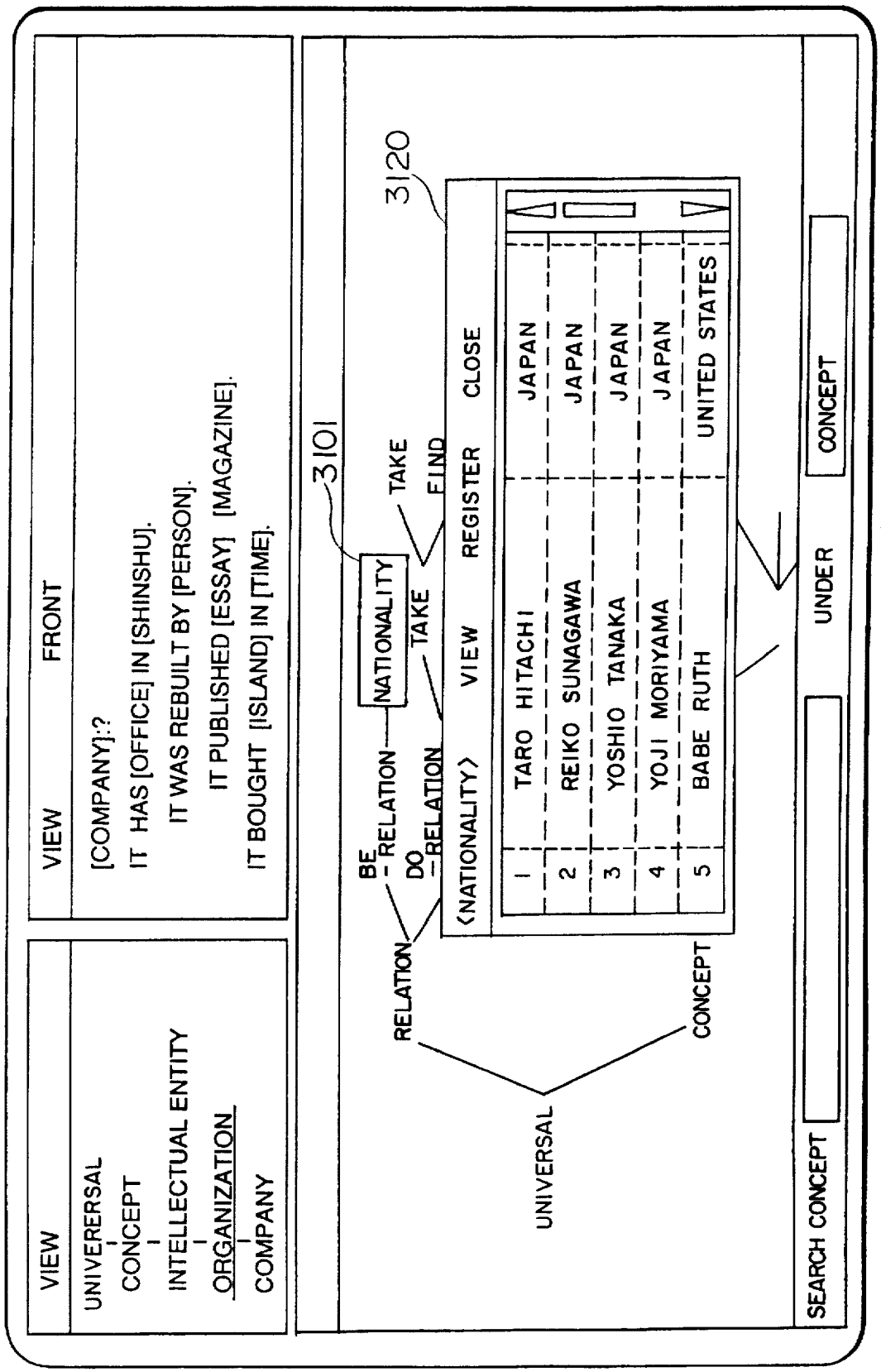
FIG. 31 is a view showing display at browsing through fact information expressed by a pointed attribute concept "nationality"

The fact information is displayed by clicking a mouse in an attribute concept in a node tree and selecting a desired item from a list of functions expressed as a pop-up menu in the same manner as in the display of fact information for concepts. FIG. 31 shows an interactive display at browsing. The attribute concept "nationality" 3101 displayed in the node tree is selected by clicking the mouse and the procedure of from the step 5310 to the step 5350 is carried out in the same manner as in the method for displaying fact information for concepts (see FIG. 53), whereafter the situation of the routine goes to step 6300. The view window 3102 for fact with respect to "nationality" is displayed according to the display data thus generated.

The method for displaying the window is similar to the method for displaying the view window for fact with respect to concepts in the attribute area, except the method of referring to attribute facts and the method of generating strings of characters to be displayed in respective lines.

The method of referring to facts will be described below.

In step 6410 (see FIG. 64), a list of fact ID data for facts to be displayed and a counter expressing the total number of facts are initialized. Then, in step 6420, a judgment is made as to whether there is any attribute fact registered with respect to the attribute concept "nationality". When there is some fact, a list of binary trees is generated in step 6430 so that fact ID data are stored therein. Further, the case management table is allocated so that the pointer from the view window table for fact is connected thereto.

In step 6445, the view table for fact is allocated on the basis of the list of binary trees of fact ID data, so that the pointer from the case management table is connected thereto. In step 6450, fact ID, template ID, attribute concept information and tense information are stored by referring to the fact information. Then, in step 6455, case order tables are allocated so that the pointer from the case management table is connected thereto. Then, in step 6460, numbers temporarily used in the view window for fact are respectively given to the facts, whereafter the situation of the routine goes back to the step 6440.

In this embodiment, data to be displayed are generated by successively referring facts in the order of accumulation on the knowledge base. Accordingly, there is no sorting. As another method, sorting of facts may be performed in the order of the number of concepts expressing attribute object case or attribute value case, in the order of frequency in use for reference or in the alphabetical order of name for concepts.

The method of generating strings of characters to be generated will be described below.

In the display of fact information in the form of a table, the fact window for concepts is generated so that attribute item name and concept item name are respectively arranged in the first and second columns. On the contrary, the fact window for attribute concepts is generated so that concept name registered as attribute object case and concept name registered as attribute value case are respectively arranged in the first and second columns.

In step 6510 (see FIG. 65), position information for data to be displayed is initialized. Then, in the procedure of from step 6510 to step 6530, the width and height of the character string with respect to concepts expressing attribute object case are measured to set the coordinates of the view start point. Then, in step 6535, the width of the first column, that is, the width of the column of concepts expressing attribute object case, is stored. Then, in the procedure of from step 6540 to step 6550, the view area for concepts expressing attribute object case is set and, at the same time, the width and height of the character string is measured to set the view area. Thus, data to be displayed are generated.

FIG. 32 shows a fact window in which facts expressed by the attribute concept "nationality" are sorted by attribute value case. In this drawing, the fact "nationality of Taro Hitachi is Japan" is expressed by respectively displaying "Taro Hitachi" 3201 and "Japan" 3205 in the first and second columns of No. "1" line. Like this, "Yoshio Tanaka" 3202 and "Reiko Sagawa" 3203 are displayed with the fact that the nationality thereof is "Japan" 3206, 3207. The concept expressing attribute value case in No. "5" is "United States" 3208, so that other national names than "Japan" are considered to be arranged after this line. Facts may be displayed by such sorting method.

The setting of view areas for respective strings of characters in the window is performed in the same manner as the setting of attribute areas in the fact window for concepts.

The fact window for attribute concepts is displayed on the basis of the display data thus generated.

The display of fact information for attribute concepts can be performed as described above.

In the following, the additional display of fact information not displayed in the fact window for concepts in which fact information automatically selected by the system has been displayed will be described as a fourth embodiment according to the display method of the invention.

Figure 33:
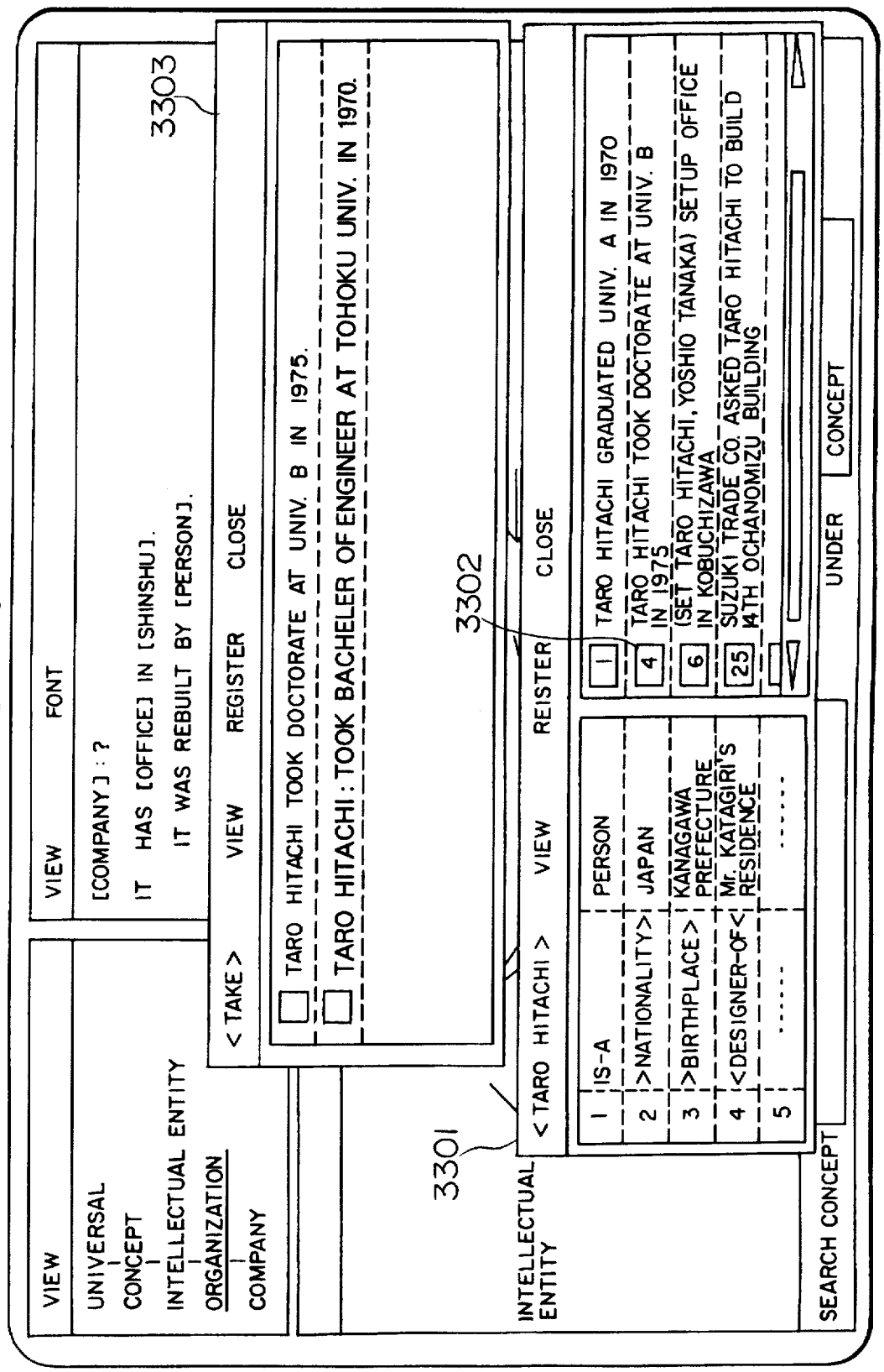
FIG. 33 is a view showing display of facts for "take" in which "Taro Hitachi" is registered as an agent case.

An item is selected from a list of functions displayed as a pop-up menu by clicking a mouse in a number area in the window, so that facts expressed by the same verbal concept as a fact corresponding to the number selected are displayed in a same relation window. FIG. 33 shows an interactive display at browsing.

A view table for fact in which the view area including the position pointed by clicking the mouse is set is retrieved by detecting the position pointed by clicking the mouse and tracing the pointer from the fact window table. After the retrieval of the table, a case management table and a case order table connected to the table by the pointer are retrieved.

For example, the display of the same relation from the fact window 3301 for "Taro Hitachi" in FIG. 33 is performed as follows. When the number "4" 3302 is selected by clicking the mouse, a display area corresponding to the number "4" is retrieved by tracing the pointer from the fact window table. As a result, a view table 2104 for fact (see FIG. 21) corresponding to the fact "Taro Hitachi took doctorate at University B in 1975" identified by the number is detected. With respect to the case management table, a case management table 2101 for agent case is selected. Because "Taro Hitachi" in the fact is a concept expressing agent case, the pointer from the case management table for agent case to the view table for fact is traced to judge whether there is any fact expressed by "take" except this fact in fact view tables which have been generated for displaying facts. Because the view table 2102 for fact having the fact ID of 171 is fitted now, fact information is referred to on the basis of the fact ID.

Figure 34:
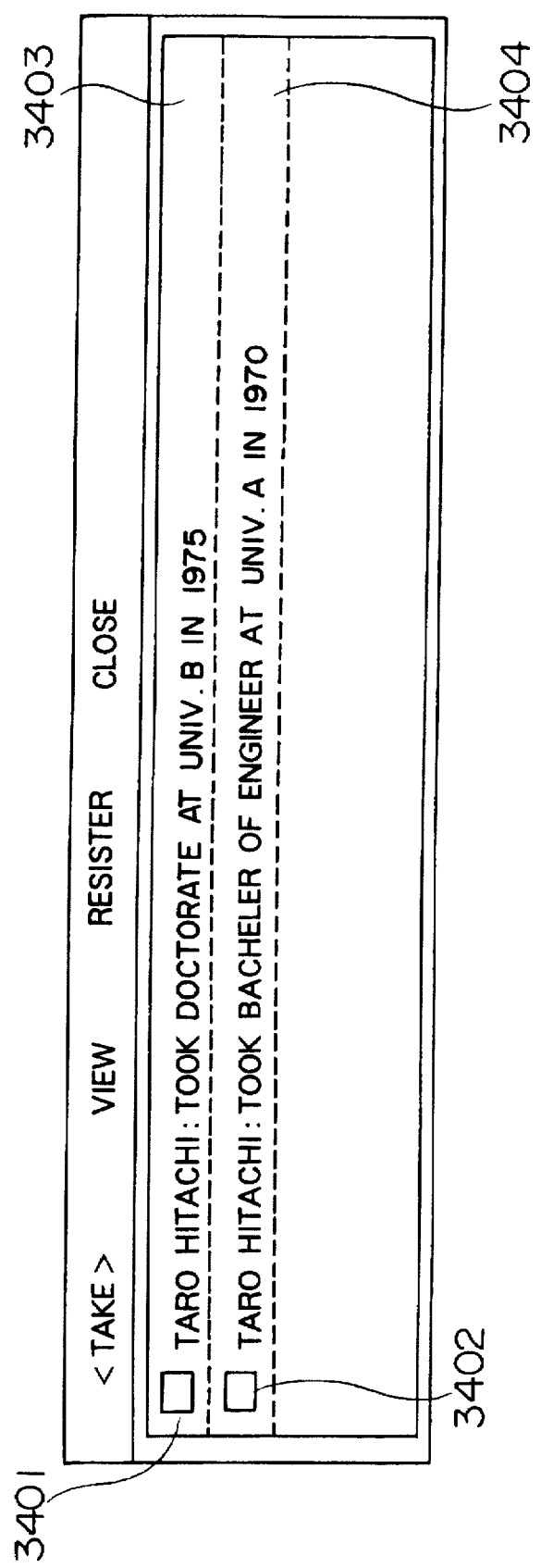
FIG. 34 is a view showing an example of display of facts for "take" in which "Taro Hitachi" is registered as an agent case.

View data with respect to the fact "Taro Hitachi took doctorate at University B in 1975" which has been displayed in the fact window and the fact "Taro Hitachi took bachelor of engineering at University A in 1970" which has been not displayed are generated so that the same relation window is displayed. FIG. 34 shows an initial state of the same relation window for "take" registered with "Taro Hitachi" as a concept expressing agent case. A button 3401 in the left of the fact "Taro Hitachi took doctorate at University B in 1975" 3403 indicates that the fact is in a display state in the fact window. A button 3402 in the left of the fact "Taro Hitachi took bachelor of engineering at University A in 1970" indicates that the fact is in a not-display state.

As another means for indicating the display/not-display state, a means for indicating the state by icon, a means for indicating the state by changing the view condition of the number, or the like, may be employed.

A fact to be additionally displayed can be selected by clicking a button in the same relation window through the mouse. FIG. 35 shows the same relation window displayed when the button 3501 in the left of the fact "Taro Hitachi took bachelor of engineering at University A in 1970" is selected.

When a desired item is selected from the menu by judging a fact from the position pointed by clicking the mouse, view data for the fact to be additionally displayed are generated. Specifically, the case management table and the case order table are traced so that a new view table 2204 for fact is allocated to follow the view table 2202 which has been already allocated and that the pointer 2203 from the last view table for fact is connected thereto (see FIG. 22). After fact information to be added is stored in the view table for fact, view tables for concept are allocated in the order of the view pattern so that the pointer 2205 from the view table for fact is connected thereto. A list of binary trees of case slot fillers 2206 and 2207 is allocated so that concept information expressing the case is stored therein. Further, the display/not-display flag turned to "display" is stored.

Then, view position information for verbal facts is reconstructed so that the fact "Taro Hitachi took bachelor of engineering at University A in 1970" to be additionally displayed can be displayed in the next line just under the currently displayed fact "Taro Hitachi took doctorate at University B in 1975" expressed by the same verbal concept. For example, the Y coordinate of the fact 3606 identified by the number "6" 3603 is replaced by the Y coordinate of the fact displayed one line below (see FIG. 36).

Figure 36:
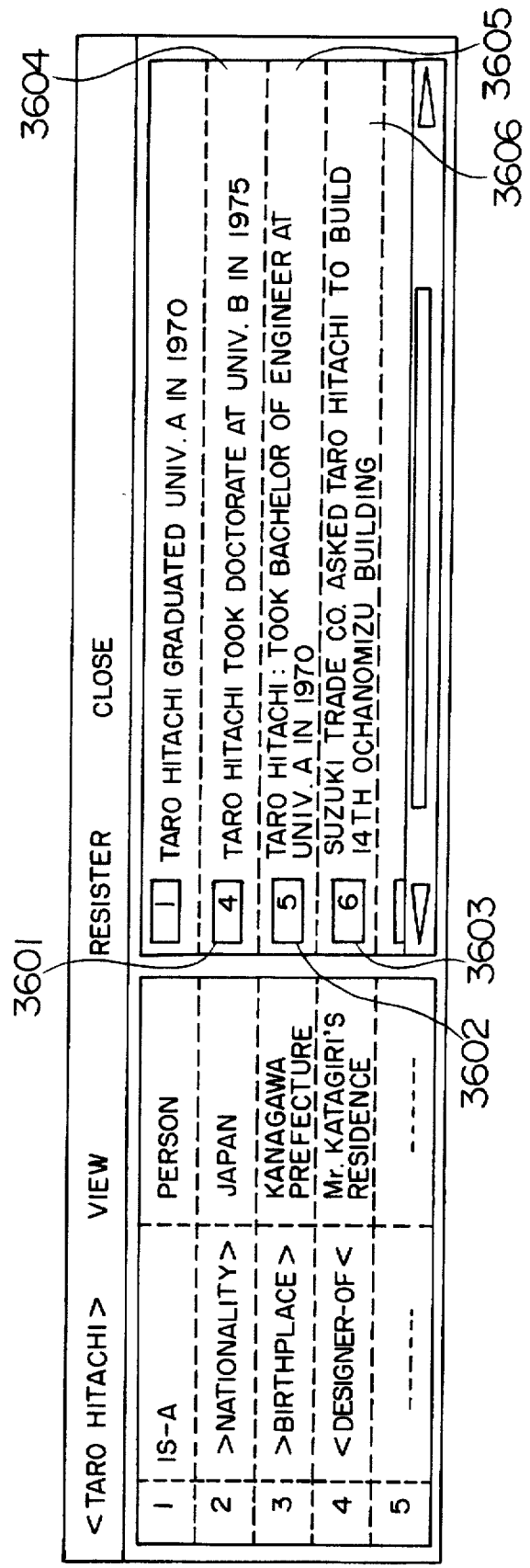
FIG. 36 is a view showing an example of display of facts after the fact selected in FIG. 35 is added.

The fact window is re-displayed on the basis of the view position information thus reconstructed. FIG. 36 shows the fact window which is displayed additionally. The fact window is re-displayed so that the fact to be inserted in the fact window is displayed just under the fact identified by the number "4" 3601 after the number "5" 3602 is given to the fact to be inserted and that facts which have been described are successively moved down by one line. The additional display of fact information can be performed as described above.

In the following, the display of the fact window for concept and subconcept will be described as a fifth embodiment according to the display method of the invention.

The window used herein is a fact window for a concept containing a subconcept among concepts registered in the knowledge base. The window is displayed by clicking a concept in a concept tree through a mouse and selecting a desired item from a list of functions displayed as a pop-up menu. FIG. 37 shows the fact window for concept and subconcept.

In the procedure of from step 5620 to step 5645 (see FIG. 56), a list of fact ID data for verbal facts expressed by the concept "person" is generated. In the procedure of from step 5650 to step 5675, a list of fact ID data for verbal facts relative to subconcepts of the concept "person" is generated. The method for grouping facts by relational concepts, the method for selecting the display/not-display state and the method for generating view data for verbal facts are similar to those used for concepts containing no subconcept.

Then, in the procedure from step 5820 to step 5845 (see FIG. 58), a list of fact ID data for attribute facts expressed by the concept "person" is generated. In the procedure of from step 5850 to step 5875, a list of fact ID data for attribute facts expressed by subconcepts of the concept "person" is generated. The method for storing fact information is similar to that used for concepts containing no subconcept. Then, in step 5450, facts expressed by the concept "person" and subconcepts thereof are displayed in the fact window on the basis of view data in the same manner as in the fact window for concepts containing no subconcept.

With respect to the attribute fact area, facts expressed by super- or whole-concepts of the concept "person", the concept "person" registered as attribute object and attribute value cases and sub- or part-concepts thereof are displayed.

The fact window for "person" is displayed on the basis of the view data thus generated. In FIG. 37, "Yoshio Tanaka" 3701 and "Taro Hitachi" are subconcepts of "person", so that the fact window for attribute concept is displayed by selecting facts having the subconcepts registered.

With respect to attribute facts expressed by subconcepts, ellipses "..." 3703 and the like are displayed because the contents of the facts cannot be perfectly expressed by the attribute item and the concept item. The fact window for attribute concepts is displayed by clicking a string of characters in the attribute item through a mouse and selecting a desired item from a list of functions displayed as a pop-up menu.

A method using a table composed of three items consisting of an item for registered concepts, an attribute item and an item for concepts registered in another case to display the table in the attribute fact area may be used as another method.

The display of fact information for concepts and subconcepts can be performed as described above.

In the following, the browsing of concepts and subconcepts displayed in the fact window will be described as a sixth embodiment according to the display method of the invention.

A fact window corresponding to a concept pointed by a mouse is displayed by selecting a desired item from a list of functions displayed as a pop-up menu through clicking the mouse in one of concepts displayed in the fact window for concept, in the fact window for verbal concept or in the fact window for attribute concept.

Figure 38:
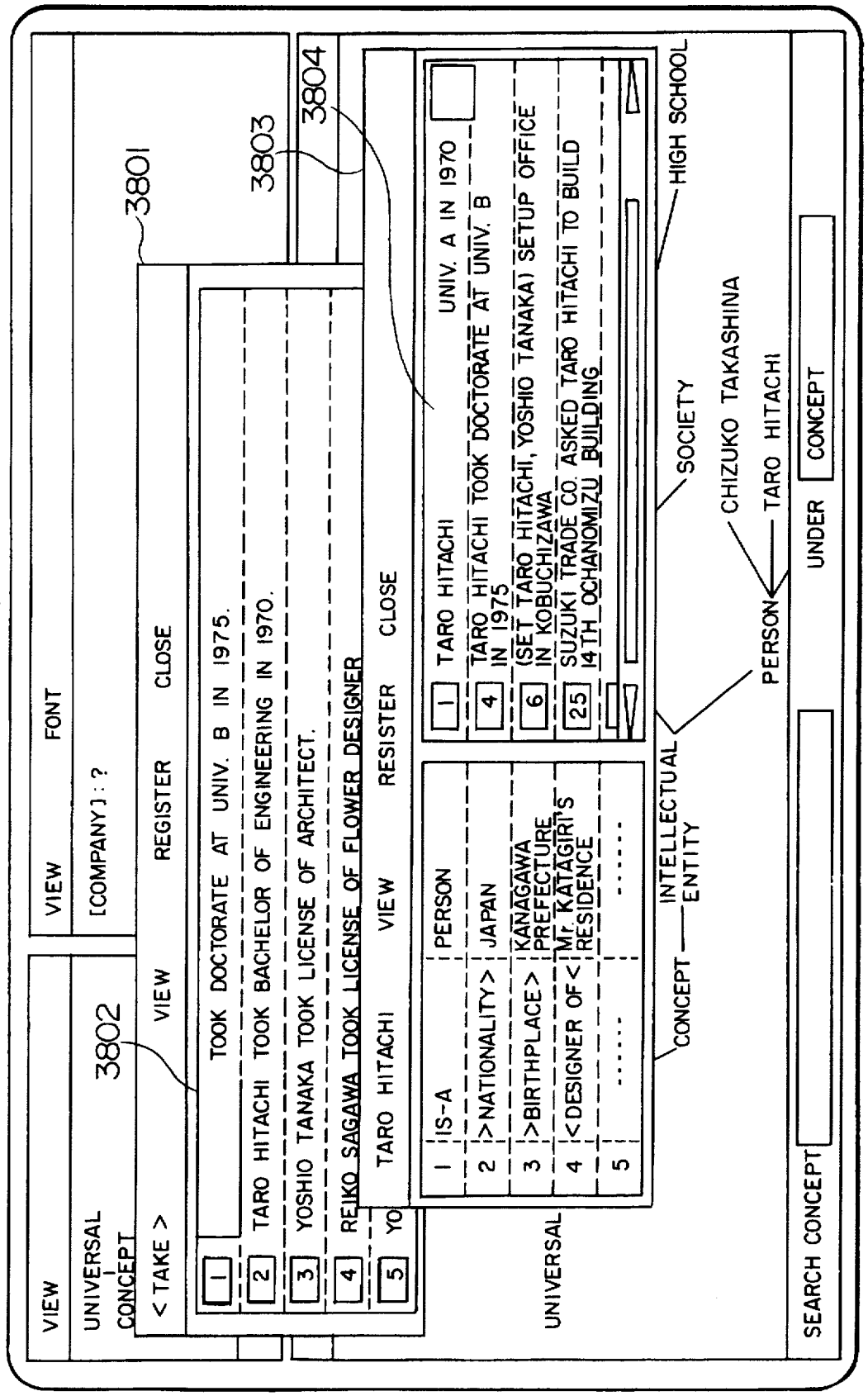
FIG. 38 is a view showing display at browsing through fact information for a verbal concept "take" and a concept "Taro Hitachi"
Figure 39:
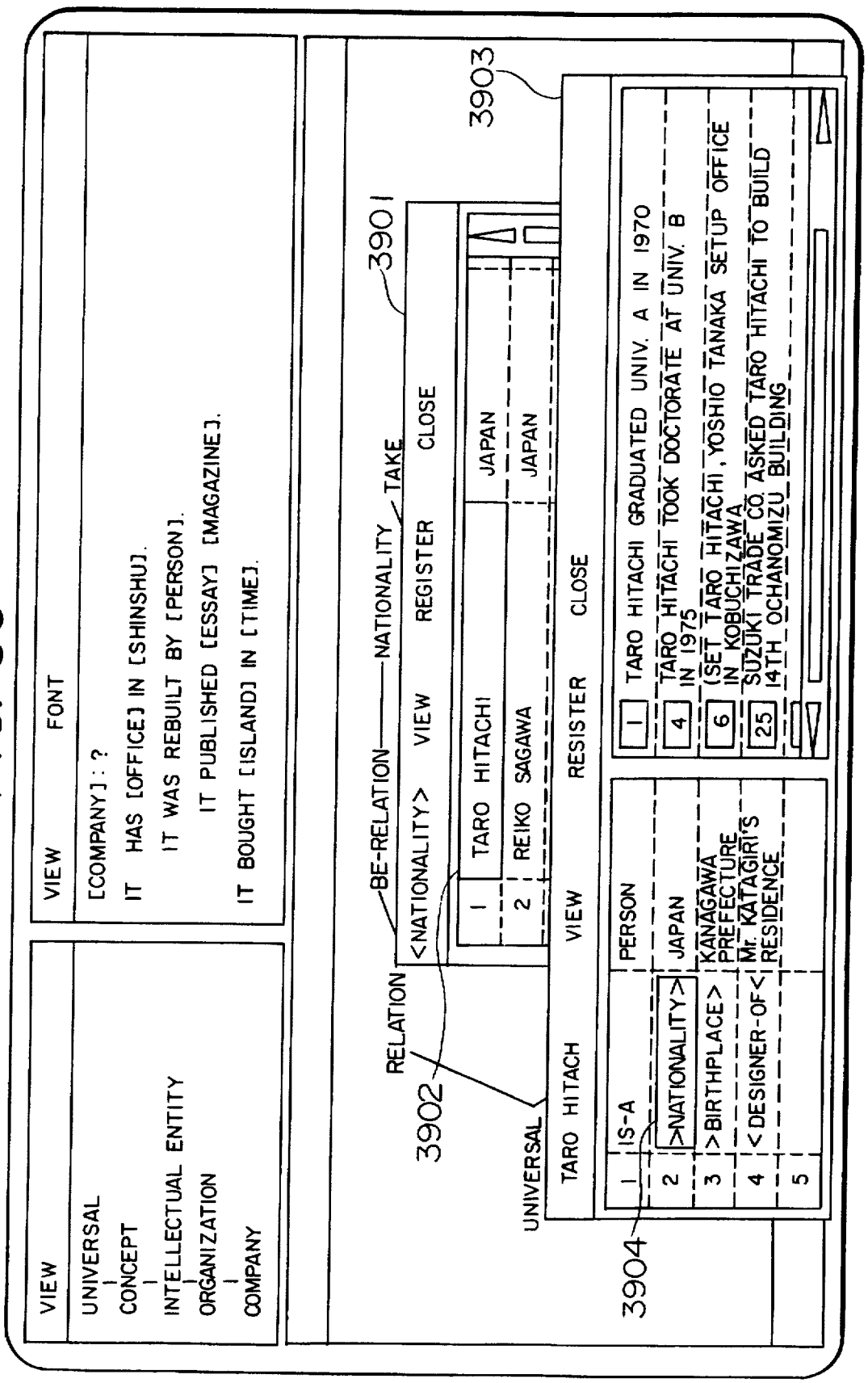
FIG. 39 is a view showing display at browsing through fact information for an attribute concept "nationality" and a concept "Taro Hitachi"

FIG. 38 shows a display in which a concept "Taro Hitachi" is pointed in a fact window for a verbal concept "take". FIG. 39 shows a display in which a concept "Taro Hitachi" is pointed in a fact window for an attribute concept "nationality". In FIG. 38, a concept 37 Taro Hitachi" 3802 is pointed in a fact window 3801 for "take". In FIG. 39, a concept "Taro Hitachi" 3902 is pointed in a fact window 3901 for "nationality". In each of FIGS. 38 and 39, a fact window 3803, 3903 for "Taro Hitachi" is displayed. FIG. 40 shows a display in which a concept "Japan" 4002 is pointed in a fact window 4001 for a concept "Taro Hitachi". In FIG. 40, a fact window 4003 for "Japan" is further displayed.

A fact window for a desired verbal concept is displayed by selecting an item from a list of functions displayed as a pop-up menu through clicking a mouse in a verbal concept displayed in a verbal fact area in a fact window for concept or in a fact window for verbal concept. When, for example, a verbal concept "graduate" 3804 is pointed in a fact window 3803 for a concept "Taro Hitachi" in FIG. 38, a fact window for "graduate" can be displayed.

A fact window for a desired attribute concept is displayed by selecting an item from a list of functions displayed as a pop-up menu through clicking a mouse in an attribute concept displayed in an attribute fact area in a fact window for concept. That is, FIG. 39 also shows a display in which an attribute concept "nationality" 3904 is pointed in a fact window 3903 for a concept "Taro Hitachi".

The verbal fact area and attribute fact area in the fact window for concept, the view area in the fact window for verbal concept and the view area in the fact window for attribute concept have view areas for strings of characters displayed, respectively. Accordingly, a concept or a relational concept displayed in a view area can be detected by retrieving the view area containing a position pointed by clicking a mouse, in the same manner as in the case where a concept or a relational concept is pointed from a node tree by clicking a mouse. The kind of the concept or relational concept thus detected is judged to inquire of the window management table whether there is any fact window for the concept or relational concept. When some fact window has been already displayed, a message is displayed in the same manner as in the step 5460. When there is no fact window displayed, view data are generated correspondingly to the judgment in the same manner as in the procedure following after the step 5420. When the kind is judged to be a concept, a fact window for the concept is displayed on the basis of the view data. When the kind is judged to be a verbal concept, a fact window for the verbal concept is displayed on the basis of the view data. When the kind is judged to be an attribute concept, a fact window for the attribute concept is displayed on the basis of the view data. The method of generating the view data is based on the method in the fact window.

After the window management table is allocated, information in a fact window displayed newly is stored in the table and managed therein.

The browsing of concepts and relational concepts displayed in a fact window can be performed as described above.

In the following, the full-sentence display of facts displayed in a fact window for a concept will be described as a seventh embodiment according to the display method of the invention.

Figure 41:
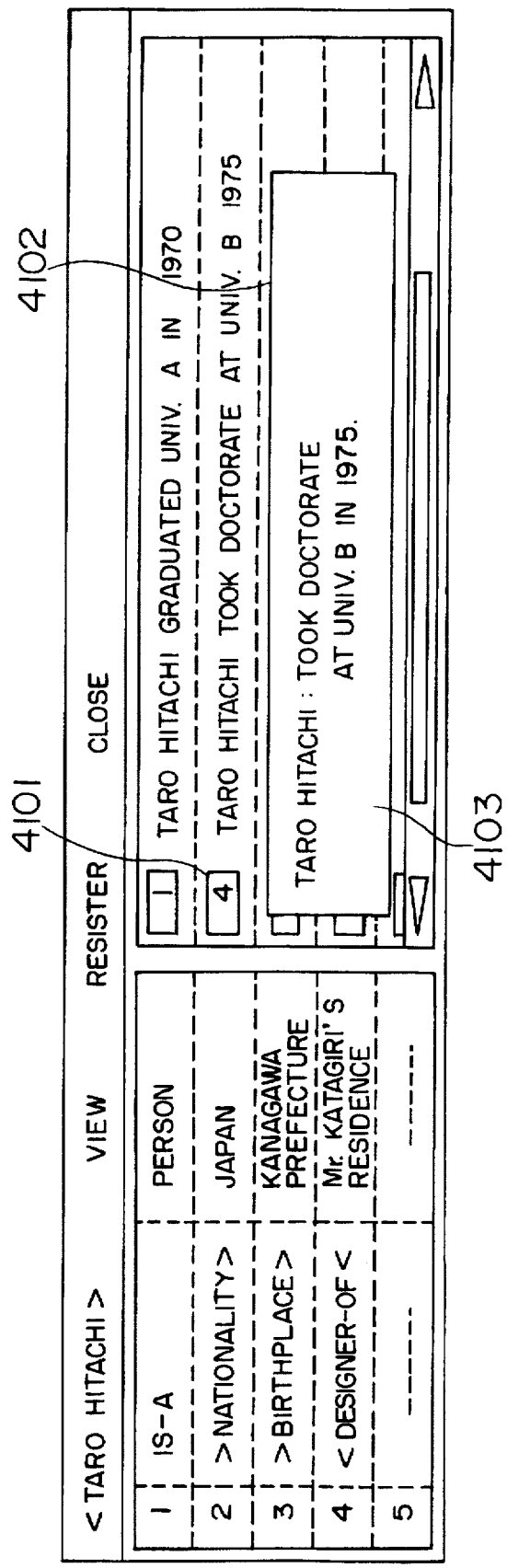
FIG. 41 is a view showing an example of display of the full sentence of a pointed fact.

The full sentence of a fact identified by a number is displayed in a fact window in a sentence by selecting an item from a list of functions displayed as a pop-up menu through clicking a mouse in a number area in a fact window for a concept. FIG. 41 shows a display in which the full sentence of a fact is displayed in a fact window for a concept "Taro Hitachi".

A view table for fact in which a view area including a position pointed by clicking a mouse is set is retrieved by tracing the pointer from the fact window table through detecting the position pointed by clicking the mouse. At the same time, a case management table and a case order table connected to the view table for fact containing the view area by the pointer are retrieved.

The full sentence of a fact selected from a fact window for a concept "Taro Hitachi" in FIG. 41 is displayed as follows. When a temporary number "4" 4101 is pointed by clicking a mouse, the selected fact "Taro Hitachi took doctorate at University B in 1975" is detected in the same manner as in the same relation window.

In the full-sentence display, the view area and the view position of the fact window in a sentence are limited so that the full sentence can be disposed in a suitable place on a display. In this point, the full-sentence display is different from the display of verbal facts.

Information concerning prepositions, case slot fillers and postpositions stored in a view table for concept is referred to by tracing the pointer of the view table for a selected fact. In FIG. 20, the width of a string of characters "Taro Hitachi" in agent case which is the first case is measured. The maximum width of the view area preliminarily set is considered as surplus width, so that the width of the string of characters is compared with the surplus width. When the width is smaller than the maximum width, the view area is set so that the string of characters in agent case is put in the head of the first line. At the same time, the surplus width is updated to be a value obtained by subtracting the width of the string of characters from the maximum width. Then, information concerning a preposition, a case slot filler and a postposition in the time case is referred to. The width the string of characters for the concept "1975" is compared with the surplus width to set the view area. The respective widths of the strings of characters in object case and collection-in case are successively compared with the current marginal width in the same manner as described above.

In the fact, the width of the string of characters "at University B" 3403 in collection-in case is larger than the surplus width. Accordingly, the first line is finished at object case (with respect to which the view position has been already determined) just prior to collection-in case, that is, a new line is begun at collection-in case to set the view area.

When a set of concepts (set concepts), that is, a plurality of concepts, are registered in one case, the following three methods are used for generating strings of characters to be displayed.

The first method is applied to the case where the width of a combination of a preposition, a string of characters "SET" expressing the start of a set of concepts and the first concept thereof, or the width of a combination of a preposition, a string of characters "SET" expressing the start of a set of concepts, the first concept thereof and a concept delimiter mark is larger than the surplus width, or to the case where the width of a combination of the last concept in a set of concepts and a character ")" expressing the end of the set of concepts is larger than the surplus width. In these cases, the view area is set so that a new line is begun.

The second method is applied to the case where the width of a combination of a preposition, a string of characters "SET" expressing a set of characters, the first concept thereof and a concept delimiter mark is not larger than the surplus width but the sum of the width of the combination and the width of the second concept in the set of concepts is larger than the surplus width, or to the case where the width of a combination of the N-th concept in a set of concepts and a delimiter mark is not larger than the surplus width but the sum of the width of the combination and the width of the (N+1)-th concept is larger than the surplus width. In the former case, the view area is set so that a new line is begun at the second concept in the string of concepts. In the latter case, the view area is set so that a new line is begun at the (N+1)-th concept.

The third method is applied to the case where the width of a combination of concepts in a set of concepts and a character ")" expressing the end of the set of concepts is not larger than the surplus width but the sum of the width of the combination and the width of a postposition is larger than the surplus width. In this case, the view area is set so a new line is begun at the string of characters as a combination of the concepts, the characters ")" and the postposition.

After the area for displaying a string of characters as a combination of a preposition, a case slot filler and a postposition is set, the area for displaying a string of characters as a verbal concept is set. Thus, the respective strings of characters are displayed on the basis of the view areas in a fact window in a sentence.

The coordinates of the lower left of a number area are detected, so that a value obtained by adding a predetermined value to the Y coordinate thereof is set as the Y coordinate of the starting point (upper left) of the fact window in a sentence. When the sum of the X coordinate thereof and the maximum value of the view area is not larger than the total width of the display, a value obtained by adding a predetermined value to the X coordinate thereof is set as the X coordinate of the starting point (upper left) of the window. When the coordinates of the lower right of the view area in the window thus set is out of range allowed for display, the coordinates of the starting point is reset so that the view area of the window is in the allowed range. The window obtained by setting the view area as described above is a fact widow in a sentence in FIG. 41.

Thus, the display of the full sentence of a fact displayed in a fact window for a concept can be performed.

In the following, the display of a candidate for a query condition will be described as an eighth embodiment according to the display method of the invention.

Figure 42:
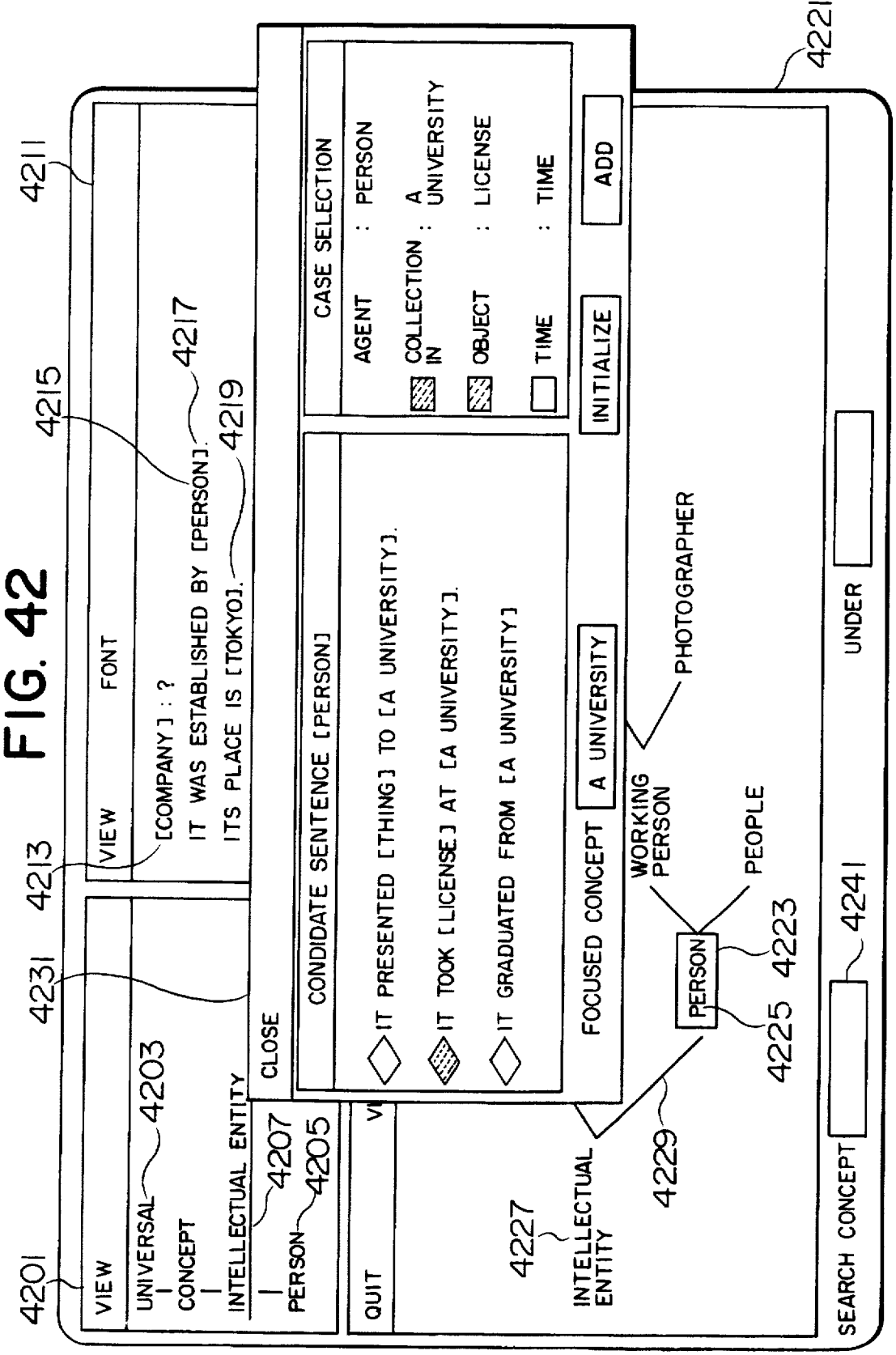
FIG. 42 is a view of a group of view windows at the time of sentence generation in an embodiment of the present invention.

FIG. 42 shows a group of windows for conversation with a user at the time of query editing. The concept selected by the user through clicking the left button of a mouse at the time of query editing is called "current concept". The current concept is displayed emphatically. In this embodiment, the current concept is emphasized by a rectangular form 4223. The sentence forming a condition for retrieving a concept is called "query".

The basic window is classified into three, namely, super-concept window 4201, query editing window 4211 and node tree window 4221. Among concepts from the uppermost concept "UNIVERSAL" 4203 in the knowledge base to the current concept, a group of super-concepts connected to the current concept by is-a relations are displayed in the super-concept window 4201.

A query is displayed in the query editing window 4211. The part enclosed by brankets in the window represents a case in which replacement is allowed. One of concepts enclosed by brankets is the current concept. The concept as a base for adding a query condition is called "root concept in a query".

A node tree for concepts allowed to be put in a case using the current concept in a query is displayed in the node tree window 4221 so that the current concept is arranged therein. The uppermost concept among case constraint concepts is called "anchor concept". The uppermost concept among concepts displayed in the window is called "root concept in a tree".

The restriction addition window 4231 is popped up when a new restriction line is added to the query. The window is displayed by user's selecting an item from a list of functions in a pop-up menu through clicking a mouse in a concept in the query.

In FIG. 42, the root concept in the query is "company" 4213, and the conditions added to "company" are "Its place is [Tokyo]" 4217 and "it was established by [person]" 4219. Further, a condition (restriction) based on the relational concept "take" is to be added to the "person" by using the restriction addition window 4231. In the node tree window, a string of characters "intellectual entity" 4227 is displayed, and strings of characters "person" 4225 and "organization" as subconcepts thereof are displayed in suitable places. The is-a relations between "intellectual entity" and "person" and between "intellectual entity" and "organization" are expressed by connecting these concepts by line. The line 4229 represents the is-a relation between "intellectual entity" and "person". In this case, the root concept in the tree is "intellectual entity" 4227.

Figure 43:
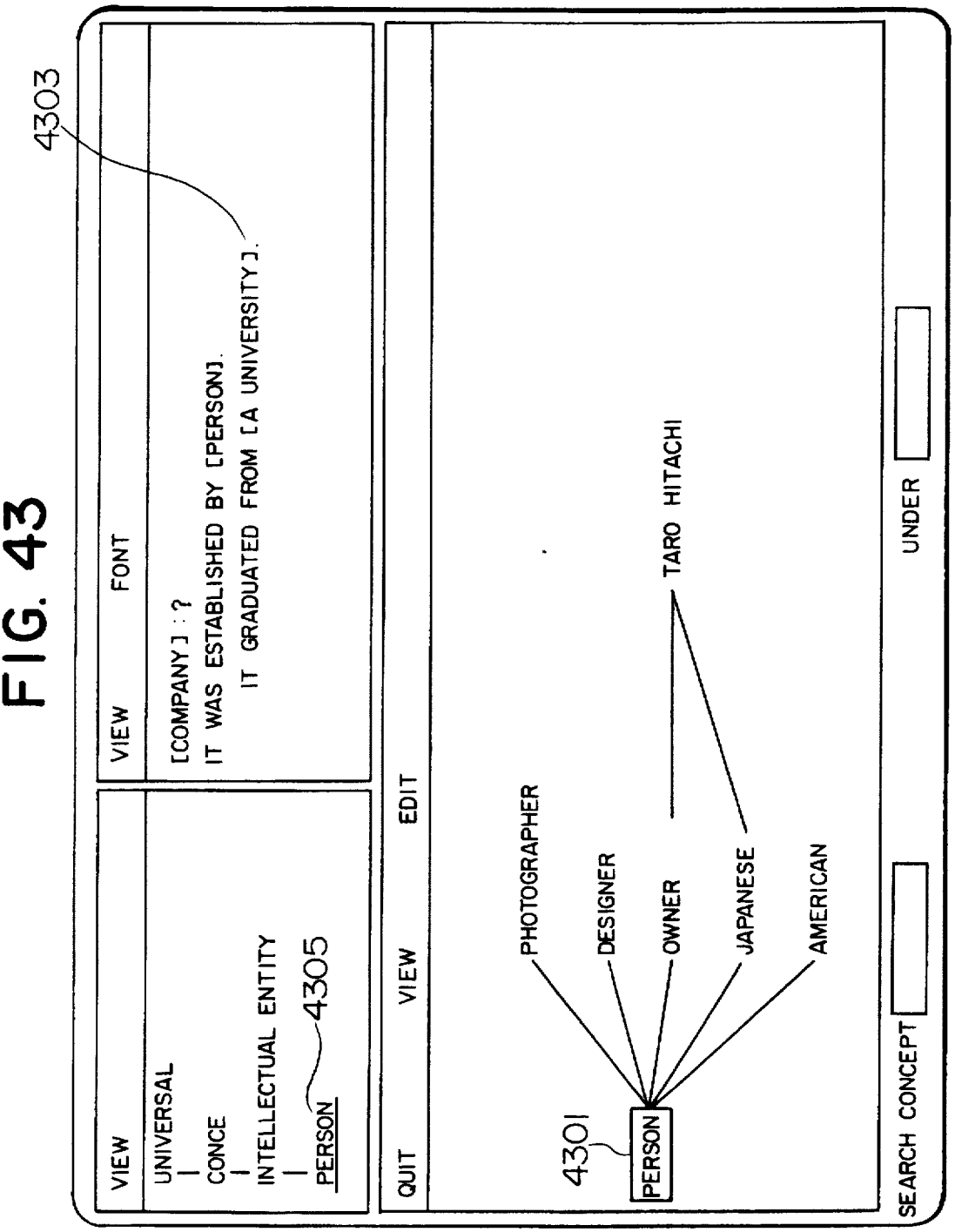
FIG. 43 is a view of the case where a participial modification sentence is generated.

In the query editing window 4211, "company" 4213 is a root concept in a query. A concept enclosed in brankets in the query can be changed to the current concept by pointing a string of characters expressing the concept enclosed in the branckets through clicking a mouse. The node tree in the node tree window is displayed so that a category allowed to be inputted in the case using the current concept in the query is put in the central place. Accordingly, when a concept except the current concept in the query editing widow is pointed as a new current concept, the node tree in the node tree window is automatically changed to a new node tree having the new current concept in the central place. In FIG. 42, the current concept "person" 4215 is used as agent case of a relational concept "establish". When "intellectual entity" is set as a case constraint concept of agent case in a template of "establish", the uppermost concept among concepts permitting the change of the current concept in the case, such as "intellectual entity", is the anchor concept. The anchor concept is displayed emphatically as "intellectual entity" 4207 in the super-concept window. Although FIG. 42 shows the case where the case constraint concept coincides with the anchor concept, the two do not always coincide with each other. In FIG. 43, the current concept is "person" 4310, which is restricted as follows.

"It graduated from [University A]" (4303)

The "person" is used as agent case of "graduate". Accordingly, no concept but concept used as agent case of "graduate" can be put in agent case of "establish". The case constraint concept of agent case in the template of "graduate" is "person". Accordingly, the category of concepts permitting the change of the current concept is a common portion contained in subconcepts of "intellectual entity" and "person", that is, a set of subconcepts of "person". In this case, the anchor concept is "person", so that the super-concept window shows that "person" 4305 is an anchor concept.

Figure 44:
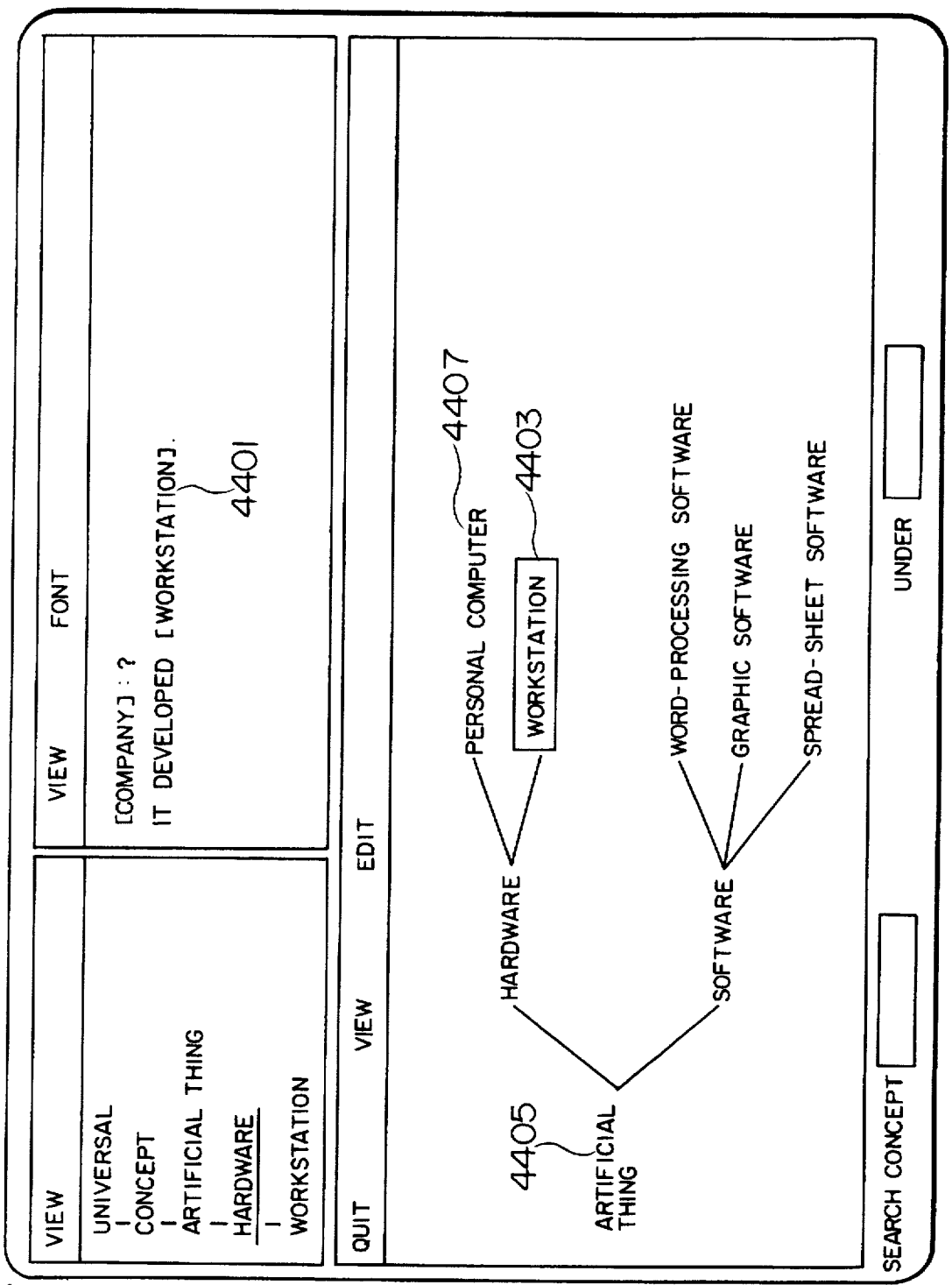
FIG. 44 is a view showing a display state in which a plurality of anchor concepts are provided.

When an anchor concept is given, the root concept in the tree is equal to the anchor concept. When a plurality of anchor concepts are given, the root concept in the tree is equal to the lowermost concept among common super-concepts of the anchor concepts. FIG. 44 shows the case where a plurality of anchor concepts are given. In the drawing, the current concept is "workstation" 4403. The current concept is used as object case of "develop". The case constraint concepts of object case of the template of "develop" are "hardware" and "software". Because there is no restriction given to the current concept, the anchor concepts are "hardware" and "software". The root concept in the tree is the lowermost concept "artificial thing" 4405 among super-concepts common to "hardware" and "software". Concepts subsumed under "artificial thing" are displayed in the node tree window.

Concepts subsumed under the anchor concept in the super-concept window, the query editing window and the node tree window are displayed by white-on-black characters as shown in this embodiment to distinguish the concepts from other concepts. Display in italic types, display in different fonts, display in different colors or display in pointers such as frames, underlines or the like may be used as another distinguishing method. Further, the current concept is displayed with another pointer, for example, in this embodiment, a rectangular form. As a result, the user can see at a glance what concept can be put in the case using the current concept in the query. FIG. 44 shows that "artificial thing" 4405 expressed by other characters than the white-on-black characters cannot be used in the case of "workstation" 4403 used in the query sentence "It developed [workstation]" 4401 to substitute for "workstation" but other concepts expressed by white-on-black characters can be used.

The display of a candidate for a query condition can be performed as described above.

In the following, the display of a verbal query and an attribute query allowed to be added will be described as a ninth embodiment according to the display method of the invention. The case where "Company placed in Tokyo and established by person who took doctorate at University A" is retrieved is used as an example.

Figure 45:
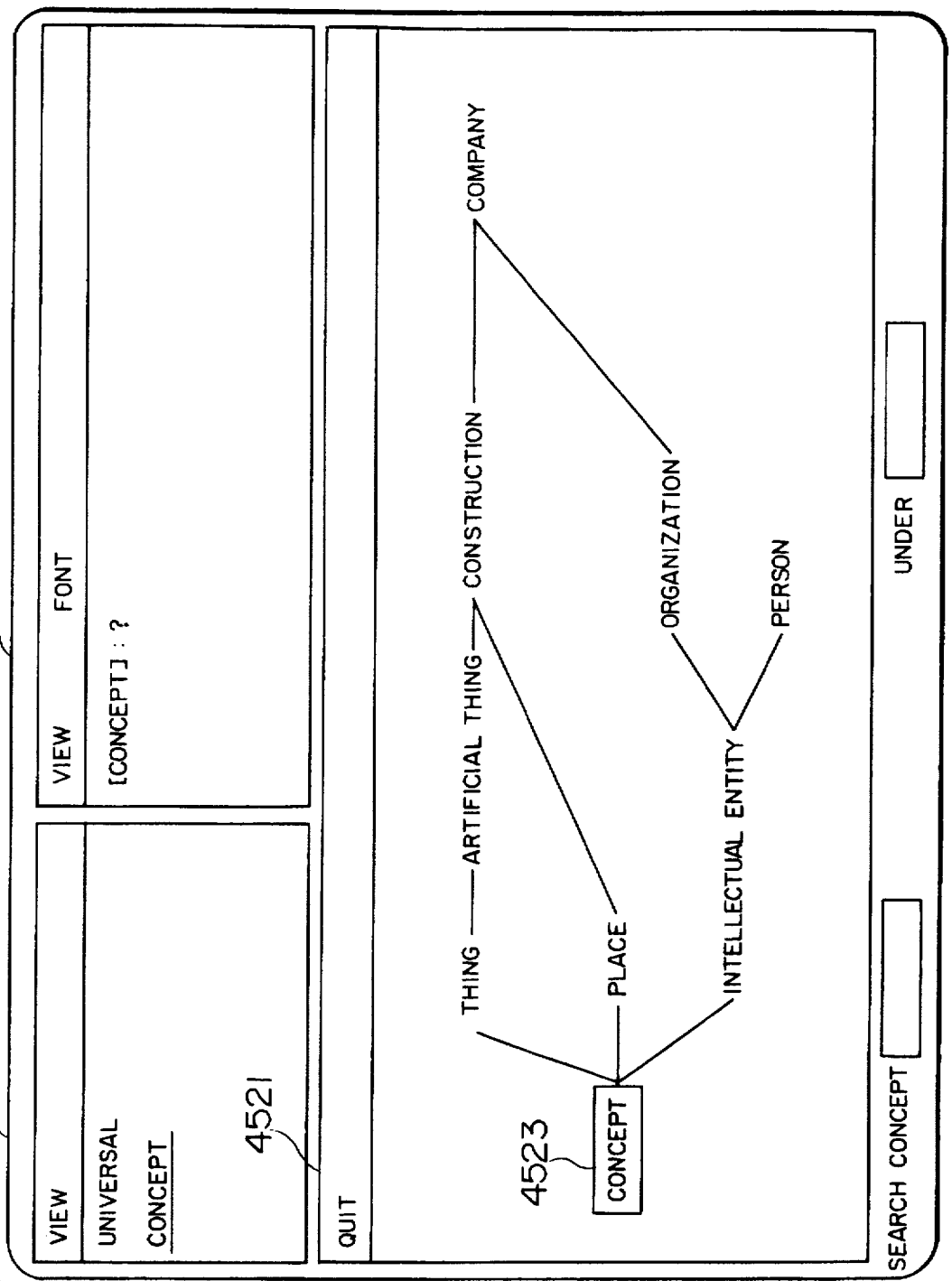
FIG. 45 is a view showing a display state in which the query condition is initialized.

When a query used for the previous retrieval remains in the query editing window, the query is initialized by selecting "reset" from the "display" menu in the window. As shown in FIG. 45, the root concept in the query in the query editing window is changed to "concept" 4511 and, at the same time, the root concept in the tree and the anchor concept are changed to "concept" 4523. This is because objects of the retrieval are conceptual concepts, that is, concepts subsumed under "concept" (in the node tree). In this case, the object of the retrieval is "company". Accordingly, when "company" 4525 in the node tree window is pointed by clicking a mouse in step 6600, the root concept in the query is changed to

[Company]:?

so that super-concepts of "company" are displayed in the super-concept window. When there is no restriction given to "company", the condition in step 6610 is not satisfied but the retrieval can be performed in step 6680. In this case, all companies registered in the knowledge base are retrieved. In the addition of a restriction, "new restriction addition" in step 6620 is fitted. When the root concept "company" in the query in the query editing window is pointed by clicking a mouse in step 6710, a list of functions allowed to be executed is displayed as a pop-up menu in step 6720.

Figure 23:
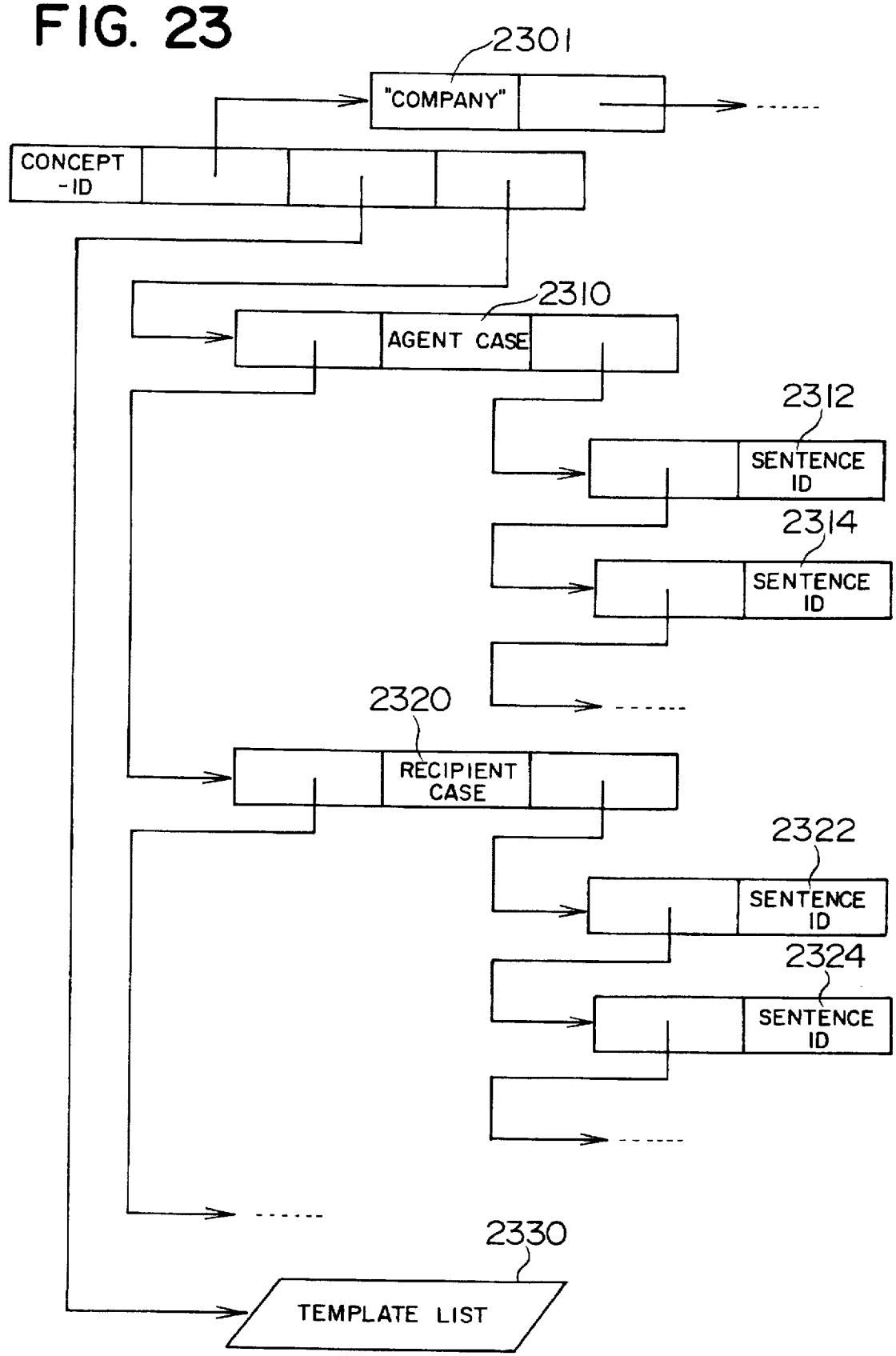
FIG. 23 is a view showing a state in which information concerning a pointed concept is held.

When an item is selected from the list in step 6730, the pointer to a list of relational template ID allowed to give a restriction to "company" is initialized to NULL and then a list of template ID is generated in step 6810. Then, in step 6820, a list of facts using the concept "company" is obtained from the knowledge base. FIG. 23 shows a fact using a concept named "company" 2301 and the condition in which information of a template allowed to use the concept is stored. In this drawing, the part enclosed in double quotation marks, such as "company" 2301, represents that the enclosed information is a string of characters. Although this drawing shows the case where the string of characters such as "company" is directly held, the invention can be applied to the case where string ID instead of the string of characters is held so that a table expressing the correspondence between string ID and the string of characters is provided separately. For simplification of description, this drawing shows the case where the string of characters is directly held. This rule can be applied to all strings of characters enclosed in double quotation marks.

The list of ID for facts using a concept is held in each case. In FIG. 23, a fact identified by fact ID 2312 and a fact identified by fact ID 2314 use "company" as agent case. A fact identified by fact ID 2322 and a fact identified by fact ID 2324 use "company" as recipient case. A list of these fact ID data is obtained.

Figure 24:
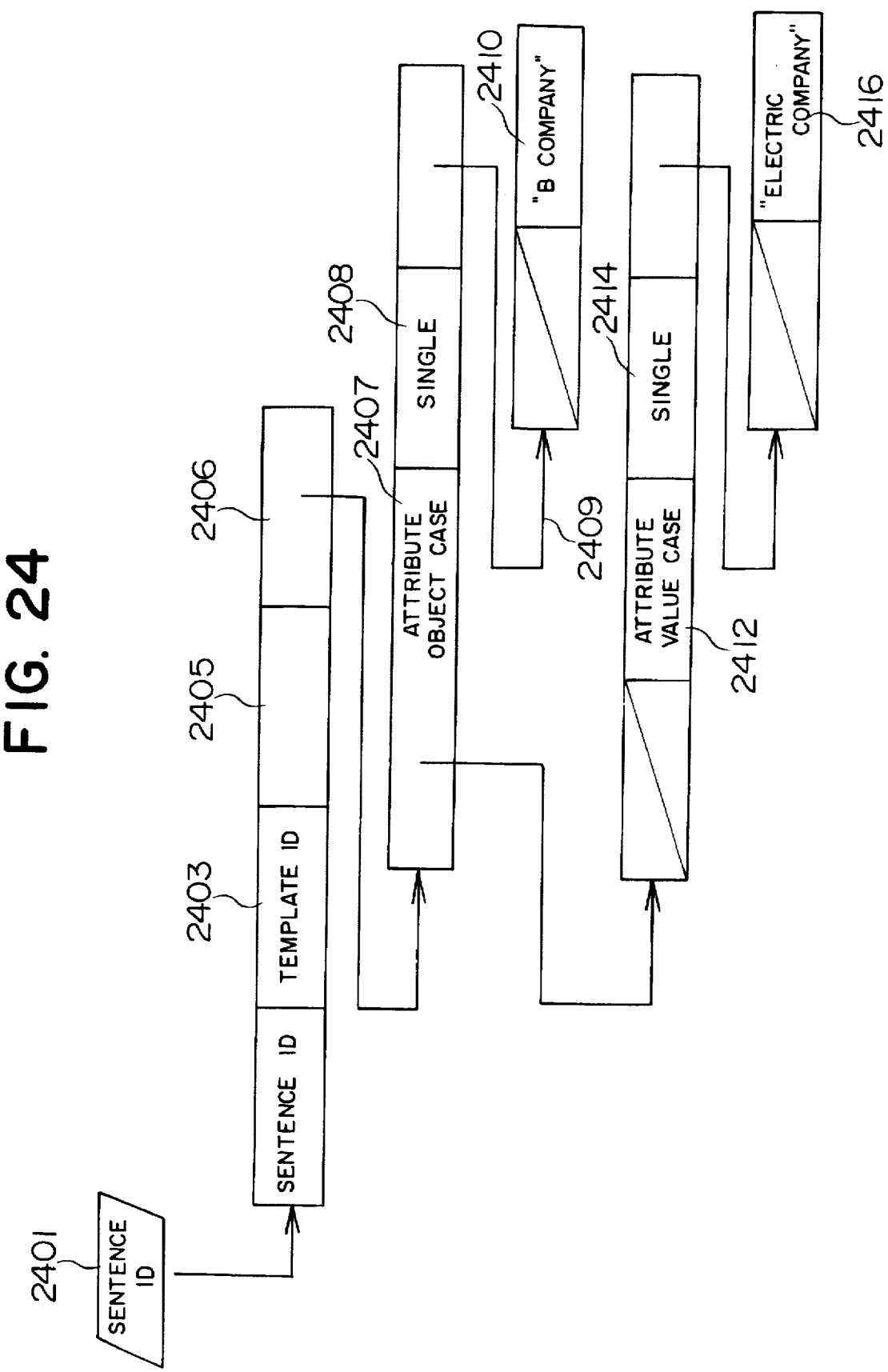
FIG. 24 is a view showing a state in which information concerning a sentence due to attributes is held.

When the pointer to the list of fact ID thus obtained is not NULL (step 6830), template ID of a relation used by the fact pointed by the pointer is obtained in step 6832. Information relative to the fact can be obtained from the fact ID 2401 pointed by the pointer because the information is stored as shown in FIG. 24. Template ID 2403 of a relation used by the fact is stored, so that the template ID can be obtained.

Figure 25:
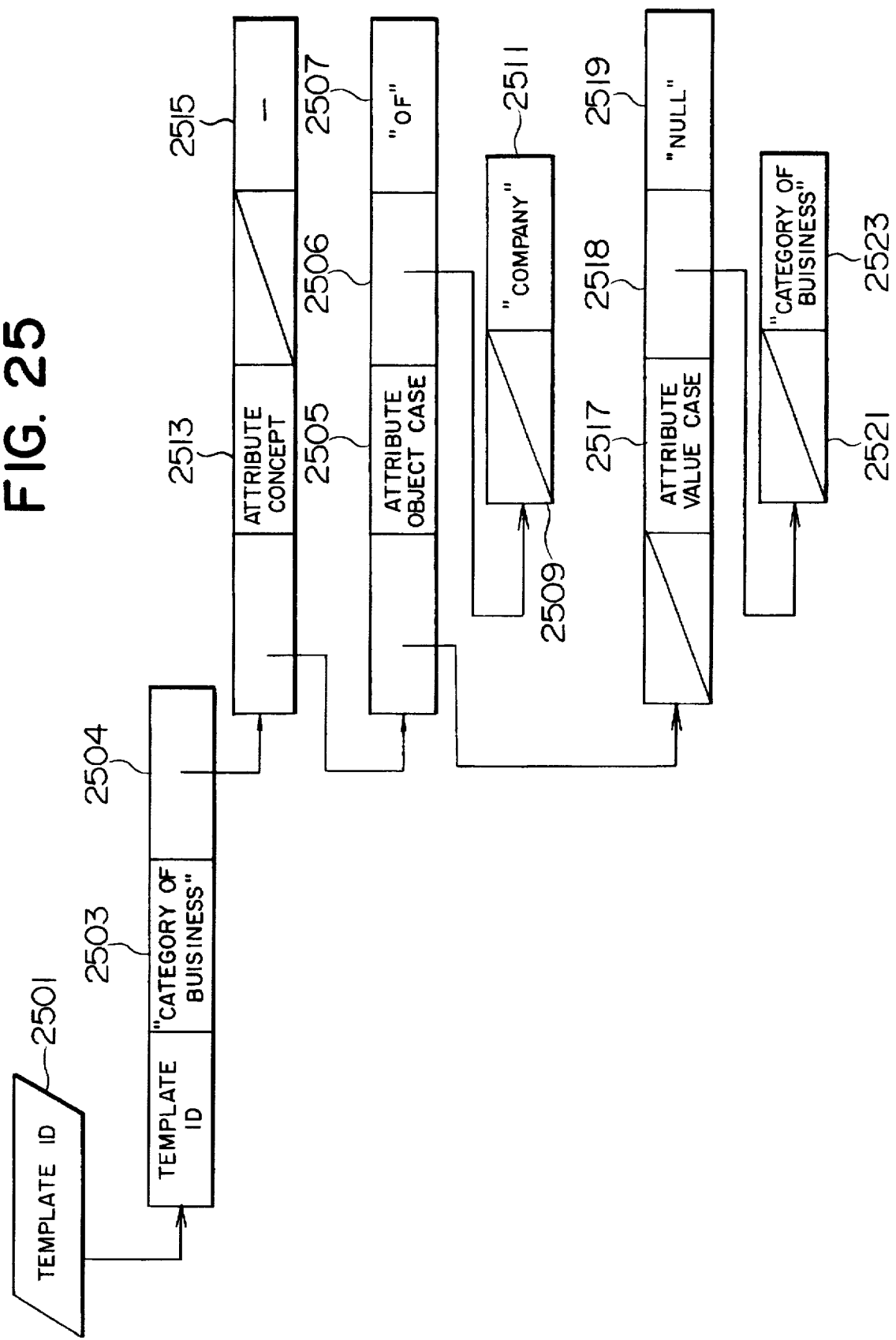
FIG. 25 is a view showing a state in which information concerning a template for attributes is held.

Information relative to the template is stored as shown in FIG. 25, so that the information can be obtained from template ID. A relational concept 2503 is stored, so that FIG. 25 shows a template of an attribute concept "industry". Accordingly, when the template ID 2403 in FIG. 24 coincides with the template ID 2503 in FIG. 25, the fact identified by fact ID 2401 is a fact expressed by a relation "type-of-industry". In the pointer 2504, information concerning the case order, information concerning case constraint concepts, information concerning postpositions in Japanese and information concerning prepositions in English are stored. These data are displayed in the order determined by the pointer. In FIG. 25, data are displayed in the order of attribute object case 2505, attribute concept 2513 (in this case, "type-of-industry") and attribute value case 2517. The pointers 2506 and 2518 express case constraint concepts of respective cases. The case constraint concept of attribute object case 2505 is "company" 2511 and the preposition is "of" 2506. When there are a plurality of case constraint concepts, these are indicated by the pointer 2509. The case constraint concept of attribute value case is "type-of-industry" 2523. Accordingly, this template shows the following sentence.

"Type-of-industry of [company] is [type-of industry]"

The pointer 2406 in FIG. 24 indicates the contents of the cases of the template. "B Company" 2410 and "electric company" 2416 are stored in attribute object case 2407 and attribute value case 2412, respectively. Because one case is filled with one concept, "single" 2408 is stored therein. When one case is filled with a plurality of concepts, the concepts are connected by the pointer 2409. When the relation between the concepts means "A and B", "and" 2408 is stored therein. When the relation between the concepts means "set of A and B", "set" is stored therein. When the relation between the concepts means "A or B", "or" is stored therein. Accordingly, when the template ID 2401 in FIG. 24 is equal to the template ID 2501 in FIG. 25, the fact in FIG. 24 expresses the following meaning.

"Type-of-industry of B company is electric company"

Figure 26:
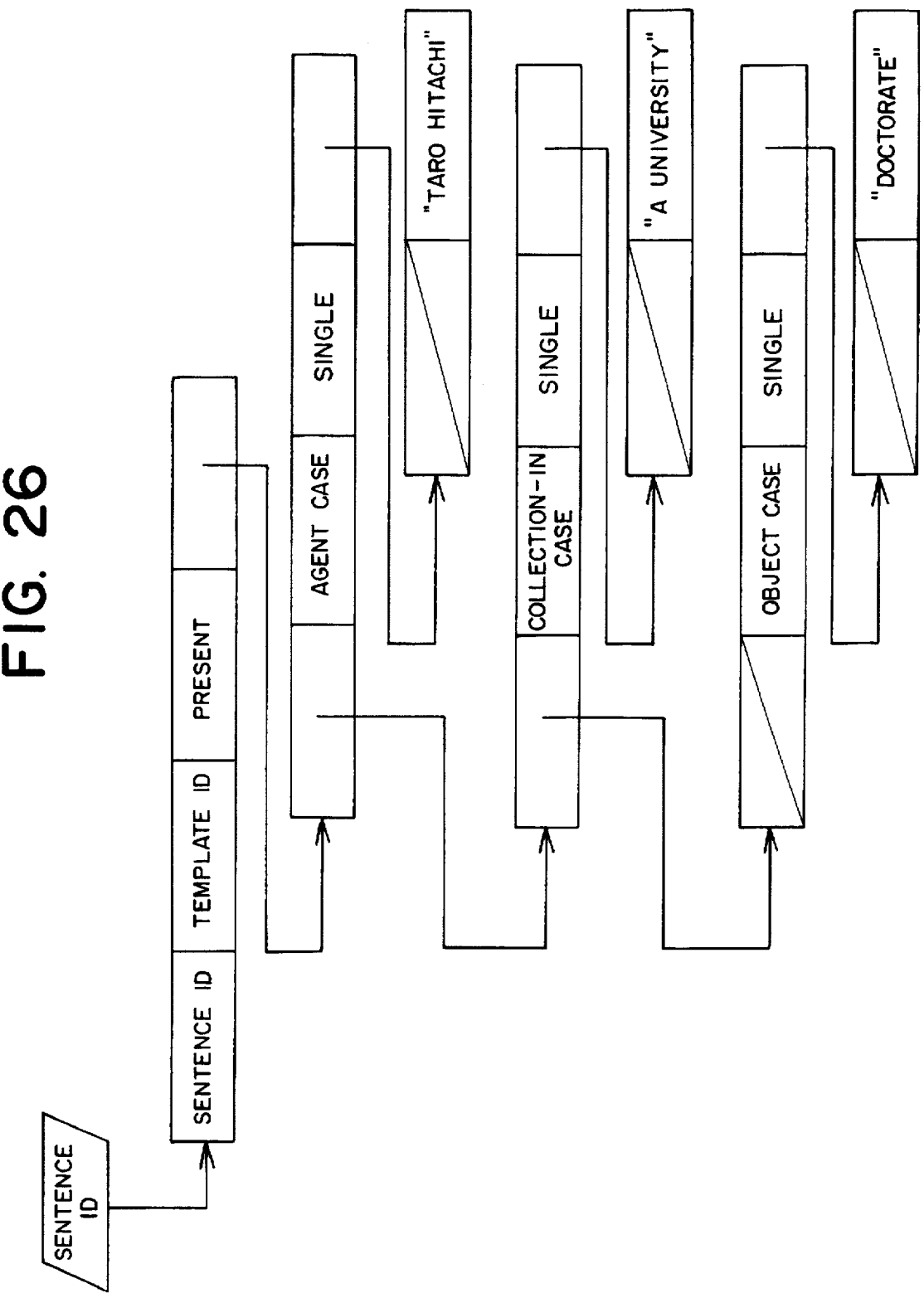
FIG. 26 is a view showing a state in which information concerning a sentence due to relations is held.
Figure 27:
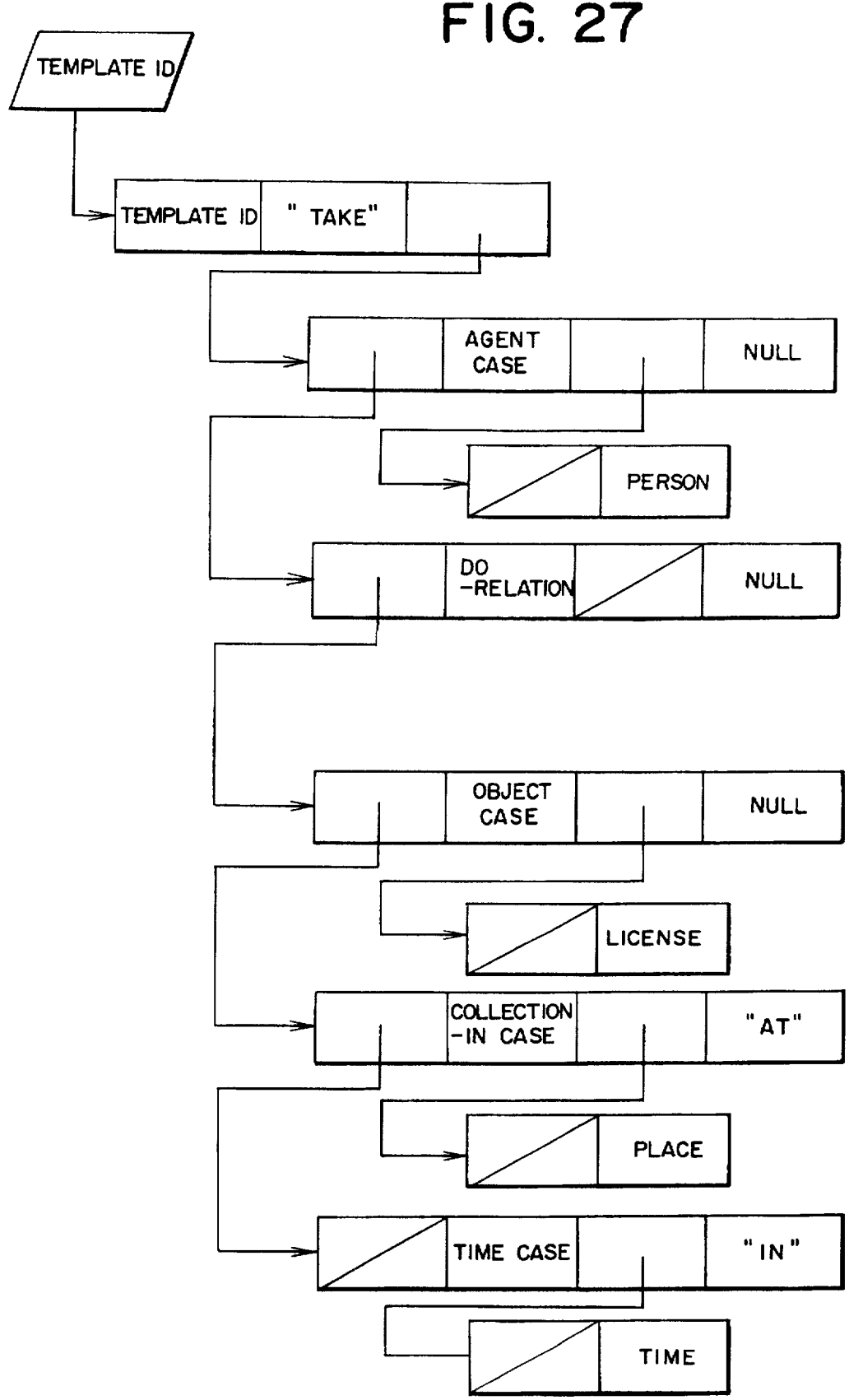
FIG. 27 is a view showing a state in which information concerning a template for relations due is held.
Figure 28:
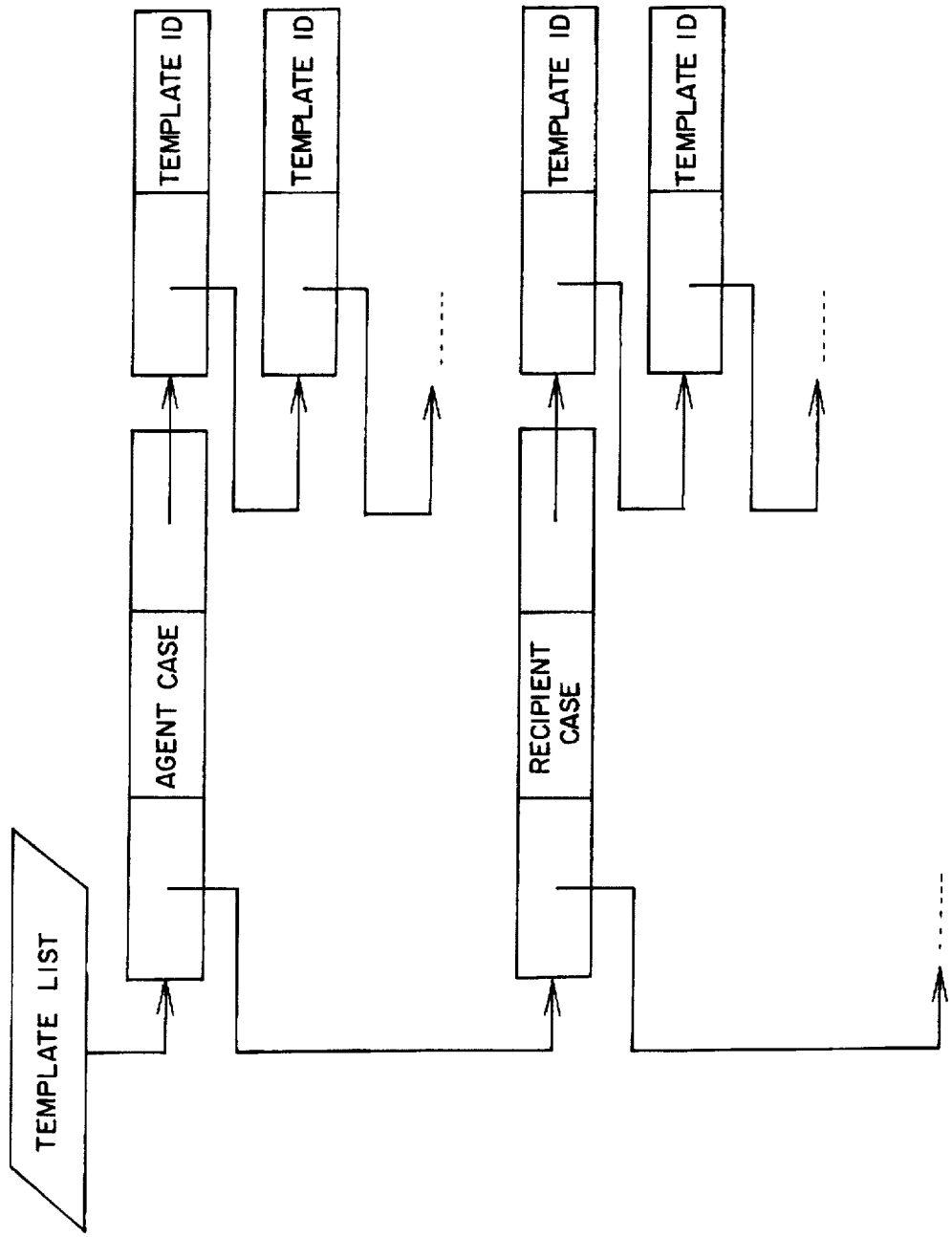
FIG. 28 is a view showing a state in which information for retrieving templates allowed to use a pointed concept is held.

FIG. 24 shows the expression of a fact for attribute concept. A fact for verbal concept is expressed as shown in FIGS. 26 and 27. This shows a fact expressing the following meaning.

"Taro Hitachi took doctorate at University A"

In step 6834, a judgment is made as to whether the template ID obtained by the step 6832 is in the list of template ID generated by the step 6810. When there is no template ID, the template ID is added to the list of template ID in step 6838. Then, the pointer to the list of fact ID is moved by one to check the next fact, whereafter the situation of the routine goes back to the step 6830. This procedure is repeated unless the pointer to the list of fact ID is NULL.

Figure 46:
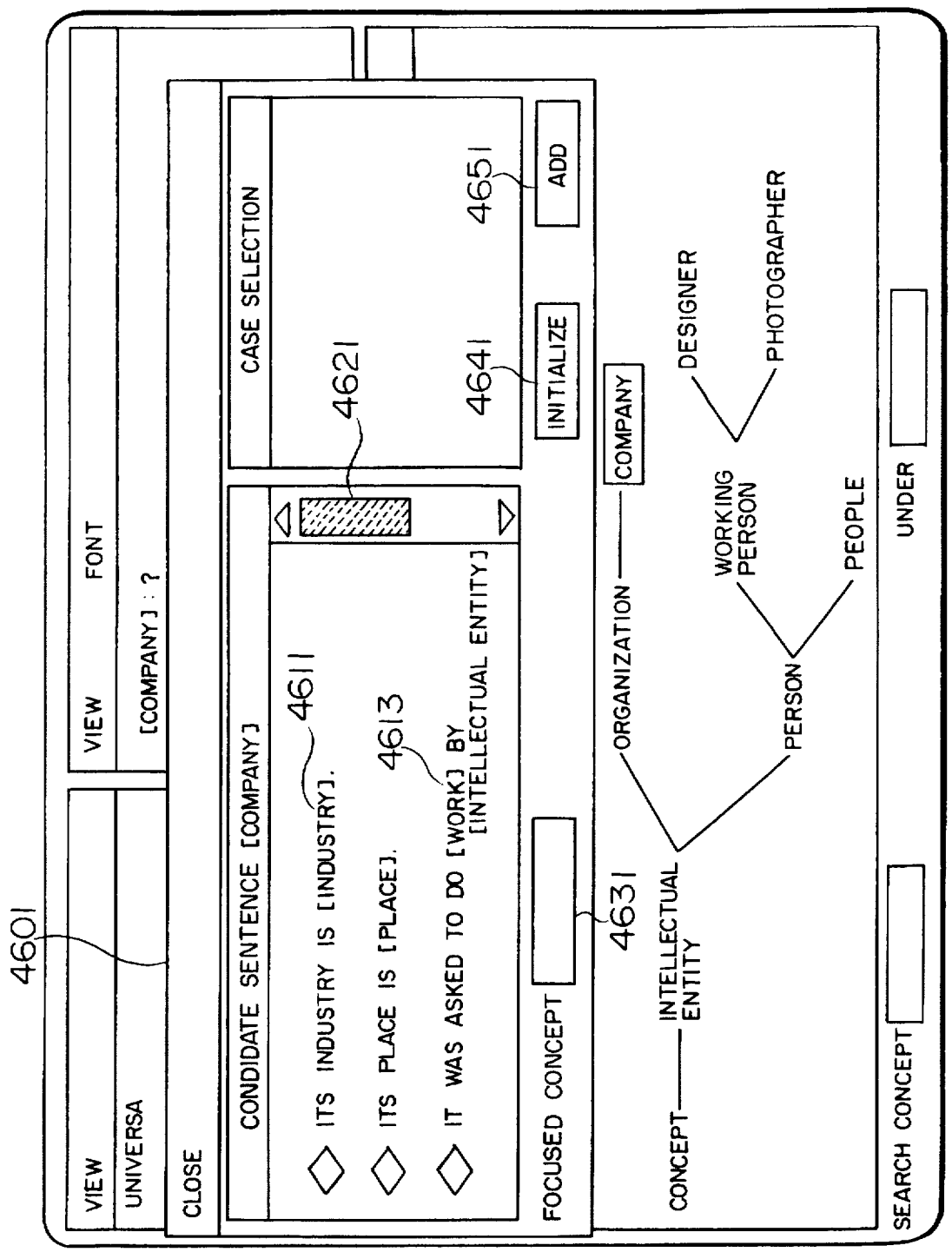
FIG. 46 is a view showing an example of display in which candidate sentences are provided.

Thus, a list of relations using the concept "Company" can be obtained so that the relations are unique. In step 6850, the list of relations can be exhibited to the user in the form of a template 4601 as a condition allowed to be added to "company" 4603 as shown in FIG. 46. The case filled with "company" in the template thus exhibited is expressed by a pronoun corresponding to the case, such as "its" 4611, "it" 4613 or the like. When the number of templates exhibited is so large that the templates cannot be put in one window, a scroll bar 4621 appears to indicate the rate of the exhibited templates to all candidate templates. Although this embodiment shows the case where relational templates are obtained from sentences using a concept as a condition allowed to be given to the concept, templates allowed to use the concept can be exhibited as candidates. FIG. 23 shows the case where a list 2330 of templates allowed to use the concept is obtained on the basis of concept ID. The list of templates is held in each case in the same manner as the list of fact ID in FIG. 28.

In this embodiment, candidates for templates used in facts are exhibited because the templates are used in the process of generating a query. If a candidate selected from templates not used in facts is used in a query, the result cannot be fitted so that a large number of candidates are required. In this embodiment, however, templates of relations are extracted as candidates from facts. Accordingly, even if the user searches a large number of relations, a reduced number of relations having the possibility that results are obtained can be added as conditions. Further, the number of exhibited relations is reduced so that it is easy for the user to find the conditions to be added. In the case where the invention is applied to the inputting of facts, a list of templates allowed to be used can be exhibited as a list of candidates.

Thus, the display of a verbal query and an attribute query allowed to be added can be performed.

In the following, the filtration of candidates will be described as a tenth embodiment according to the display method of the invention. When the number of relations exhibited in the restriction addition window is large, relations as candidates can be filtered in step 6860.

When, for example, a restriction is to be given to "Company" 4603 in a relation using "person" 4605 in FIG. 46, "person" is inputted in a focused concept input box 4631 in step 6870. In step 6910, a judgment is made as to whether the pointer to the list of template ID is NULL. When the pointer is not NULL, template ID pointed by the pointer is obtained in step 6920 and then a focused concept usable flag for indicating whether the template can use the focused concept is initialized to zero.

Then, a judgment is made as to whether the focused concept can be used in the case in the template. In the examination of the template in FIG. 25, a judgment in step 6940 is first made as to whether the pointer 2504 is NULL. When the pointer is not NULL, the case constraint concept (in this case, "company" 2511) of the case pointed by the pointer is obtained in step 7010. Then, in step 7020, a judgment is made as to whether the focused concept is lower than the case constraint concept. When the focused concept is subsumed under the case constraint concept, the focused concept is embedded in the position of the case constraint concept and then the focused concept usable flag is set to 1. Then, in step 7050, the pointer 2504 is moved by one and then the situation of the routine goes back to the step 6940. This procedure is repeated unless the pointer is NULL, that is, before the examination of all cases is completed. Here, with respect to the template in which at least one case can be filled with the focused concept, the focused concept usable flag is 1. In step 6960, a judgment is made as to whether the focused concept usable flag is zero. When the flag is zero, the template ID obtained by the step 6920 is removed from the list of template ID in step 6970. In step 6980, the pointer to the list of template ID is moved by one to check the next template and then the situation of the routine goes back to the step 6910. This procedure is repeated unless the pointer is NULL.

Figure 47:
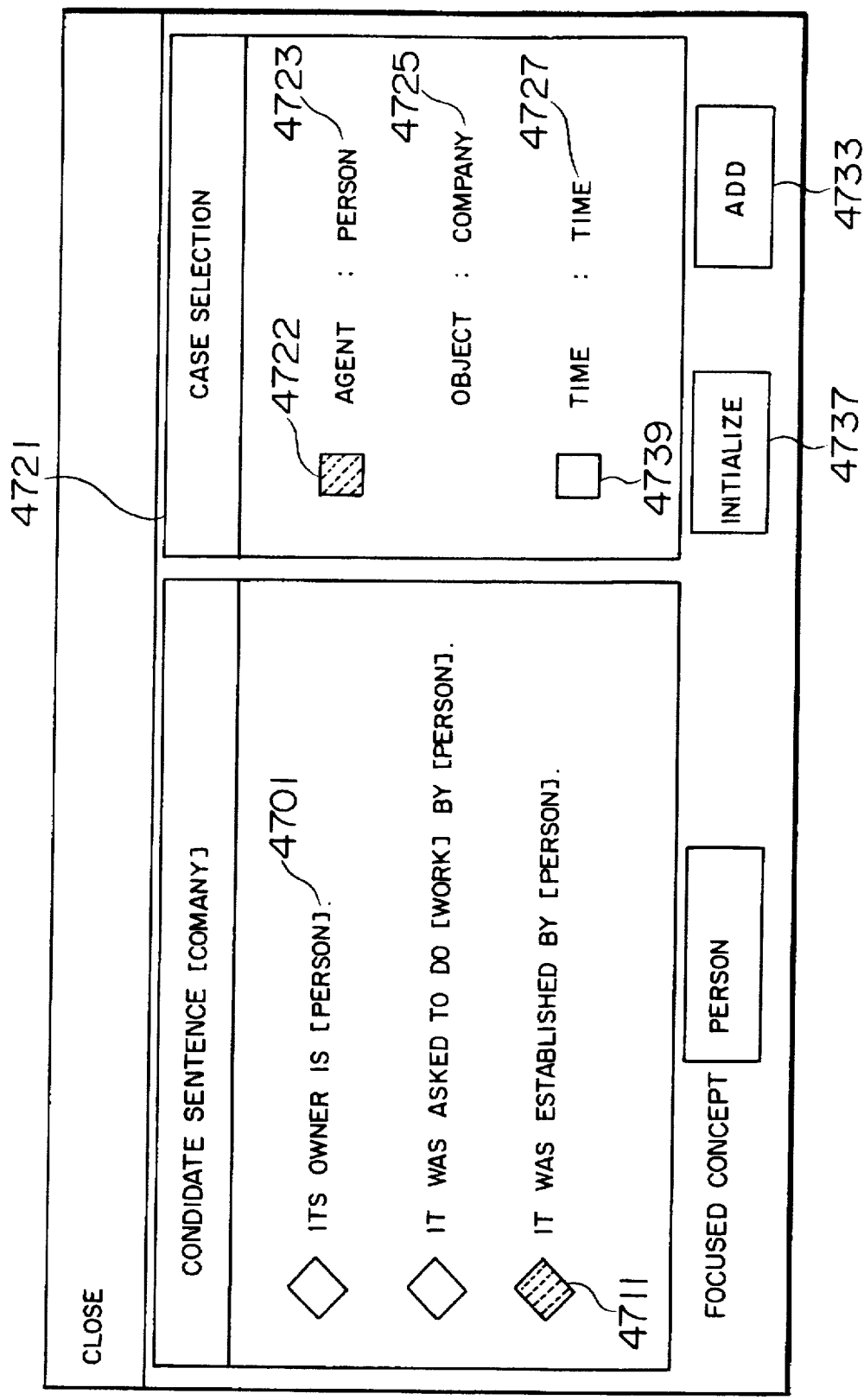
FIG. 47 is a view of a window for selecting sentences and cases.

Templates as candidates are selected by performing matching of strings of characters for names of all subconcepts as described above. In the restriction addition window 4601 in FIG. 46, conditions allowed to be added to "Company" 4603 are displayed without focusing. As a result, a large number of conditions are displayed. In FIG. 47, conditions allowed to given to "company" are filtered to conditions allowed to embed "person". When the user wants to add conditions to "company" on the basis of "person", conditions can be filtered as described above.

Focused concepts allowed to be use are thus selected from the templates as candidates for restriction addition and displayed in step 6890. At this time, the concept "person" used for focusing is displayed in the case in the step 6890 as shown in "Its owner is [person]" (4701). Accordingly, the user can see what case can be filled with the concept used for focusing. When a sentence to be displayed in the query editing window is selected from candidates, the trouble required for resetting the focused concept as a concept in a case in the selected sentence can be omitted. Thus, filtration and user's selection of candidates can be facilitated.

The filtration (focusing) can be repeated. FIG. 48 shows the case where a filtration based on "University A" and a filtration based on "doctorate" are performed successively. "University A" and "doctorate" used for filtration are embedded in the candidate sentence 4801. Among case selection buttons in the case selection window, buttons 4803 and 4805 corresponding to cases filled with the concepts used for filtration, that is, corresponding to collection-in case and object case, have been selected initially.

Although this embodiment has shown the case where focused concepts are inputted after all candidates are displayed once, the invention can be applied to the case where focused concepts may be inputted initially.

When a template of "establish" as a condition to be added is to be selected from focused candidates, the color of the button 4711 is changed by clicking the button through a mouse to thereby indicate the selection of the button in step 6750. Further, a case selection window 4721 appears to inquire what case among the cases of the template "establish" as a conditional sentence is to be added to the query. The buttons 4723 and 4739 are buttons for selecting whether cases corresponding to the buttons are used. In this case, the button 4723 shows the selected case. In step 6760, the state of selection/non-selection can be turned over in the same manner as a toggle switch by clicking these buttons. At this time, a case corresponding to the place 4725 where there is no selection button is a case using "company" as an object of restriction addition. This is because this case must be used.

When the initialization button 4731 is then clicked, the state goes back to the state existing before candidates are filtered.

Figure 49:
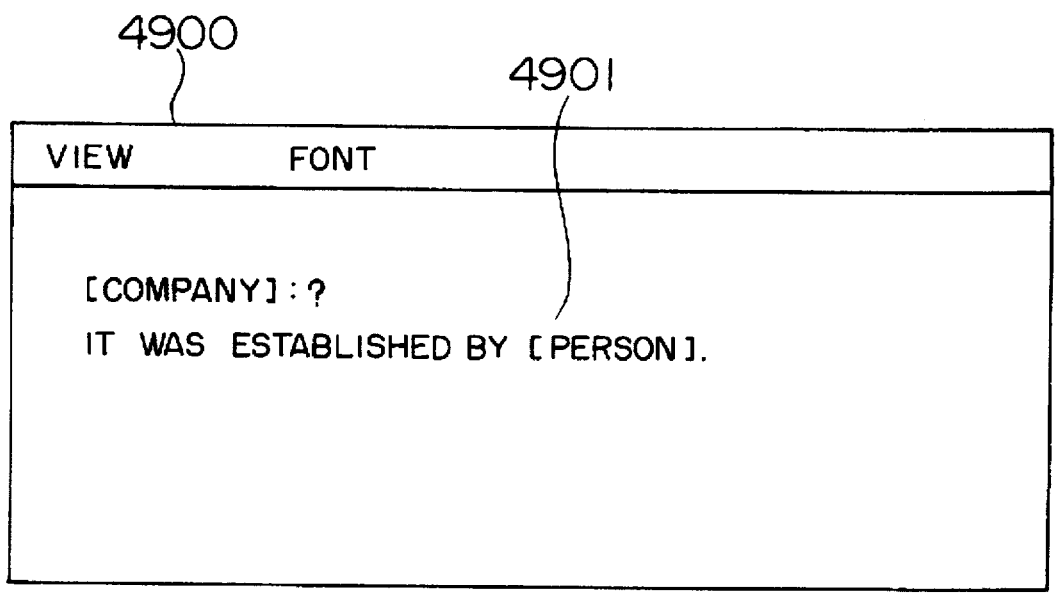
FIG. 49 is a view showing an example of a query editing window in which one line is added.

When the addition button 4733 is clicked in step 6770, a new line 4901 is added to the query editing window 4900 and displayed as shown in FIG. 49 in step 6780. Assuming now that there are some conditions to be added to "company" 5001 and "person" 5003, then, in step 6330, "Its place is [Tokyo]" (5007) and "It took [license] at [University A]" (5005)

are added as conditional sentences to "company" 5001 and "person" 5003, respectively. This sentence modifies "person" in the following sentence.

"It was established by [person]" (5004)

Accordingly, these two sentences express the following participial modification sentence.

"It was established by a person taking license at University A."

Figure 50:
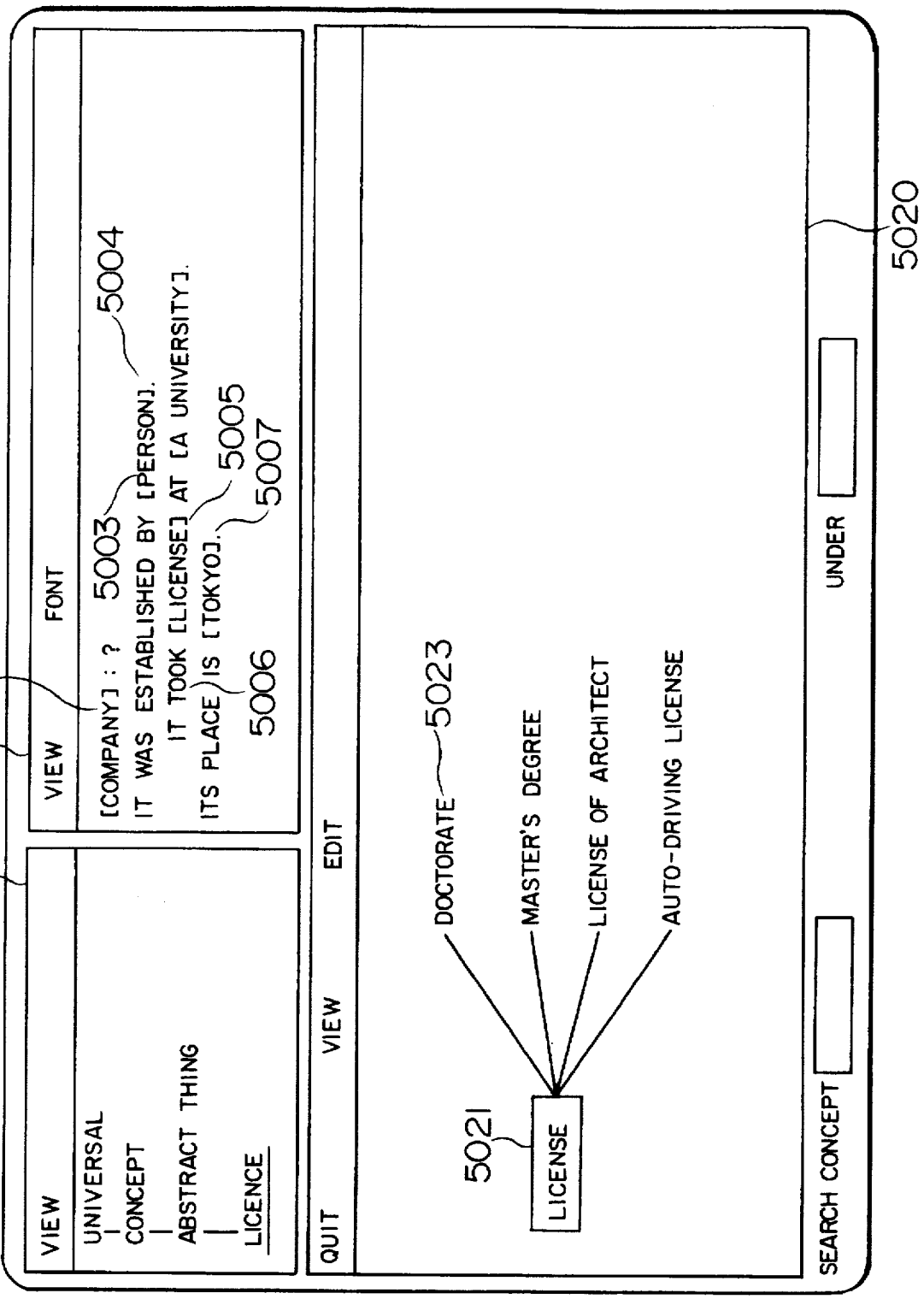
FIG. 50 is a view showing an example of display at the time of alteration of a case element.

Sentences modifying concepts in the query can be added successively as query conditions in the manner as described above. FIG. 50 shows the state of the display in which addition is finished. An indented line in the query in the query editing window 5010 represents that the sentence in the indent line modifies the above sentence. When the invention is applied to inputting of facts, templates allowed to be used can be filtered by specific concepts or relations and exhibited.

The filtration of candidates can be thus performed.

The alteration of concepts allowed to be put in cases in conditions will be described as an eleventh embodiment according to the display method of the invention. In the previous embodiment, relations used for restriction addition and cases used can be selected but case constraint concepts are put in cases except the cases using focused concepts because no case except the cases using focused concepts is not set with respect to the content thereof. Therefore, in step 6790, case elements are set. In FIG. 50, "license" 5005 is put in the object case of "take". When this is to be altered to "doctorate" 5023, in step 7210, the case requiring the alteration of the concept in the case in the query in the query editing window 5010, that is, the case filled with "license" 5005, is pointed. The current concept is automatically changed to "license" 5005, so that the node tree window is rewritten to a category allowed to be inputted in the case in step 7220. FIG. 50 shows the display just after the rewriting.

When a concept in a case in the query is to be changed in step 6620, the concept in the case requiring alteration of the concept is altered as the current concept and then a concept to be set as the content of the case is selected from the node tree window in the same manner as in the case where the object case of "take" is altered from "license" to "doctorate" at the time of restriction addition.

When a string of characters for a concept to be retrieved is inputted in the string input area 4241 for search, a concept having a string fitted to the input string as expression is retrieved and displayed in the node tree. Subconcepts of a concept can be further displayed by selecting "sub-concept display" from a pop-up menu displayed by clicking the right button of a mouse in the concept in the node tree window. A desired concept can be displayed by repeating this procedure.

In this case, both the root concept in the tree and the anchor concept are "license" 5021. In step 7230, the current concept is altered to "doctorate" and object case of "take" is also altered to "doctorate" by clicking a mouse in "doctorate" 5023 in the node tree window 5020. When a plurality of concepts are to be put in one case, a pop-up menu is displayed by clicking a mouse in the case. For example, the pop-up menu contains:

"SET",

"AND", and

"OR".

When "SET" is selected, the meaning of the case in which a plurality of concepts, for example, A and B, are set is "a set of A and B" which is displayed as (SET:A;B).

When "AND" is selected, the meaning of the case in which a plurality of concepts, for example, A and B, are set is "A and B" which is displayed as (AND:A;B).

When "OR" is selected, the meaning of the case in which a plurality of concepts, for example, A and B, are set is "A or B" which is displayed as (OR:A;B).

Figure 51:
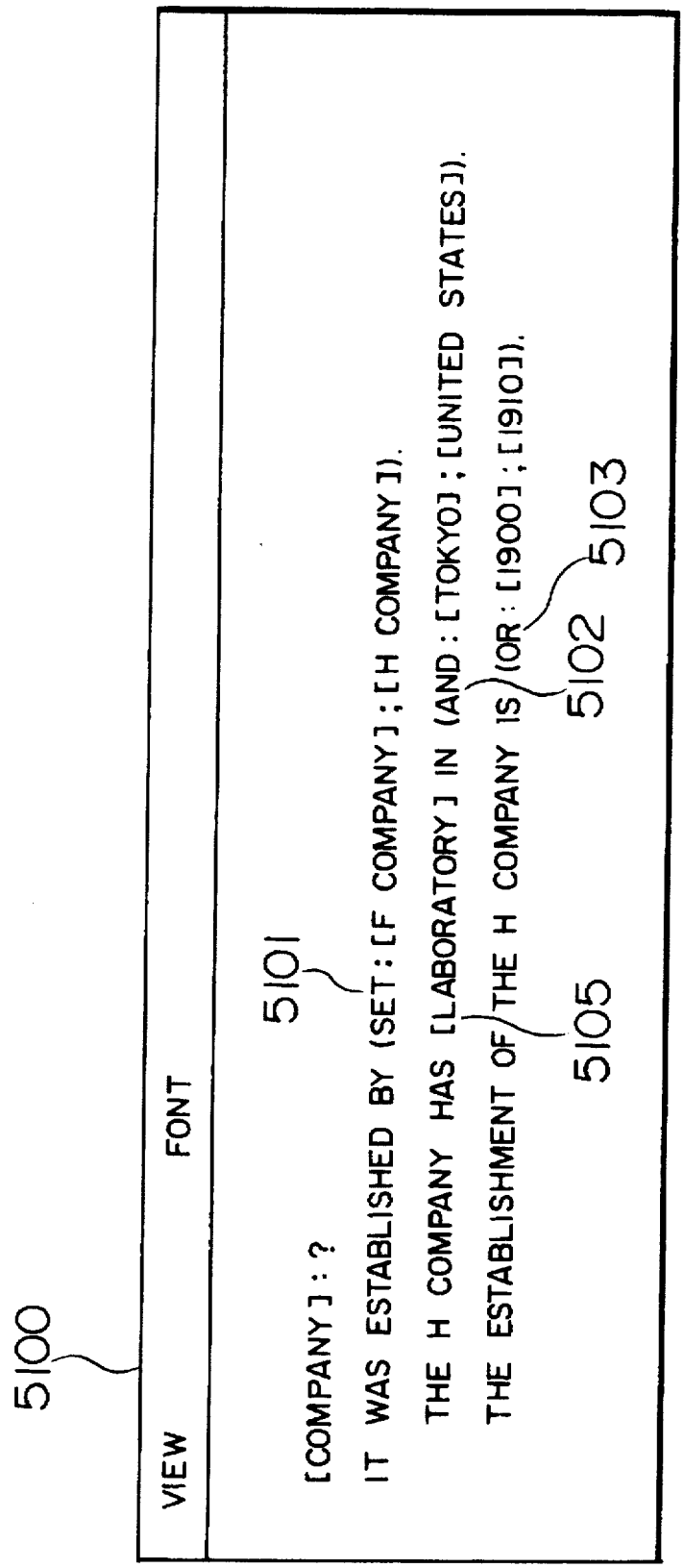
FIG. 51 is a view showing an example of display of query conditions in which a plurality of concepts are contained in a conditional sentence.

FIG. 51 shows the case where a plurality of concepts are set. In this drawing, there is shown a query as follows: "What is company ? It was established by a set of H company and F company. It has laboratory in Tokyo and United State. The establishment of the H company is 1900 or 1910.". In the query, (SET:[F company];[H company]) 5101.expresses "a set of F company and H company", (AND:[Tokyo];[United States]) 5102 expresses "Tokyo and United States", and (OR:[1900]; [1910]) expresses "1900 or 1910". When a conditional sentence is further added to a plurality of concepts, a concept to which the conditional sentence is added after "co-occurrence" is displayed to make the relation or connecting relation clear. For example, in the drawing, the conditional sentence "The H company has laboratory in (AND:[Tokto];[United States])." 5105 modifies one concept "H company" among concepts in (SET:[F company];[H company]) 5101."When the conditional sentence modifies both "F company" and "H company", the conditional sentence is displayed as "The (SET:[F company] ;[H company]) have laboratory in (AND:[Tokyo];[United States]).

When the invention is applied to inputting of facts, concepts allowed to be put in cases in the facts can be altered.

The alteration of concepts allowed to be put in cases in conditions can be performed as described above.

In the following, addition of a case to a conditional sentence, deletion of a case in a conditional sentence and deletion of a conditional sentence will be described as a twelfth embodiment according to the display method of the invention.

When case editing is required in step 6620, that is, when addition of a case to a conditional sentence in a query or deletion of a case from a conditional sentence is required, a pop-up menu is displayed by clicking a mouse in the head of the conditional sentence to be subjected to case addition/deletion in step 7110. When an item is selected in step 7130, a case selection window (4721 in FIG. 47) as used at the time of restriction addition is displayed in step 7140. At this time, cases which have been used in the query are displayed emphatically like the button 4722, whereas cases not used are displayed like the button 4739.

The state of selection/non-selection can be changed over like a toggle switch by user's clicking these buttons through a mouse. In step 7150, cases used in the query are added/deleted by clicking these buttons through the mouse. At the time of case deletion, a case can be also deleted by selecting an item from a pop-up menu displayed through clicking the mouse in the case in the query editing window.

In deletion of a condition once added, a conditional sentence to be deleted and conditional sentences added to concepts in the conditional sentence are deleted by clicking a mouse in the head of the conditional sentence in step 6640 and selecting an item from a pop-up menu in step 6650.

Addition of a conditional sentence, deletion of a case in a conditional sentence and deletion of a conditional sentence can be performed as described above.

Figure 52:
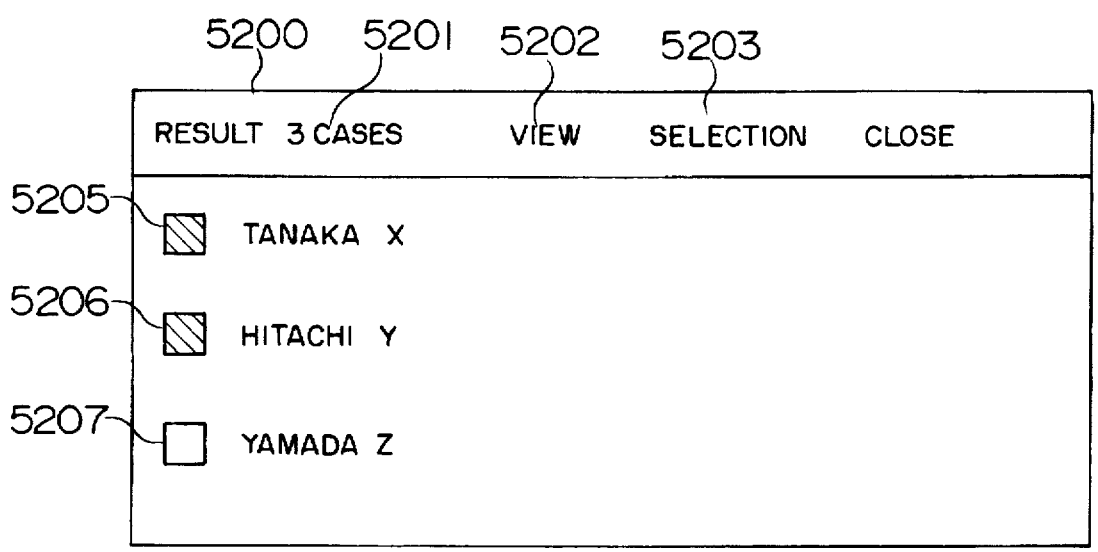
FIG. 52 is a view showing an example of display of results by a retrieval function of the information storage and retrieval system.
Figure 53:
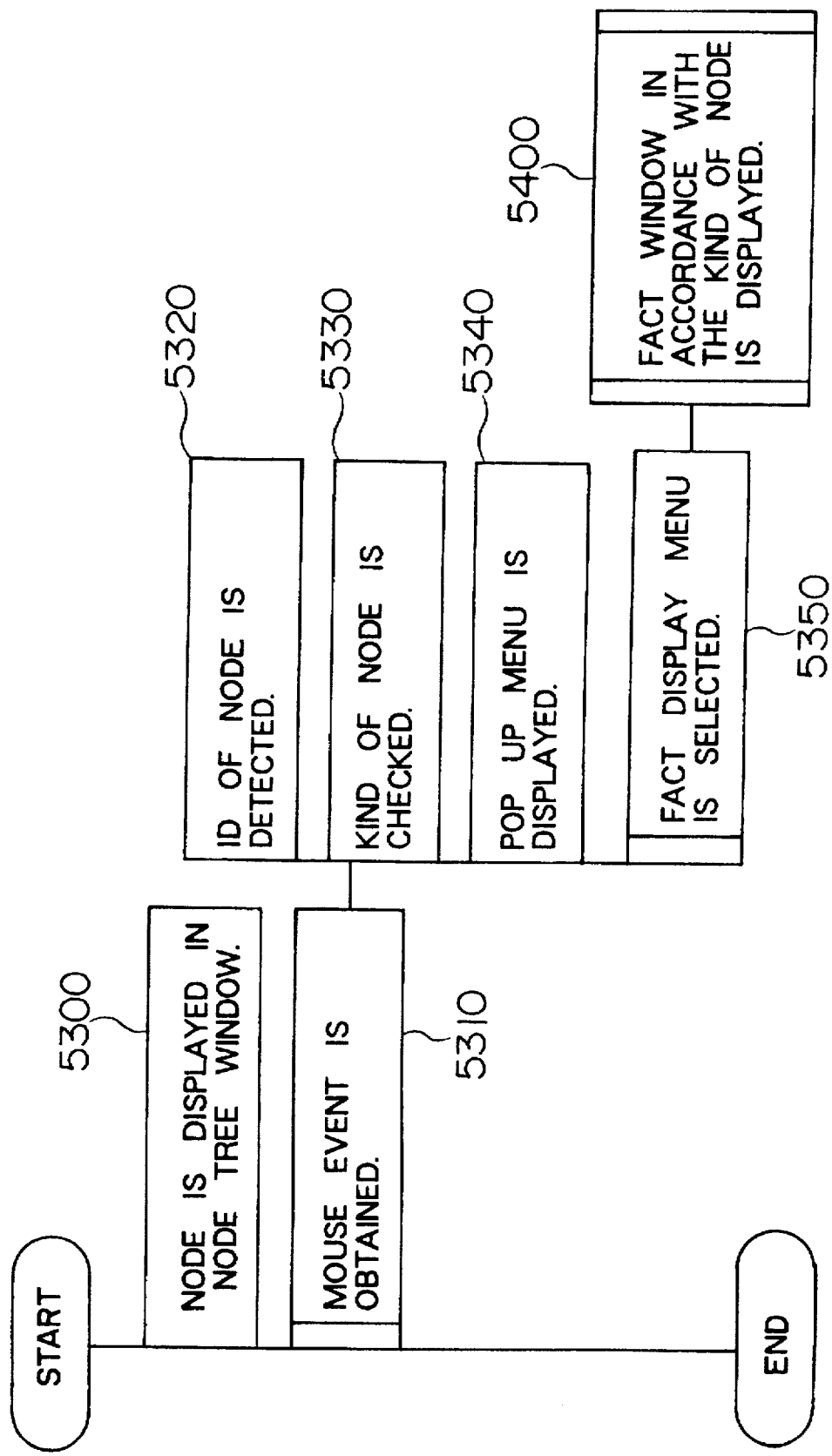
FIG. 53 is a view showing a flow of the concept and relation fact information display routine.
Figure 54:
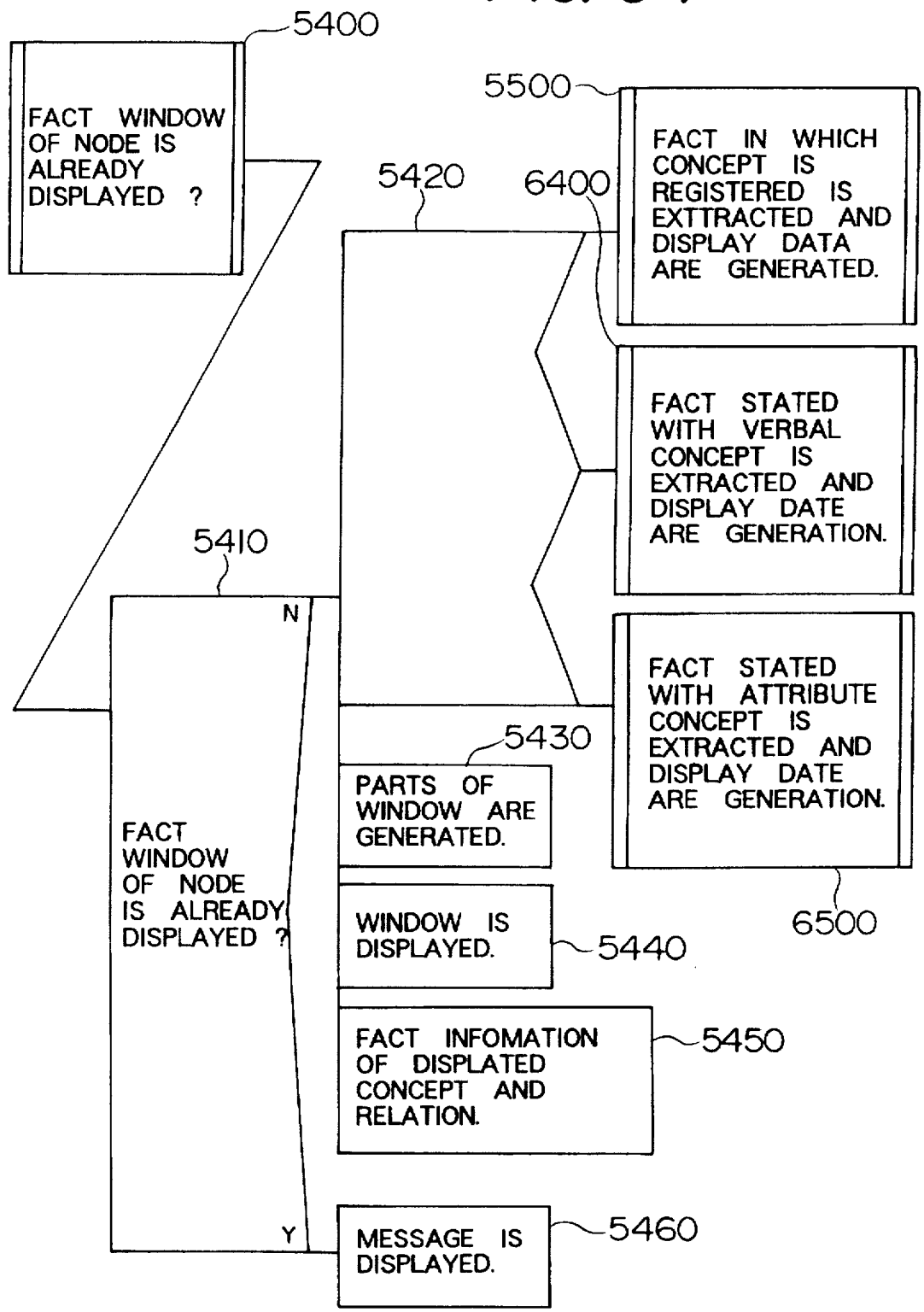
FIG. 54 is a view showing a flow of the case where nodes are classified by kind in the concept and relation fact information display routine.
Figure 55:
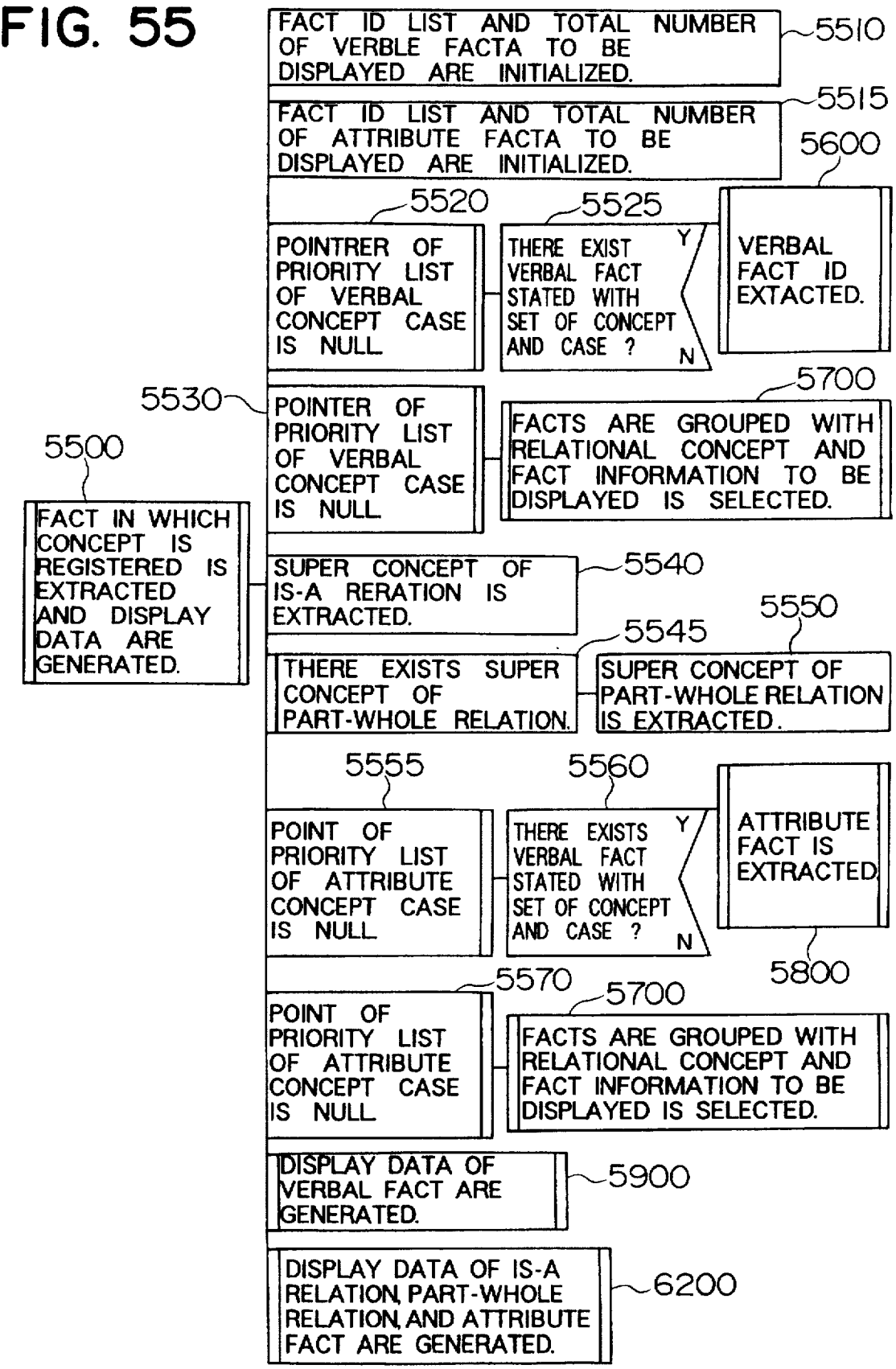
FIG. 55 is a view showing a flow of the case where view data are generated in the concept fact information display routine.
Figure 56:
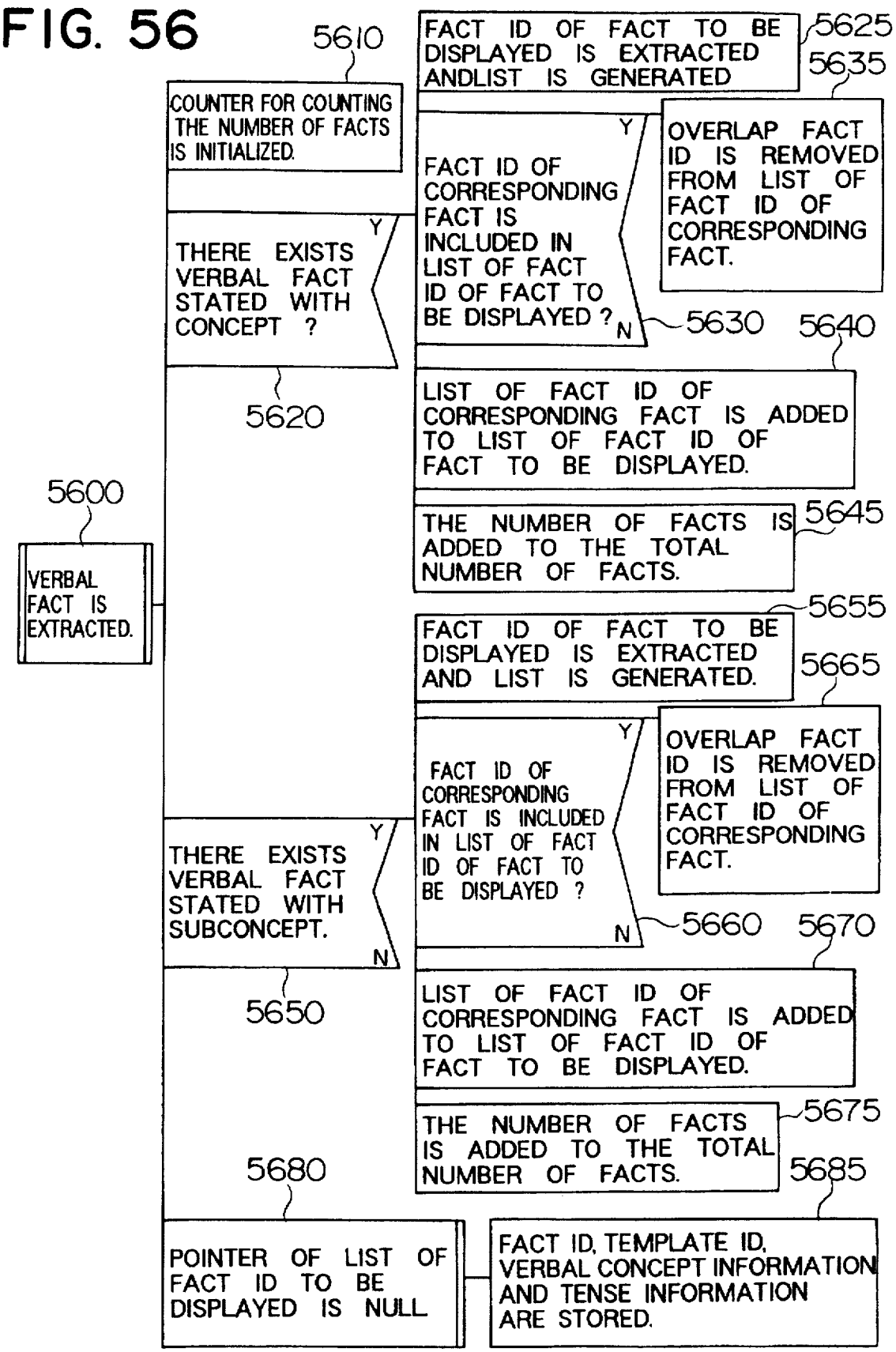
FIG. 56 is a view showing a flow of the case where view data of verbal facts are generated in the concept fact information display routine.

In the following, the display of a result will be described as a thirteenth embodiment according to the display method of the invention. In execution of retrieval, a concept to be retrieved in the query editing window is pointed by clicking a mouse in step 6680, so that an item is selected from a pop-up menu. Not only root concepts in a query but other concepts can be retrieved as long as the concepts are in the window. When, for example, "person" 5003 is pointed by clicking a mouse in FIG. 50 to execute retrieval, "Person which took license at University A" is retrieved. When there is any concept fitted to the query condition, a result list window 5200 is displayed. A result list is shown in FIG. 52. In this case, "Tanaka X" 5205, "Hitachi Y" 5206 and "Yamada Z" 5207 are concepts (in this case, "person") fitted to the query condition. The number of concepts fitted to the query condition is displayed as "The number of matched concepts: 3" 5201 in an upper portion of the window.

When an item is selected from the "view" menu 5202 by pointing a button corresponding to a string of characters, result information in detail can be displayed by combining facts accumulated on the knowledge base with the resulting concept. It is assumed now in the drawing that each of the toggle buttons for "Tanaka X" 5205 and "Hitachi Y" 5206 is in a selection state and that the toggle button for "Yamada Z" 5207 is in a non-selection state. When an item is selected from the menu, specific licenses (which "Tanaka X" and "Hitachi Y" took at University A) expressed in facts with respect to "Tanaka X" and "Hitachi Y" in which each of the toggle buttons is in a selection state are embedded in corresponding cases in the query and displayed in the result browser window.

When an item is selected from the "selection" menu 5203, all toggle buttons corresponding to resulting concepts can be turned to "selection" or to "non-selection".

The display of results can be performed as described above.

According to the present invention, in an information storage and retrieval system using a conceptual relation model for expressing knowledge by concepts and relations defined between concepts, fact information expressed by both concepts and relations stored in a knowledge base is displayed on the basis of templates defining the significant structures of cases and template patterns so that concepts attendantly stored in the templates are displayed together with prepositions/postpositions in the form of a string of characters. As a result, not only sentences based on polynomial relations can be inputted correspondingly to the templates but the sentences can be expressed as registered facts in the form of a language as near as a natural language as possible. Furthermore, strings of characters for prepositions/postpositions can be stored regardless of the language displayed. Furthermore, an effect arises in that there is no generation of sentences making no sense, because inputting is based on templates and a hierarchy of concepts. Furthermore, sentences can be inputted by using a pointing device, so that a user inexperienced for operating a keyboard can input sentences easily.

Furthermore, guidance concerning concepts allowed to be inputted can be displayed by using a multi-window function, so that the user can select concepts speedily to generate sentences.

In addition, in the case where the number of facts to be displayed is larger than a threshold, the system can automatically select facts to be displayed to make it possible to use a limited view area effectively.

What is claimed is:

1. An information storage and retrieval system comprising:

a concept relation model for representing knowledge in a hierarchical tree form in terms of conceptual concepts including at least a noun conceptual concept, a name conceptual concept, a numerical value conceptual concept and a unit conceptual concept, relational concepts each defining relations between plural conceptual concepts and attribute name concepts each defining relation resulting from an attribute common to plural conceptual concepts;

wherein said conceptual concepts, relational concepts and attribute name concepts are formed into plural templates including at least a first template which includes two conceptual concepts related to each other by an attribute name concept, and a second template which includes plural conceptual concepts, related to each other by a relational concept;

means for inputting fact information represented in terms of said conceptual concepts, said relational concepts and attribute name concepts according to said first and second templates defining previously inputted fact information and fact information currently being inputted, each of said templates being related to a relational concept or an attribute name concept, and defining a relation between a relational concept or an attribute name concept and semantic information which includes at least one conceptual concept, wherein said templates are arranged in said hierarchical tree form, wherein a relation between a relational concept or an attribute name concept in an upper template and a relational concept or an attribute name concept in a lower template is defined as an is-a relation and wherein a relation between an upper template and a lower template is defined as an is-a relation;

a knowledge base for storing said fact information, said conceptual concepts, said relational concepts, said attribute name concepts and said templates;

means for generating a retrieval request for a conceptual concept based on said templates, said conceptual concepts and said stored fact information as a result of interaction with a user;

means for retrieving a requested conceptual concept based on said retrieval request; and means for displaying a fact window including said inputted fact information and a node tree window including said conceptual concepts, said relational concepts and said attribute name concepts in said hierarchical tree form for viewing by said user.

2. An information storage and retrieval system according to claim 1, wherein said relational concepts include verbal concepts representing verbs, and said attribute name concepts include attribute concepts representing attributes.

3. An information storage and retrieval system according to claim 2, wherein said conceptual concepts include noun concepts representing nouns, unit name concepts representing names of numerical values, and unit concepts representing units, and wherein said system further comprises:

means for managing said relational concepts by is-a relations, each is-a relation defining a lower relational concept as a thing defined by an upper relational concept, and managing said conceptual concepts by part-whole relations, each part-whole relation defining a lower concept as a thing included within the whole thing defined by an upper concept.

4. An information storage and retrieval system according to claim 3, wherein said system further comprises:

a second knowledge base for storing a concept relation model for managing and expressing said verbal concepts and said attribute concepts in said relational concepts by is-a relations.

5. An information storage and retrieval system according to claim 3, wherein said system further comprises:

means for retrieving fact information stored in terms of said relational concepts and said attribute name concepts and at least one conceptual concept by using at least one upper relational concept or attribute name concept positioned in said hierarchical tree form over said relational concepts and said attribute name concepts.

6. An information storage and retrieval system according to claim 3, wherein said system further comprises:

means for storing said noun conceptual concepts and said unit conceptual concepts in terms of names each expressed by at least one string of characters, and managing said noun conceptual concepts and said unit conceptual concepts by using one of said strings as a representative name.

7. An information storage and retrieval system according to claim 2, wherein said system further comprises:

storing information of standard cases to define semantic information in said templates, and a semantic priority of a semantic order among standard cases necessary for representing said verbal concepts.

8. An information storage and retrieval system according to claim 2, wherein said system further comprises:

means for storing said relation concepts in terms of names each expressed by at least one string of characters, and managing said relational concepts by using one of said strings as a representative name.

9. An information storage and retrieval system according to claim 2, wherein said system further comprises:

means for storing said verbal concepts in terms of etyma of corresponding verbs each expressed by a string of characters, and storing information concerning strings of characters corresponding to conjugations thereof and a difference in kinds of conjugations.

10. An information storage and retrieval system according to claim 1, wherein template patterns are respectively defined for said templates, and wherein said system further comprises:

means for expressing semantic information in a pseudo-natural language by using said template patterns.

11. An information storage and retrieval system according to claim 1, wherein said system further comprises:

means for selecting a template based on semantic information of said templates and said requested conceptual concept such that said requested conceptual concept corresponds to at least one case of said semantic information.

12. An information storage and retrieval system according to claim 1, wherein said system further comprises:

means for selecting said templates based on semantic information of said templates to selected templates corresponding to said relational concepts or said attribute name concepts.

13. An information storage and retrieval system comprising:

a concept relation model for representing knowledge in a hierarchical tree form in terms of conceptual concepts including at least a noun conceptual concept, a name conceptual concept a numerical value conceptual concept and a unit conceptual concept, relational concepts each defining relations between plural conceptual concepts and attribute name concepts each defining relation resulting from an attribute common to plural;

wherein said conceptual concepts, relational concepts and attribute name concepts are formed into plural templates including at least a first template which includes two conceptual concepts related to each other by an attribute name concept, and a second template which includes plural conceptual concepts, related to each other by a relational concept;

means for inputting fact information represented in terms of said conceptual concepts, said relational concepts and attribute name concepts according to said first and second templates defining previously inputted fact information and fact information currently being inputted, each of said templates being related to a relational concept or an attribute name concept, and defining a relation between a relational concept or an attribute name concept and semantic information which includes at least one conceptual concept, wherein said templates are arranged in said hierarchical tree form wherein a relation between a relational concept or an attribute name concept in an upper template and a relational concept or an attribute name concept in a lower template is defined as an is-a relation and wherein a relation between an upper template and a lower template is defined as an is-a relation;

a knowledge base for storing said fact information, said conceptual concepts, said relational concepts, said attribute name concepts and said templates;

means for generating a retrieval request for a conceptual concept based on said templates, said conceptual concepts and said stored fact information as a result of interaction with a user;

means for retrieving a requested conceptual concept based on said retrieval request;

45 means for displaying a fact window including said inputted fact information and a node tree window including said conceptual concepts, said relational concepts and said attribute name concepts in said hierarchical tree form for viewing by said user;

a second knowledge base for storing a concept relation model for expressing strings of characters for prepositions added before semantic information of said relational concepts and said attribute name concepts and postpositions added after semantic information of said relational concepts and said attribute name concepts so that said templates are able to be applied in a plurality of pseudo-natural languages by adding said prepositions or said postpositions; and means for adding said prepositions and postpositions before and after said semantic information of said relational concepts and said attribute name concepts.

14. An information storage and retrieval system comprising:

a concept relation model for representing knowledge in a hierarchical tree form in terms of conceptual concepts including at least a noun conceptual concept, a name conceptual concept, a numerical value conceptual concept and a unit conceptual concept, relational concepts each defining relations between plural conceptual concepts and attribute name concepts each defining relation resulting from an attribute common to plural;

wherein said conceptual concepts, relational concepts and attribute name concepts are formed into plural templates including at least a first template which includes two conceptual concepts related to each other by an attribute name concept, and a second template which includes plural conceptual concepts, related to each other by a relational concept;

means for inputting fact information represented in terms of said conceptual concepts said relational concepts and attribute name concepts according to said first and second templates defining previously inputted fact information and fact information currently being inputted, each of said templates being related to a relational concept or an attribute name concept, and defining a relation between a relational concept or an attribute name concept and semantic information which includes at least one conceptual concept, wherein said templates are arranged in said hierarchical tree form, wherein a relation between a relational concept or an attribute name concept in an upper template and a relational concept or an attribute name concept in a lower template is defined as an is-a relation and wherein a relation between an upper template and a lower template is defined as an is-a relation;

means for inputting a plurality of conceptual concepts, adding general information to said conceptual concepts so that the expression of said fact information including said conceptual concepts to which said general information has been added becomes general, and adding indefinite information to said conceptual concepts so that the expression of said conceptual concepts to which said indefinite information has been added becomes indefinite;

means for quoting other fact information instead of said conceptual concept, so that said quoted other fact information becomes an objective expression;

a knowledge base for storing said fact information, said conceptual concepts, said relational concepts, said attribute name concepts and said templates;

46 means for managing said stored fact information based on said semantic information defined by said templates; and means for displaying a fact window including said inputted fact information and a node tree window including said conceptual concepts, said relational concepts and said attribute name concepts in said hierarchical tree form which includes at least one conceptual concept.

15. An information storage and retrieval system according to claim 14, wherein said relational concepts include verbal concepts representing verbs, and said attribute name concepts includes attribute concepts representing attributes; and wherein said system further comprises:

means for managing said conceptual concepts, said relational concepts said attribute name concepts by is-a relations, each is-a relation defining a lower concept as a thing defined by an upper concept, and managing said conceptual concepts by part-whole relations, each part-whole relation defining a lower concept as a thing included within a whole thing defined by an upper concept;

means for storing a plurality of conceptual concepts expressing semantic information in said fact information; and means for inputting other fact information modifying a conceptual concept, and adding exclusion information with at least one subconcept to said at least one conceptual concept so that the expression of said conceptual concept to which said exclusion information with said at least one subconcept has been added, becomes effective to all subconcepts of said conceptual concept except said at least one subconcept.

16. An information storage and retrieval system according to claim 15, wherein said system further comprises:

means for storing said other fact information modifying conceptual concepts and adding said other fact information to said conceptual concepts expressing semantic information in said fact information.

17. An information storage and retrieval system according to claim 15, wherein said system further comprises:

means for storing said exclusion information added to at least one conceptual concept of said conceptual concepts expressing semantic information in said fact information so that said exclusion information expresses exclusion of said at least one conceptual concept from subconcepts of said conceptual concept.

18. An information storage and retrieval system according to claim 14, wherein said system further comprises means for storing said general information added to said conceptual concepts expressing semantic information in said fact information.

19. An information storage and retrieval system according to claim 14, wherein said system further comprises means for storing said indefinite information added to said conceptual concepts for expressing that semantic information in said fact information, is indefinite so that said indefinite information expresses that the expression of said conceptual concepts as semantic information is indefinite.

20. An information storage and retrieval system according to claim 14, wherein said system further comprises means for storing semantic information contained in said fact information, by extracting fact information from other fact information.

21. An information storage and retrieval system comprising:

a concept relation model for representing knowledge in a hierarchical tree form in terms of conceptual concepts including at least a noun conceptual concept, a name conceptual concept, a numerical value conceptual concept and a unit conceptual concept, relational concepts each defining relations between plural conceptual concepts and attribute name concepts each defining relation resulting from an attribute common to plural;

wherein said conceptual concepts, relational concepts and attribute name concepts are formed into plural templates including at least a first template which includes two conceptual concepts related to each other by an attribute name concept, and a second template which includes plural conceptual concepts, related to each other by a relational concept;

means for inputting fact information represented in terms of said conceptual concepts said relational concepts and attribute name concepts according to said first and second templates defining previously inputted fact information and fact information currently being inputted, each of said templates being related to a relational concept or an attribute name concept defining a relation between, and defining a relation between a relational concept or an attribute name concept and semantic information which includes at least one conceptual concept, wherein said templates are arranged in said hierarchical tree form, wherein a relation between a relational concept or an attribute name concept in an upper template and a relational concept or an attribute name concept in a lower template is defined as an is-a relation and wherein a relation between an upper template and a lower template is defined as an is-a relation;

a knowledge base for storing said fact information, said conceptual concepts, said relational concepts, said attribute name concepts and said templates;

means for generating a retrieval request for a conceptual concept based on said templates, said conceptual concepts and said stored fact information as a result of interaction with a user;

means for retrieving a requested conceptual concept based on said retrieval request;

means for displaying a fact window including said inputted fact information and a node tree window including said conceptual concepts, said relational concepts and said attribute name concepts in said hierarchical tree form for viewing by said user;

means for storing standard cases to define semantic information in said templates, and an order of semantic priority among standard cases necessary for representing said relational concepts;

means for selecting a conceptual concept used in said fact information and a retrieval condition, extracting candidate sentences according to said templates that use said selected conceptual concept by using said templates, and displaying said candidate sentences;

means for selecting at least one candidate sentence from said candidate sentences;

means for selecting a case from cases in said selected candidate sentences, said case corresponding to said standard cases containing said retrieval condition using said templates from cases in said selected candidate sentence; and means for substituting said conceptual concept for another conceptual concept in said selected case of said template and displaying said conceptual concept substituted in said selected case.

22. An information storage and retrieval system according to claim 21, wherein said system further comprises:

means for inputting semantic information based on a natural language sentence having a plurality of cases selected by a user using a pointing device.

23. An information storage and retrieval system according to claim 21, wherein said system further comprises:

means for selecting a conceptual concept used in said fact information and said case displayed in said node tree window by using a pointing device.

24. An information storage and retrieval system according to claim 23, wherein said system further comprises:

means for obtaining an uppermost conceptual concept allowed to enter a case defined in said template by selecting a conceptual concept in said fact information and said retrieval condition by a user using said pointing device, rewriting said conceptual concepts in a tree form in said node tree window to said uppermost conceptual concept and subconcepts in a tree form so that said uppermost conceptual concept stands in the center of said tree form, and substituting a selected conceptual concept for the conceptual concept in said case by selecting said conceptual concept allowed to enter said case by said user using said pointing device.

25. An information storage and retrieval system according to claim 24, wherein said system further comprises:

means for displaying conceptual concepts in the form of a tree so that it is easy to discriminate between conceptual concepts allowed to be replaced and conceptual concepts forbidden to be replaced.

26. An information storage and retrieval system according to claim 21, wherein said system further comprises:

means for displaying candidate sentences selected so that said candidate sentences are allowed to be used in terms of the selected conceptual concept or relational concept.

27. An information storage and retrieval system according to claim 26, wherein said system further comprises:

means for displaying said selected candidate sentences so that it is easy to select a case allowed to use the conceptual concept used for the selection of said candidate sentences when selecting said case from cases in said selected candidate sentences.

28. An information storage and retrieval system according to claim 21, wherein said system further comprises:

means for generating a retrieval condition for modifying a conceptual concept by selecting said conceptual concept in said retrieval condition and by inputting a conditional sentence, and for displaying said retrieval condition.

29. An information storage and retrieval system according to claim 21, wherein said system further comprises:

means for deleting a conditional sentence by selecting said conditional sentence through a pointing device and re-displaying the retrieval condition.

30. An information storage and retrieval system according to claim 21, wherein said system further comprises:

means for extracting cases defined in a template to be used by a conditional sentence in said retrieval condition by selecting said conditional sentence through a pointing device, and displaying cases allowed to be used in said conditional sentence; and means for performing addition and deletion of cases in said conditional sentence by selecting the displayed case through said pointing device, and displaying the cases.

31. A display method in an information storage and retrieval system comprising the steps of:

providing a concept relation model for representing knowledge in a hierarchical tree form in terms of conceptual concepts including at least a noun conceptual concept, a name conceptual concept, a numerical value conceptual concept and a unit conceptual concept, relational concepts each defining relations between plural conceptual concepts and attribute name concepts each defining relation resulting from an attribute common to plural;

wherein said conceptual concepts, relational concepts and attribute name concepts are formed into plural templates including at least a first template which includes two conceptual concepts related to each other by an attribute name concept, and a second template which includes plural conceptual concepts, related to each other by a relational concept;

inputting fact information represented in terms of said conceptual concepts said relational concepts and attribute name concepts according to said first and second templates defining previously inputted fact information and fact information currently being inputted, each of said templates being related to a relational concept or an attribute name concept, and defining a relation between said relational concept or said attribute name concept and semantic information which includes at least one conceptual concept, wherein said templates are arranged in said hierarchical tree form, wherein a relation between a relational concept or an attribute name concept in an upper template and a relational concept or an attribute name concept in a lower template is defined as an is-a relation and wherein a relation between an upper template and a lower template is defined as an is-a relation;

storing said fact information, said conceptual concepts, said relational concepts, said attribute name concepts and said templates;

generating a retrieval request for a conceptual concept based on said templates, said conceptual concepts and said stored fact information as a result of interaction with a user;

retrieving a requested conceptual concept based on said retrieval request; and displaying a fact window including said inputted fact information and a node tree window including said conceptual concepts, said relational concepts and said attribute name concepts in said hierarchical tree form for viewing by said user.

32. A display method in an information storage and retrieval system comprising the steps of:

providing a concept relation model for representing knowledge in a hierarchical tree form in terms of conceptual concepts including at least a noun conceptual concept, a name conceptual concept, a numerical value conceptual concept and a unit conceptual concept relational concepts each defining relations between plural conceptual concepts and attribute name concepts each defining relation resulting from an attribute common to plural;

wherein said conceptual concepts, relational concepts and attribute name concepts are formed into plural templates including at least a first template which includes two conceptual concepts related to each other by an attribute name concept, and a second template which includes plural conceptual concepts, related to each other by a relational concept;

inputting fact information represented in terms of said conceptual concepts, said relational concepts and attribute name concepts according to said first and second templates defining previously inputted fact information and fact information currently being inputted, each of said templates being related to a relational concept or an attribute name concept, and defining a relation between said relational concept or said attribute name concept and semantic information which includes at least one conceptual concept, wherein said templates are arranged in said hierarchical tree form, wherein a relation between a relational concept or an attribute name concept in an upper template and a relational concept or an attribute name concept in a lower template is defined as an is-a relation and wherein a relation between an upper template and a lower template is defined as an is-a relation;

storing said fact information, said conceptual concepts, said relational concepts, said attribute name concepts and said templates;

generating a retrieval request for a conceptual concept based on said templates, said conceptual concepts and said stored fact information as a result of interaction with a user;

retrieving a requested conceptual concept based on said retrieval request;

displaying a fact window including said inputted fact information and a node tree window including said conceptual concepts, said relational concepts and said attribute name concepts in said hierarchical tree form for viewing by said user;

storing standard cases to define semantic information in said templates, and an order of semantic priority among standard cases necessary for representing said relational concepts;

selecting a conceptual concept used in said fact information and a retrieval condition, extracting candidate sentences according to said templates and allowed to use said selected conceptual concept by using said templates, and displaying said candidate sentences;

selecting at least one candidate sentence from said candidate sentences;

selecting a case from cases in said selected candidate sentences, said case corresponding to said standard cases containing said semantic information of said template and used in said fact information and said retrieval condition using said template; and substituting said conceptual concept for another conceptual concept in said selected case of said template and displaying said conceptual concept substituted in said selected case.

33. A display method in an information storage and retrieval system according to claim 32, wherein semantic information based on a natural language sentence having a plurality of cases is selected by said user using a pointing device.

34. A display method in an information storage and retrieval system according to claim 32, wherein a conceptual concept used in said fact information and said case of said retrieval condition is selected from conceptual concepts displayed in said node tree window by said user using a pointing device.

35. A display method in an information storage and retrieval system according to claim 34, wherein an uppermost conceptual concept allowed to enter a case defined in said template by selecting the conceptual concept in said fact information and said retrieval condition by a user using said pointing device, rewriting said conceptual concepts in tree form in said node tree window to said uppermost conceptual concept and subconcepts in said tree form so that said uppermost conceptual concept stands in the center of said tree, and substituting a selected conceptual concept for the conceptual concept in said case by selecting said conceptual concept allowed to enter said case by said user using said device.

36. A display method in an information storage and retrieval system according to claim 35, wherein conceptual concepts in a tree form are displayed so that it is easy to discriminate between conceptual concepts allowed to be replaced and conceptual concepts forbidden to be replaced.

37. A display method in an information storage and retrieval system according to claim 32, wherein candidate sentences allowed to be used in terms of the pointed to conceptual concept or relational concept are displayed by focusing (filtering) said candidate sentences.

38. A display method in an information storage and retrieval system according to claim 37, wherein said focused candidate sentences are displayed so that it is easy to select a case allowed to use the conceptual concept used for the selection of said candidate sentences when selecting said case from cases in said selected candidate sentences.

39. A display method in an information storage and retrieval system according to claim 32, wherein a retrieval condition for modifying a conceptual concept is generated by selecting said conceptual concept in said retrieval condition and by inputting a conditional sentence and displaying said retrieval condition.

40. A display method in an information storage and retrieval system according to claim 32, wherein a conditional sentence is deleted by selecting said conditional sentence through a pointing device and the retrieval condition is re-displaying the retrieval condition.

41. A display method in an information storage and retrieval system according to claim 32, wherein cases defined in a template to be used by a conditional sentence in said retrieval condition by selecting said conditional sentence through a user using a pointing device to display cases allowed to be used in said conditional sentence, and wherein additional and deletion of cases in said conditional sentence are performed by selecting the displayed case through said pointing device to display the cases.

* * * * *